(12) United States Patent
Cochran, II et al.

(10) Patent No.: US 6,255,636 B1
(45) Date of Patent: Jul. 3, 2001

(54) DISPOSABLE, MICROWAVEABLE CONTAINERS HAVING SUITABLE FOOD CONTACT COMPATIBLE OLFACTORY PROPERTIES AND PROCESS FOR THEIR MANUFACTURE

(75) Inventors: Ronald L. Cochran, II, Neenah; Mark B. Littlejohn; Donald C. McCarthy, both of Appleton; Cristian M. Neculescu, Neenah; Robert Patterson, Winneconne; Anthony J. Swiontek, Neenah, all of WI (US)

(73) Assignee: Fort James Corporation, Deerfield, IL (US)

( * ) Notice: Subject to any disclaimer, the term of this patent is extended or adjusted under 35 U.S.C. 154(b) by 0 days.

(21) Appl. No.: 09/524,204

(22) Filed: Mar. 13, 2000

Related U.S. Application Data

(62) Division of application No. 09/267,716, filed on Mar. 12, 1999.
(60) Provisional application No. 60/078,923, filed on Mar. 20, 1998.

(51) Int. Cl.$^7$ ........................................ H05B 6/80
(52) U.S. Cl. .................. 219/730; 219/725; 428/308.4
(58) Field of Search ................... 219/730, 725; 428/328, 36.7, 308.4, 95; 229/406; 524/128; 525/282; 523/200, 204

(56) References Cited

U.S. PATENT DOCUMENTS

| | | |
|---|---|---|
| D. 41,986 | 12/1911 | Smith .................................. 206/519 |
| D. 51,874 | 3/1918 | Beyrand . |
| D. 61,248 | 7/1922 | Reizenstein . |
| D. 66,556 | 2/1925 | Cunningham . |
| D. 76,433 | 9/1928 | Tams . |
| D. 86,627 | 3/1932 | Newton . |
| D. 88,688 | 12/1932 | Thompson . |
| D. 103,599 | 3/1937 | Ruck . |
| D. 106,554 | 10/1937 | Wilson . |
| D. 109,494 | 5/1938 | Leigh . |
| D. 116,789 | 9/1939 | Barbiers . |
| D. 116,790 | 9/1939 | Barbiers . |
| D. 135,030 | 2/1943 | Harshman . |
| D. 140,345 | 2/1945 | Fordyce . |
| D. 164,669 | 10/1951 | Chaplin ................................. D44/15 |

(List continued on next page.)

FOREIGN PATENT DOCUMENTS 0 407 198 A1  1/1991  (EP) .............................. B65D/85/00

OTHER PUBLICATIONS

"Fillers, Fibers, and Blends Remake PP", Robert D. Leaversuch, Modern Plastics, vol. 76, No. 4, p. 58, Apr. 1, 1999.
Database WPI, Section Ch, Week 8815, Derwent Publications Ltd., London, GB; Class A32, AN 88–10548 XP00210803 & JP 62265332A (Showa Denko KK), Nov. 18, 1987.
Database WPI, Section CH, Week 9043, Derwent Publications Ltd., London, GB; Class A18, AN 90–326027 XP002108104 & JP 02 235632 A (Showa Dneko KK), Sep. 18, 1990.

Primary Examiner—Teresa Walberg
Assistant Examiner—Quang Van
(74) Attorney, Agent, or Firm—Michael W. Ferrell

(57) ABSTRACT

Low-odor microwaveable polypropylene/mica food contact articles are disclosed. The articles are prepared by low temperature processing and typically include odor-suppressing basic organic or inorganic compounds. Preferably, the articles are substantially free from C8 and C9 organic ketones associated with undesirable odors. Further improvements to the articles include crack-resistant embodiments with synergistic amounts of polyethylene and titanium dioxide.

11 Claims, 29 Drawing Sheets

U.S. PATENT DOCUMENTS

| | | | |
|---|---|---|---|
| D. 169,133 | 3/1953 | Foster | D44/10 |
| D. 179,011 | 10/1956 | Kimble | D36/2 |
| D. 188,502 | 8/1960 | Metzler et al. | D44/15 |
| D. 190,336 | 5/1961 | Denni et al. | D44/15 |
| D. 221,290 | 7/1971 | Wiedemann | D7/1 |
| D. 232,613 | 9/1974 | Cheladze | D7/1 |
| D. 250,928 | 1/1979 | Franklin | D7/1 |
| D. 251,713 | 5/1979 | Brody | D7/28 |
| D. 275,255 | 8/1984 | Durand | D7/28 |
| D. 276,117 | 10/1984 | Solt | D7/36 |
| D. 279,345 | 6/1985 | Durand | D7/28 |
| D. 316,800 | 5/1991 | Wertheim | D7/548 |
| D. 342,186 | 12/1993 | Frere | D7/396.1 |
| D. 348,804 | 7/1994 | Feer | D7/560 |
| D. 351,316 | 10/1994 | Mann | D7/556 |
| D. 351,968 | 11/1994 | Zivin | D7/564 |
| D. 354,884 | 1/1995 | Carranza | D7/564 |
| D. 364,537 | 11/1995 | Anderson | D7/553 |
| D. 386,048 | 11/1997 | Bebaway | D7/549 |
| 1,440,070 | 12/1922 | Fry . | |
| 1,848,066 | 3/1932 | Shephard et al. . | |
| 2,928,567 | 3/1960 | Davis | 220/13 |
| 3,001,665 | 9/1961 | Tomarin | 220/4 |
| 3,672,538 | 6/1972 | Wiedemann et al. | 220/97 C |
| 3,675,811 | 7/1972 | Artz | 220/20 |
| 3,931,890 | 1/1976 | Davis | 206/508 |
| 4,643,940 * | 2/1987 | Shaw et al. | 428/308.4 |
| 4,734,450 | 3/1988 | Kawai et al. | 524/413 |
| 4,809,876 | 3/1989 | Tomaswick et al. | 220/458 |
| 4,933,526 | 6/1990 | Fisher et al. | 219/10.55 M |
| 4,981,631 | 1/1991 | Cheung et al. | 264/50 |
| 5,023,286 | 6/1991 | Abe et al. | 524/128 |
| 5,045,369 | 9/1991 | Kobayashi et al. | 428/36.7 |
| 5,088,640 | 2/1992 | Littlejohn | 229/2.5 R |
| 5,165,978 | 11/1992 | Lecinski | 428/66 |
| 5,300,747 | 4/1994 | Simon | 219/729 |
| 5,377,860 | 1/1995 | Littlejohn et al. | 220/306 |
| 5,439,628 | 8/1995 | Huang | 264/175 |
| 5,622,780 | 4/1997 | Paleari | 428/328 |
| 5,665,442 | 9/1997 | Andersen et al. | 428/36.4 |
| 5,758,773 | 6/1998 | Clements | 206/519 |

* cited by examiner

DISPOSABLE, MICROWAVEABLE CONTAINERS HAVING SUITABLE FOOD CONTACT COMPATIBLE OLFACTORY PROPERTIES AND PROCESS FOR THEIR MANUFACTURE

CROSS REFERENCE TO RELATED APPLICATIONS

This patent application is a divisional patent application of U.S. Ser. No. 09/267,716, filed Mar. 12, 1999, which is a non-provisional application based on U.S. Provisional Application Ser. No. 60/078,923 filed Mar. 20, 1998.

BACKGROUND OF THE INVENTION

Filled polypropylene articles have been observed to exhibit undesirable odors, particularly upon heating. In this respect, see U.S. Pat. No. 5,023,286 to Abe et al., wherein phenolic antioxidants are suggested to control the odor problem. Other polypropylene compositions may be found in U.S. Pat. No. 4,734,450 to Kawai et al.; U.S. Pat. No. 5,045,369 to Kobayashi et al.; U.S. Pat. No. 5,300,747 of Simon; U.S. Pat. No. 5,439,628 of Huang and U.S. Pat. No. 4,933,526 of Fisher et al.

This invention relates to disposable, polypropylene/mica microwaveable containers having suitable food contact compatible olfactory properties including cups, trays, soufflé dishes, lids, plates, bowls, and related articles of manufacture useful for preparation, storage, delivery, and serving of food, wherein convenience and low cost are of paramount importance. Nevertheless, suitable food contact compatible olfactory properties, appearance, and tactile characteristics of the plate, container, etc., are important for consumer preference. The suitability of these disposable articles of manufacture for microwave cooking, or heating of food, has an important place in today's marketplace. Both the commercial and retail market components need an aesthetically pleasing microwaveable, disposable, rigid and strong container, plate, or cup, and related articles of manufacture which also have suitable food contact compatible olfactory properties.

These disposable microwaveable containers and plates exhibit a melting point of no less than about 250° F., the containers or plates being dimensionally stable and resistant to grease, sugar and water at temperatures up to at least 220° F. and exhibiting sufficient toughness to be resistant to cutting by serrated polystyrene flatware and also exhibiting food contact compatible olfactory properties. The preferred containers and plates exhibit both suitable food contact compatible olfactory properties and at least one micronodular surface on the food contact side of the container or plate.

SUMMARY OF THE INVENTION

Microwaveable, disposable, rigid and strong containers and plates having suitable food contact compatible olfactory properties have been prepared. These disposable and microwaveable articles of manufacture exhibit (a) suitable food contact compatible olfactory properties; and (b) a melting point of not less than 250° F., suitably 250° F. to 330° F. In preferred embodiments these articles of manufacture exhibit a micronodular surface on the side coming in contact with food. These microwaveable, food contact compatible containers and plates are dimensionally stable and resistant to grease, sugar and water at temperatures of at least 220° F. and are of sufficient toughness to be resistant to cutting by serrated polystyrene flatware. The containers and plates of this invention answer a long felt need for products which can withstand the severe conditions of a microwave oven when common foods such as beans and pork, pancakes with syrup, pepperoni pizza, and broccoli with cheese are microwaved during food cooking and reconstituting processes.

It has been found in accordance with the present invention that polypropylene/mica food contact articles such as bowls or plates exhibit suitable olfactory characteristics when prepared by a low temperature process and/or when prepared including a basic organic or inorganic compound. There is provided in a first aspect of the present invention, a microwaveable, disposable food service article having food contact compatible olfactory properties formed of a melt processed polyolefin/mica composition wherein the composition includes from about 40 to about 90% by weight of a polypropylene polymer and from about 10 to about 50% by weight mica where the melt processed composition exhibits low odor as characterized by a relative aroma intensity index of less than about 1.6. Less than about 1.5 is more preferred and, as a practical matter, the lower limit of the relative aroma intensity index for the inventive composition is believed to be about 0.1.

Typically, the melt processed composition from which the microwaveable article is formed also includes a basic organic or inorganic compound including the reaction product of an alkali metal or alkaline earth element with carbonates, phosphates, carboxylic acids as well as alkali metal and alkaline earth element oxides, hydroxides, or silicates and basic metal oxides including mixtures of silicone dioxide with one or more of the following oxides: magnesium oxide, calcium oxide, barium oxide, and mixtures of the foregoing. More specifically, the basic organic or inorganic compound may be selected from the group consisting of: calcium carbonate, sodium carbonate, potassium carbonate, barium carbonate, sodium silicate, sodium borosilicate, magnesium oxide, strontium oxide, barium oxide, zeolites, sodium citrate, potassium citrate, calcium stearate, potassium stearate, sodium phosphate, potassium phosphate, magnesium phosphate, mixtures of silicone dioxide with one or more of the following oxides: magnesium oxide, calcium oxide, barium oxide, and mixtures of one or more of the above. Furthermore, hydroxides of the metals and alkaline earth elements recited above may be utilized.

Where a basic inorganic odor suppressing compound is chosen, generally such compound is selected from the group consisting of calcium carbonate, sodium carbonate, potassium carbonate, barium carbonate, sodium silicate, sodium borosilicate, magnesium oxide, strontium oxide, barium oxide, zeolites, sodium phosphate, potassium phosphate, magnesium phosphate, mixtures of silicone dioxide with one or more of the following oxides: magnesium oxide, calcium oxide, barium oxide, and mixtures of one or more of the basic inorganic compounds set forth above. The amount of a basic inorganic compound is generally from about 2 to 20 weight percent, but is usually from about 5 to about 15 weight percent of the article. Most preferably the basic inorganic compound selected is calcium carbonate; typically present from about 5 to about 20 weight percent.

Where an organic compound is chosen, it is typically selected from the group consisting of sodium stearate, calcium stearate, potassium stearate, sodium citrate, potassium citrate, and mixtures of these where the amount of such compound is from about 0.5 to about 2.5 weight percent of the article.

Typically, microwaveable articles produced in accordance with the present invention exhibit a relative aroma intensity index of less than about 1.0; preferably less than about 0.7; with a practical lower limit being 0.1 or so.

As shown below in connection with microwaveability testing, and summarized in Table 20, competing commercial polystyrene type plates cannot withstand the high temperatures generated in the microwave oven during food contact and either significantly warp or deform when the aforementioned food products were heated on them. Under the usual microwaving conditions with high grease content foods, the prior art plates tend to deform and flow to the point where parts of the plate become adhered to the inside of the microwave oven. For disposable plates and containers, having suitable food contact olfactory properties, appearance and feel are important attributes. The micronodular surface of the plates and containers of this invention where mica and the basic inorganic compound or basic organic compound are used in combination with polypropylene or polypropylene polyethylene copolymers or blends tend to give these products the pleasing appearance, feel of stoneware or a pottery-like look and suitable food contact olfactory properties. Another significant property of the containers and plates of this invention is their cut resistance. These rigid articles of manufacture are of sufficient toughness to be resistant to cutting by serrated polystyrene flateware. In normal usage they are also resistant to cutting by regular metal flatware.

Whereas any microwaveable article may be produced in accordance with the invention, most typically the article is a bowl or a plate suitable for serving food at a meal. The articles may be produced by injection molding; however, preferred articles are thermoformed and include a micronodular food contact surface. Micronodular food contact surfaces are produced by thermoforming a sheet into the article which has been extruded optionally with at least one matte roll and by vacuum thermoforming the sheet by applying vacuum opposite to the surface where the micronodular surface is desired. Most typically the micronodular surface will have a surface gloss of less than about 35 at 75° as measured by TAPPI method T-480-OM 92. Articles also will typically have a Parker Roughness Value of at least about 12 microns.

While any suitable polypropylene polymer may be used, the polypropylene polymers are preferably selected from the group consisting of isotactic polypropylene, and copolymers of propylene and ethylene wherein the ethylene moiety is less than about 10% of the units making up the polymer, and mixtures thereof. Generally, such polymers have a melt flow index from about 0.3 to about 4, but most preferably the polymer is isotactic polypropylene with a melt-flow index of about 1.5. In particularly preferred embodiments, the melt compounded composition from which the resultant extruded sheet is formed into articles further includes a polyethylene component and titanium dioxide. The polyethylene component may be any suitable polyethylene such as HDPE, LDPE, MDPE, LLDPE or mixtures thereof.

The various polyethylene polymers referred to herein are described at length in the Encyclopedia of Polymer Science & Engineering (2d Ed.), Vol. 6; pp: 383–522, Wiley 1986; the disclosure of which is incorporated herein by reference. HDPE refers to high density polyethylene which is substantially linear and has a density of generally greater that 0.94 up to about 0.97 g/cc. LDPE refers to low density polyethylene which is characterized by relatively long chain branching and a density of about 0.912 to about 0.925 g/cc. LLDPE or linear low density polyethylene is characterized by short chain branching and a density of from about 0.92 to about 0.94 g/cc. Finally, intermediate density polyethylene (MDPE) is characterized by relatively low branching and a density of from about 0.925 to about 0.94 g/cc. Unless otherwise indicated these terms have the above meaning throughout the description which follows.

The microwaveable articles according to the invention typically exhibit melting points from about 250 to about 330° F. and include mica in amounts from about 20 to about 35 weight percent. Most preferably mica is present at about 30 weight percent.

It has been found that C8 and C9 organic ketones correlate well with or are associated with undesirable odors in polypropylene/mica compositions. Accordingly, it is preferred that articles in accordance with the invention are substantially free from volatile C8 and C9 organic ketones. In order to avoid undesirable odors, articles in accordance with the invention are preferably prepared from a melt compounded polyolefin mica composition which is prepared at a process melt temperature of less than about 425° F.; with below about 400° F. being even more preferred. Optionally, the melt processed polyolefin/mica composition is melt compounded in a nitrogen atmosphere.

In another aspect of the invention there is provided a microwaveable, disposable food contact article having food contact compatible olfactory properties formed of a melt processed polyolefin/mica composition wherein said composition includes from about 40 to about 90 percent by weight of a polypropylene polymer and from about 10 to about 50 percent by weight mica and a basic organic or inorganic odor suppressing compound including the reaction product of an alkali metal or an alkaline earth element with carbonates, phosphates, carboxylic acids as well as alkali metal and alkaline earth element oxides and silicates and basic metal oxides, including mixtures of silicone dioxides with one or more of the following oxides: magnesium oxide, calcium oxide, barium oxide, and mixtures thereof.

Preferably the inventive articles are prepared from a melt compounded polyolefin/mica composition prepared by way of a low temperature compounding process.

A preferred low temperature compounding process used for producing polypropylene/mica melt compounded compositions including a basic odor suppressing agent having olfactory properties suitable for food contact applications in accordance with the invention includes the sequential steps of: (a) preheating a polypropylene polymer while maintaining the polymer below a maximum temperature of about 350° F. and more preferably below a maximum of about 260° F.; but suitably above about 240° F.; followed by; (b) admixing mica to said preheated polymer in an amount from about IO to about 50 percent weight based on the combined weight of the resin and mica and maintaining the mixture below about 425° F.; followed by, (c) extruding the mixture. Polymer may be melted exclusively through the application of shear, or the shear may be supplemented through heating by infrared radiation or ordinary heating coils or performed externally to the mixing chamber. Preferably, the basic odor suppressing agent is added simultaneously with the mica.

It is desirable to keep the duration of the step of admixing mica and a basic odor suppressant agent to the mixture relatively short so as not to generate compounds which cause odor and to preserve the particle size and aspect ratio of the mica. Accordingly, the step of admixing the mica should be no more than about five minutes with the duration of the admixing step of less than about three minutes being even more preferred. Any suitable means may be used to carry out the sequential process in accordance with the invention, however, the process is normally carried out in a batch mode in a mixing chamber provided with a pair of rotating rotors in an apparatus referred to in the industry as a Banbury type mixer. One may choose to use a twin screw extruder or a Buss kneader to practice the inventive process if so desired, provided that appropriate elements are used to minimize shear heating.

In a further aspect of the invention, there is provided a process for making pottery-like, micronodular, low-odor microwaveable containers. The inventive process is generally directed to a process for forming a microwaveable, disposable, rigid and strong, mica and basic inorganic or organic compound filled polyolefin containers having food contact compatible olfactory properties, the polyolefin being selected from the group consisting of polypropylene and polypropylene polyethylene copolymer or blend, and a mixture of these wherein the inorganic or organic compound is selected from the group consisting of calcium carbonate, sodium carbonate, potassium carbonate, barium carbonate, aluminum oxide, sodium silicate, sodium borosilicate, magnesium oxide, strontium oxide, barium oxide, zeolites, sodium phosphate, potassium phosphate, magnesium phosphate, sodium stearate, calcium stearate, potassium stearate, sodium citrate, potassium citrate, hydroxides of these elements, and mixtures of these organic compounds, mixtures of silicon dioxide with one or more of the following oxides: magnesium oxide, calcium oxide, barium oxide, and mixtures of one or more of the basic inorganic or organic compounds set forth herein. The process involves the steps of:

(a) forming an extrudable admixture of the polyolefin resin, mica, and the basic inorganic compound or basic organic compound;

(b) extruding the extrudable admixture of the polyolefin resin, mica, and the basic inorganic compound or the basic organic compound at elevated temperature;

(c) passing the resulting extruded admixture of the polyolefin resin and mica and the basic inorganic compound or the basic organic compound through a multiple roll stack, at least one roll of said stack having a matte finish;

(d) thermoforming the extruded admixture of the polyolefin, resin, mica, and the basic inorganic compound or organic compound; and (e) recovering a container having a micronodular surface and exhibiting a melting point of no less than 250° F.

The container is dimensionally stable and resistant to grease, sugar, and water at temperatures up to about 220° F. and has sufficient toughness to be resistant to cutting by serrated flatware. The amount of the basic inorganic compound or basic organic compound added is sufficient to reduce carbonyl moiety containing decomposition products to provide containers with suitable food contact compatible olfactory properties.

The process most preferably includes:

(a) forming an extrudable admixture of the polyolefin resin, mica, and the basic inorganic compound or basic organic compound;

(b) extruding the extrudable admixture of the polyolelfin resin and mica and the basic inorganic compound or the basic organic compound at elevated temperature;

(c) passing the resulting extruded admixture of the polyolefin resin and mica and the basic inorganic compound or the basic organic compound through a multiple roll stack, at least one roll of the stack having a matte finish;

(d) passing the extruded admixture of the polyolefin resin, mica, and basic inorganic compound or the basic organic compound at least partially around the roll having a matte finish;

(e) controlling the speed of the extrusion process, the size, temperature and configuration of the roll stack such that the surface of the extruded admixture of the polyolefin resin, mica, and the basic inorganic or organic compound not in contact with the matte roll has a coarse-grained structure;

(f) thermoforming the extruded admixture of the polyolefin, resin, mica, and the basic inorganic compound or organic compound; and (g) recovering a container having a micronodular surface and a rough surface and exhibiting a melting point of no less than 250° F.

The coarse-grained structure of the surface of the extruded admixture of the polyolefin resin, mica, and the basic inorganic compound or basic organic compound not in contact with said matte roll is formed by transversing the extruded admixture of the polyolefin resin, mica, and the basic inorganic compound or basic organic compound through a curvilinear path and at least partially solidifying the surface of the extruded admixture of polyolefin resin, mica, and the basic inorganic compound or basic organic compound not contacting said matte roll while that surface is in tension relative to the surface contacting said matte roll. The container may be a plate, a cup, a bowl, a tray, a bucket, a soufflé dish or the like.

Thermoforming is typically conducted at a sheet temperature of from about 260° to about 310° F., and more preferably at a temperature of from about 280° to about 300° F.

There is provided in a still further aspect of the invention a crack-resistant, thermoformed food contact article having a wall thickness ranging from about 10 to about 80 mils consisting essentially of from about 40 to about 90 weight percent of a polypropylene polymer, from about 10 to about 50 percent by weight mica, from about 1 to about 15 percent by weight polyethylene, from about 0.1 to about 5 weight percent titanium dioxide and optionally including a basic organic or inorganic compound. The basic compound is, generally speaking, the reaction product of an alkali metal or alkaline earth element with carbonates, phosphates, carboxylic acids as well as alkali metal and alkaline earth element oxides, hydroxides, or silicates and basic metal oxides, including mixtures of silicone dioxide with one or more of the following oxides: magnesium oxide, calcium oxide, barium oxide, and mixtures thereof. A particularly preferred article is where the basic organic or inorganic compound is calcium carbonate which is present in an amount of from about 5 to about 20 weight percent.

Polyethylene is more typically present from about 2.5 to about 15 weight percent. preferably from about 4 to about 5 weight percent of the crack resistant article.

Titanium dioxide is included in various amounts, from about 0.1 to about 3 percent by weight being typical; from about 0.25 to 2 percent titanium dioxide may be included. Preferably, titanium dioxide is included in at least 0.5 percent by weight.

The caliper, or wall thickness, of the articles is usually from about 0.010 to about 0.050 inches or from about 10 mils to 50 mils. A caliper of from about 15 to 25 mils is most typically employed.

While any suitable polypropylene polymer may be employed, the most preferred polymer is isotactic polypropylene having a melt index in the range of from about 0.3 to 4, with a melt index of about 1.5 being typical. The polyethylene employed may be HDPE, LLDPE, LDPE or MDPE, mixtures thereof or a polyethylene with bimodal molecular weight distribution. Polypropylene is sometimes referred to hereafter as "PP".

The inventive compositions from which the crack resistant articles are made do not include coupling agents such as maleic anhydride containing polypropylene as further described herein, but may optionally include other components which do not alter the basic and novel characteristics of the crack-resistant plates. For example, nucleants such as sodium benzoate in amounts detrimental to crack resistance are to be avoided.

BRIEF DESCRIPTION OF THE DRAWINGS

The present invention will become more fully understood from the detailed description given herein below and the accompanying drawings, which are given by way of illustration only, and thus, are not limitative of the present invention and wherein.

DETAILED DESCRIPTION OF THE INVENTION

The aesthetically pleasing microwaveable disposable, rigid and strong containers including plates, bowls, cups, trays, buckets, soufflé dishes and lids comprise isotactic polypropylene, propylene-ethylene copolymer, or blends of isotactic polypropylene and propylene-ethylene copolymer coupled with a mixture of a platy inorganic mineral such as mica and basic inorganic or organic compounds which are the reaction product of an alkali metal or alkaline earth element with carbonates, hydroxides, phosphates, carboxylic acids, mixtures of silicon dioxide with one or more of the following oxides: magnesium oxide, calcium oxide, barium oxide, and mixtures of one or more of the basic organic or inorganic compounds set forth herein.

Suitably the basic inorganic or organic compounds are selected from the group consisting of calcium carbonate, sodium carbonate, potassium carbonate, barium carbonate, sodium silicate, sodium borosilicate, magnesium oxide, strontium oxide, barium oxide, zeolites, sodium phosphate, potassium phosphate, magnesium phosphate, mixtures of silicon dioxide with one or more of the following oxides: magnesium oxide, calcium oxide, barium oxide, and mixtures of these or other basic inorganic or organic compounds such as sodium stearate, calcium stearate, potassium stearate, sodium citrate, potassium citrate, and mixtures of these basic organic compounds.

The function of the basic inorganic compound or organic compound is to minimize the formation of odor-causing compounds in the mica/polyolefin composition and thus provide products with food contact compatible olfactory properties for consumer use. In this connection, the amount of the basic inorganic compound or organic compound added is controlled to be sufficient to reduce formation of decomposition products to sufficiently low levels to provide containers and plates with suitable food contact compatible olfactory properties. Suitably 5 to 15 weight percent of the container comprises the basic inorganic compound, advantageously about 8 to 12 percent. When the basic organic compounds are used, lower quantities are required, suitably from about 0.5 to 2.5 weight percent, advantageously 1.0 to 1.5 percent. Coupling agents and pigments may be utilized. Maleic anhydride and acrylic modified polypropylenes are suitable coupling agents for some embodiments.

Figure 1:
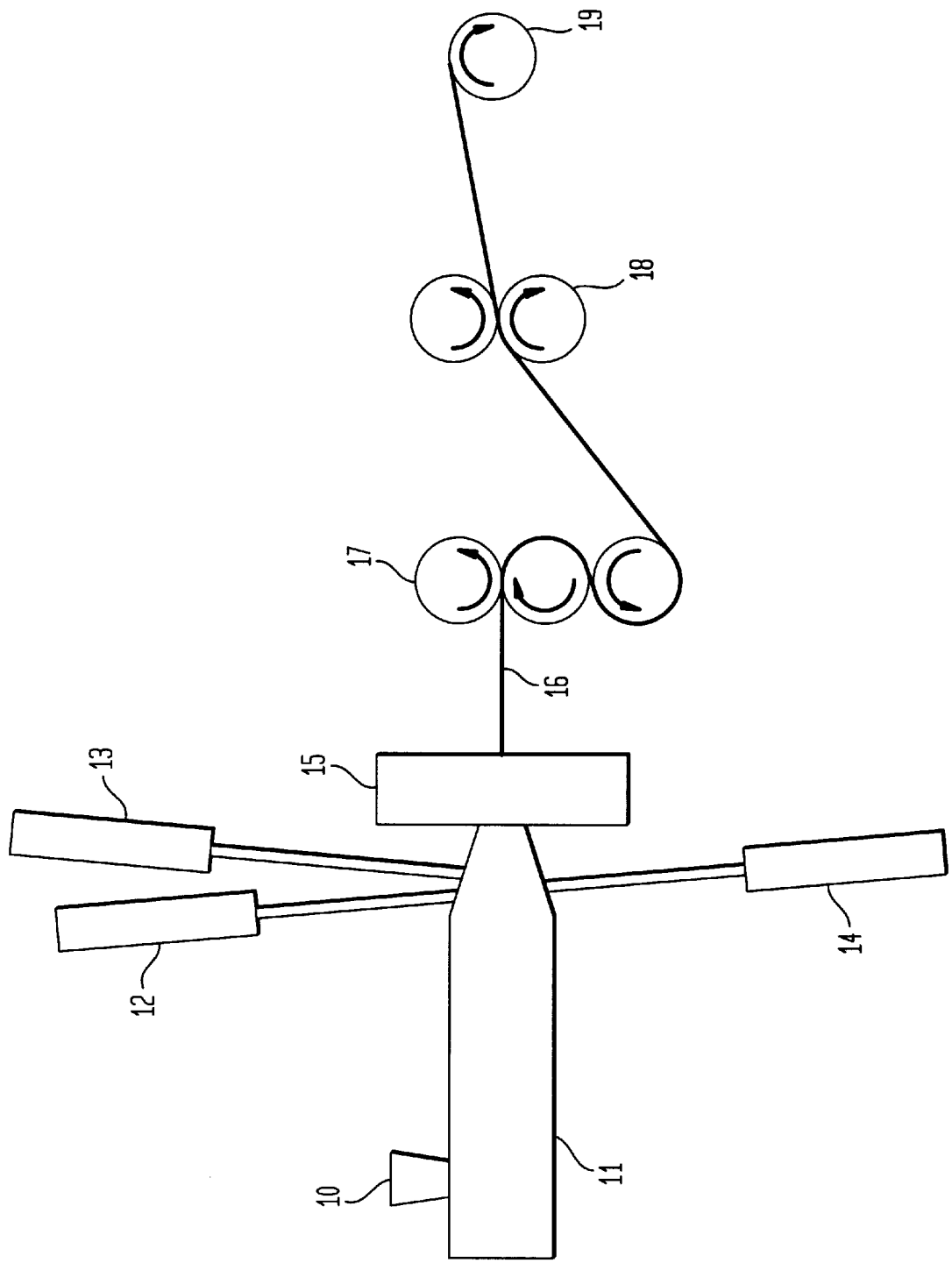
FIG. 1 is a schematic flow diagram of the sheet extrusion process.
Figure 2:
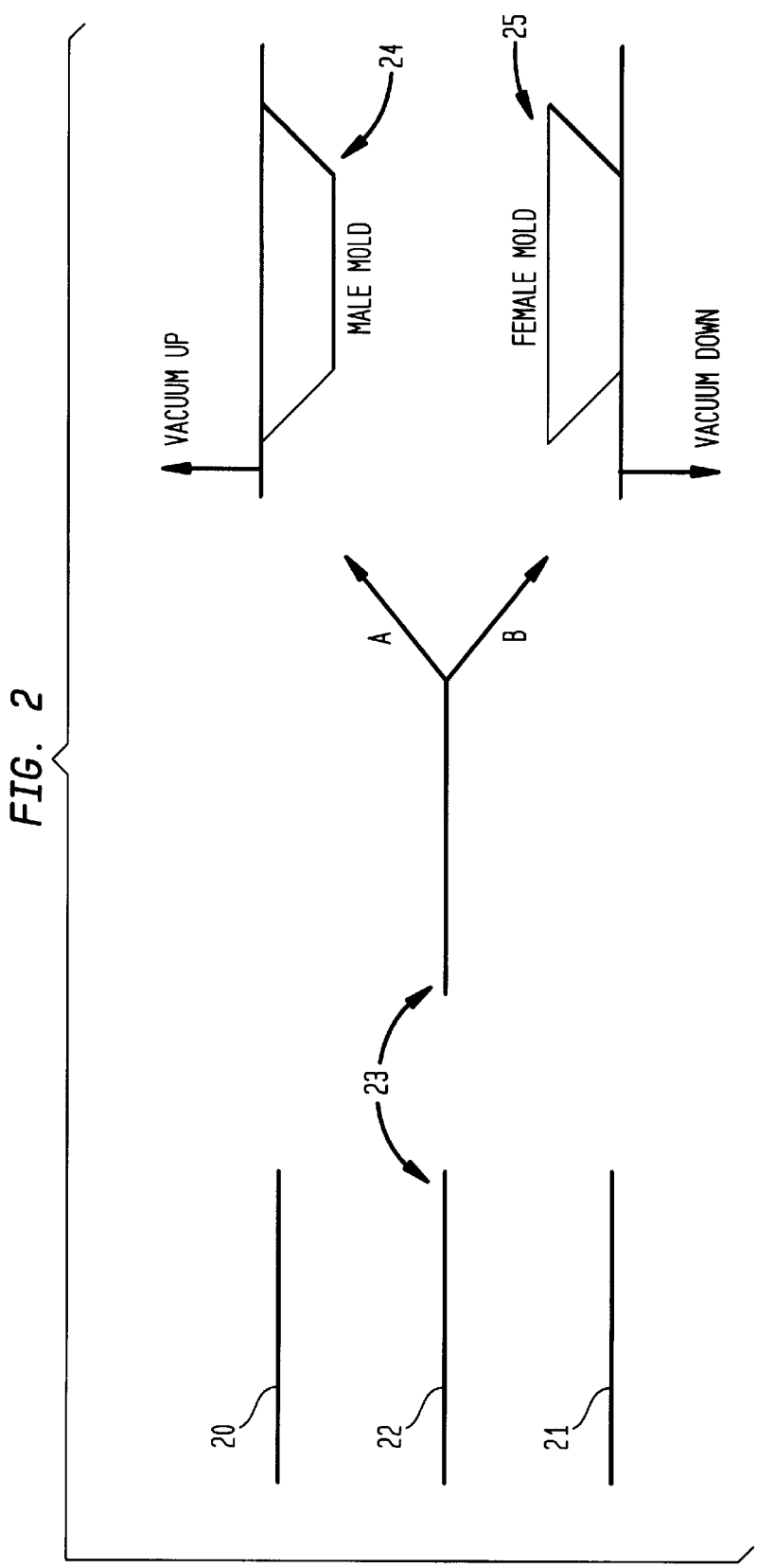
FIG. 2 is a schematic flow diagram of the thermoforming process for the manufacture of plates and containers having a micronodular surface.

The containers, bowls, trays and plates of this invention are preferably produced by compounding a suitable resin/mica composition; forming it into a sheet as shown in FIG. 1 and then thermoforming the sheet as shown in FIG. 2. These examples are illustrative and are not limitative of a preferred commercial process which involves in-line extrusion with regrind and thermoforming with multi-cavity mold beds.

Advantageously, the sheet is formed by an extrusion process utilizing the compounded polymer/mica basic inorganic compound or basic organic compound mixtures. The final extrusion process renders a sheet with excellent thermal properties, cut resistance, and food contact compatible olfactory properties. Generally, injection molding is inherently not suitable for the manufacture of self-texturized micronodular containers, bowls, trays and plates, since injection molded products are smooth plastic like articles which do not exhibit a micronodular surface or have the feel of stoneware or pottery-like look.

The aesthetically pleasing disposable microwaveable containers, trays, bowls and plates exhibit (a) food contact compatible olfactory properties, and (b) a melting point of at least 250° F. In addition, the container or plate is dimensionally stable and resistant to grease, sugar, and water at temperatures of up to about 220° F. and are of sufficient toughness to be resistant to cutting by serrated polystyrene flatware. The preferred mica and basic inorganic compound or the basic organic compound filled polypropylene plates, besides exhibiting food contact compatible olfactory properties, exhibit on at least one side a micronodular surface and a thickness uniformity characterized by a thickness coefficient of variation (COV) of less than about five percent.

Mica is a common name for naturally occurring inert mineral of the phyllosilicate chemical family, specifically potassium aluminosilicate whereby the aluminum ions may be partially replaced by iron and magnesium and part of the chemically bound water may be substituted by fluorine.

Mica is easily cleaved into thin, relatively regular, flexible yet strong sheets (leaf-like flakes) with thickness in the range of half a micron and aspect ratio as high as 300. Mica is much softer than other inorganic fillers (wollastonite, glass) yet only slightly harder than talc. Mica has a slippery tactile feel and low abrasiveness relative to other common inorganic fillers.

The reinforcement effect at 40 weight percent mica is equivalent to that of 30 weight percent glass fiber. Hard inorganic fibrous fillers such as glass (various lengths) and wollastonite (acicular structures) have serious drawbacks such as abrasiveness and are prone to fracture degradation during conventional melt processing. Other fibrous (organic) fillers are derived from wood and vegetable sources and are not suitable for use in the manufacture of the containers of this invention since the organic fillers, when used in substantial amounts, tend to degrade during processing and they are also moisture sensitive. Preferably about 20 to 35 weight percent mica are used.

In some applications it may be preferred to treat the mica and/or basic inorganic compounds prior to using them in the inventive articles. A suitable compound for this treatment is amino-silane; sometimes referred to as a "coupling" agent.

Suitable basic inorganic and organic compounds used in the process include: calcium carbonate, sodium carbonate, sodium hydroxide, potassium carbonate, barium carbonate, aluminum oxide, sodium silicate, sodium borosilicate, magnesium oxide, strontium oxide, barium oxide, zeolites, sodium phosphate, potassium phosphate, magnesium phosphate, mixtures of silicon dioxide with one or more of the following oxides: magnesium oxide, calcium oxide, barium oxide, and mixtures of these or other basic inorganic or organic compounds such as sodium stearate, calcium stearate, potassium stearate, sodium citrate, potassium citrate, and mixtures of these basic compounds.

In the case where microwaveability is desired for a plastic disposable food contact article, the not so perfect solution has been the use of relatively expensive high heat modified polystyrene based or heat resistant materials (e.g., unfilled PPO and SMA engineering resins), where PPO refers to polyphenylene oxide and SMA refers to styrene-maleic anhydride copolymer.

The mica and basic inorganic compound or basic organic compound filled polypropylene containers, bowls, trays and plates of this invention have overcome the disadvantages of the prior art type containers, bowls, trays and plates and are significantly superior to them.

Mica and the basic inorganic compound or the basic organic compound filled polypropylene is compounded by pre-blending the polypropylene in pellet or flake form with mica powder and the basic inorganic compound or the basic organic compound powder and other additives (color concentrates, pigments, antioxidants, lubricants, nucleating agents, antistatic agents, etc.). This mixture is conveyed into the feed section addition point of a twin screw compounding extruder, or compounded in a Banbury-type mixer to provide a melt-processed polyolefin composition. Alternatively, the components are advantageously fed separately into the same or different points of addition, using combinations of volumetric and/or gravimetric (i.e., loss in weight type) feeders as further described herein.

For white pigmentation, titanium dioxide is preferred due to combination of brightness, and opacity, as well as stability during processing and final use. Surface treatment may be optionally used to further enhance wetting, dispersion, compatibility with matrix resins whereas the titanium dioxide forms may be of the rutile or anatase type. Alternate white pigments may also consist of calcined clay or blends of calcined clay with titanium dioxide. For black-pigmentation, carbon black is preferred due to a combination of desirable characteristics such as blackness, and dispersibility, the latter of which can be carefully controlled by choice of particle size and surface chemistry. Carbon black is amorphous carbon in finely divided form which is made by either the incomplete combustion of natural gas (channel black) or by reduction of liquid hydrocarbons in refractory chambers (furnace black).

A twin screw extruder provides sufficient mixing action to effectively cause the wetting and dispersion of the filler into the polymer matrix. The twin screw extruder may be of the co-rotating or counter-rotating type, where each type is equipped with different screw flight elements which are appropriate for the feed, mixing, and melt metering zones. The discharge zone normally consists of a strand die where the exiting molten material strands are quenched in a circulating water bath followed by knife cutting into pellets. In a particularly preferred embodiment, a Banbury-type mixer is used for compounding the resin, mica and basic compound as further described herein.

Low molecular weight additives such as waxes, fluorinated polymers, and other specialty lubricants are suitably used as process aids to reduce the melt viscosity and improve throughput. Polyethlene resin may also be added to the blend. Other additives may include nucleating agents and antistatic agents. Antioxidants may be added in small amounts, generally less than one weight percent, to minimize shear and thermal degradation of the polypropylene during the extrusion and forming processes as well as to promote the chemical stability of the sheet prior to and during final article use. Suitable antioxidants are advantageously selected from the group of phenolics and phosphites and blends thereof. These are produced by Ciba-Geigy and General Electric Corporation.

Plastic sheet extrusion equipment is suitable for the manufacture of multilayered or single layered mica and the basic inorganic or organic compound filled sheets of a polyolefin selected from the group consisting of polypropylene, polypropylene/polyethylene copolymer or blend, and mixtures of these. Melt strength of the sheets is improved when mica is used as a filler since geometry of the mineral in the form of high aspect ratio flakes serves to provide "inter-particle connectivity" or physical crosslinking. The food contact compatible olfactory properties are enhanced when in addition to the mica, basic inorganic compounds or organic compounds such as calcium carbonate, sodium carbonate, potassium carbonate, barium carbonate, sodium silicate, sodium borosilicate, magnesium oxide, strontium oxide, barium oxide, zeolites, sodium phosphate, potassium phosphate, magnesium phosphate, mixtures of silicon dioxide with one or more of the following oxides: magnesium oxide, calcium oxide, barium oxide, and mixtures of these or other basic inorganic or organic compounds such as sodium stearate, calcium stearate, potassium stearate, sodium citrate, potassium citrate, and mixtures of these are mixed with mica and the polyolefin to produce the containers of this invention.

In FIG. 1 a process is shown for the manufacture of a single layer mica filled polypropylene sheet or polypropylene filled with mica and basic inorganic compounds or organic compounds set forth hereinabove. Previously compounded and pelletized mixtures of polypropylene, mica and the basic inorganic compound or organic compound, and other additives are gravity fed by a hopper 10 into the feed zone of a single screw extruder system. Primary extruder 11 has a 2 inch diameter screw with a 24/1 length to diameter ratio. Optionally multilayer coextruded sheet can be produced by utilizing at least one additional single screw extruder 12,13,14 in conjunction with a combining feedblock with proper melt piping and manifold arrangements. Suitably one to seven screw extruders are employed, preferably three. A flexible lip flat sheet die 15 having a width of 31 inches was used.

The sheet of this invention 16 enters the sheet takeoff portion (i.e., after the molten material exits the die) comprising a three-roll polishing/casting unit 17 with individually temperature controlled rolls, a two-rubber roll sheet pull unit 18, and a dual turret, dual shaft winder, whereby only one shaft winder roll 19 may be used. The three takeoff units were mechanically tied together, were on a common track, and can be automatically traversed from close die lip proximity to about 36 inch distant. During the extrusion process, the distance between the die exit and the casting unit was maintained at 2 inches. These three chrome rolls comprising the sheet casting unit are individually temperature controlled by integral oil circulating pumps and heat exchangers. Nip gaps are adjustable. A speed differential between cast rolls and pull rolls is normally maintained such that pull roll speed is approximately within ten percent (10%) of cast roll speed. On a pilot line, achievable line speeds are in the range of 1–12.5 feet per minute; while for a sheet on the order of 20 mil thick, the line speed is about 5–6 feet per minute. The sheet is wound on a roll 19. Table 1 shows the sheet process conditions employed for the sheet extrusion of mica and basic inorganic compound or the basic organic compound filled polypropylene and the unfilled polypropylene control. In a commercial operation, the speed is increased by a factor of 10 to 20 times.

Thermoforming is the pressing or squeezing of pliable material into final shape. In the simplest form, thermoforming is the draping of a softened sheet over a shaped mold. In the more advanced form, thermoforming is the automatic, high speed positioning of a sheet having an accurately controlled temperature into a pneumatically actuated forming station whereby the article's shape is defined by the mold, followed by trimming and regrind collection.

Forming techniques other than conventional thermoforming are also suitable for the manufacture of articles described in the present invention. These include variations such as presoftening the extruded sheet to temperatures below the final melting temperature, cutting flat regions (i.e., blanks) from the sheet, transfer of blanks by gravity or mechanical means into matched molds whereby the blanks are shaped into the article by heat and pressure. The sheet from which the blanks have been cut out is collected as regrind and is recyclable. Conventional paperboard pressing equipment and corresponding forming tooling is optionally modified to produce articles of this invention.

The extruded sheet used in a preferred thermoforming process as shown in FIG. 2 has a thickness of about 0.010 to 0.080 inches (10 to 80 mils), suitably 0.010 to 0.050 inches. For the plates the preferred thickness is about 0.015 to 0.025 inches. Suitable mica filler loading level in the extruded sheet is in the range of 10 to 50 weight percent, more preferably 20–50 weight percent and most preferably 20–35 weight percent. To achieve suitable food contact compatible olfactory properties, the basic inorganic compound loading level should be 5 to 15 weight percent, advantageously 8 to 12 weight percent. For the basic organic compound the loading levels should be 0.5 to 2.5 weight percent, preferably 1.0 to 1.5 weight percent. The mica flake aspect ratio is in the range of 30–300, more preferably 15–250, with particle size range of about 10–500 microns. The extruded sheet comprises isotactic polypropylene homopolymer or polypropylene polyethylene copolymer or blend or a mixture of these as base resin, preferably having a melt flow index in the range from about 0.3 to about 4.0, more preferably 0.5–2.0 and most preferably about 1.5. Propylene copolymers or blends with ethylene levels in the range of 1–10 mole percent, more preferably 2–5 mole percent, are optionally used.

The preferred type of mica is muscovite, which is the most common form in commerce. Optionally other less common mica types such as phlogopite, biotite and fluorphlogopite are used. Although there are an infinite number of compositions possible for these four generic types due to isomorphous substitution which are mine specific, the selection of particular grades is driven by particle aspect ratio, particle size, price and availability.

Suitably the extruded sheet includes coloring agents for aesthetic appeal, preferably titanium dioxide, carbon black, and other opacifying agents in the range of 0.5–8 weight percent based on total composition, preferably 1.5 to 6.5 weight percent. The extruded sheet comprises minor amounts of other additives such as lubricants and antioxidants. These articles of manufacture may be suitably colored with pigments or dyes. Pigments are defined as small insoluble organic or inorganic particles dispersed in the resin medium to promote opacity or translucency. Usual pigments include carbon black, titanium dioxide, zinc oxide, iron oxides, and mixed metal oxides. Dyes are organic and soluble in the plastic, and may be used alone or in combination with pigments to brighten up pigment based colors. All such colorants may be used in a variety of modes which include dry color, conventional color concentrates, liquid color and precolored resin.

Mica and the basic inorganic compound or the basic organic compound filled polypropylene sheets are suitably formed into plates, bowls, cups, trays, buckets, soufflé dishes, and containers using a forming or thermoforming process disclosed herein. In a pilot process, these articles of manufacture and containers may be made using the Comet Starlett thermoformer unit. This machine is capable of vacuum forming products from heat softened thermoplastic materials and is schematically depicted in FIG. 2. Sheet portions 23 having dimensions of 17.5 inches by 16.25 inches were clamped on two opposing sides and inserted into an oven indicated at 22 equipped with upper 20 and lower 21 heaters, whereby heater input settings were in the range of 20–30 percent and hold times were on the order of 60–80 seconds. Under these conditions, the oven air temperature as recorded by a digital thermocouple was in the range of 221° F. to 225° F., while the sheet surface temperature, as recorded by adhering indicator thermocouples, was approximately 330° F. to 340° F.

When the clamped and heat softened sheet 23 exits the oven 22, it may be vacuum formed by either procedure (A) or (B) in a commercial process. Both methods utilize only one mold which is suitably fabricated from epoxy thermoset materials or suitable mold materials including aluminum, steel, beryllium, copper and the like. Mode (A) uses a male mold 24 whereby the sheet is sucked up to conform to it by means of vacuum where the vacuum ports are present on the mold base as well as on the periphery side of the container (i.e., flange area). Mode (B) arrangement is such that the vacuum direction is opposite to mode (A), where again vacuum holes are located around the base and periphery. In the case of mode (B), a female mold 25 is used, and this arrangement is preferred since the air side of the sheet corresponds to the food contact side. In mode (B) the food contact side undergoes a beneficial texturizing effect as a result of the heat treatment, whereby the resin flows around and outward from the mica particles close to the surface causing the mineral to become more exposed which creates a micronodular surface as manifested by decreased gloss and increased surface roughness. The micronodular surface gives the container a stoneware or pottery-like appearance.

Suitably a process for forming a disposable, microwaveable, rigid and strong mica and the basic inorganic compound or the basic organic compound filled polyolefin container, plate, bucket, or the like, having food contact compatible, olfactory properties wherein the polyolefin is selected from polypropylene, polypropylene polyethylene copolymer or blend and the basic inorganic compound and the basic organic compound is selected from the group consisting of calcium carbonate, sodium carbonate, potassium carbonate, barium carbonate, aluminum oxide, sodium silicate, sodium borosilicate, magnesium oxide, strontium oxide, barium oxide, zeolites, sodium phosphate, potassium phosphate, magnesium phosphate, mixtures of silicon dioxide with one or more of the following oxides: magnesium oxide, calcium oxide, barium oxide, and mixtures of these or other basic inorganic or organic compounds such as sodium stearate, calcium stearate, potassium stearate, sodium citrate, potassium citrate and mixtures of these comprise the steps of:

(a) forming an extrudable admixture of the polyolefin resin, mica, and the basic inorganic compound or the basic organic compound;

(b) extruding said extrudable admixture of the polyolefin resin, mica and the basic inorganic compound or the basic organic compound at elevated temperature;

(c) passing the resulting extruded admixture of the polyolefin resin, mica and the basic inorganic compound or the basic organic compound through a multiple roll stack, at least one roll of said stack having a matte finish;

(d) passing said extruded admixture of the polyolefin resin and mica and the basic inorganic compound or the basic organic compound at least partially around said roll having a matte finish;

(e) controlling the speed of said extrusion process, the size, temperature and configuration of said roll stack such that the surface of said extruded admixture of polyolefin resin, mica and the basic inorganic compound or the basic organic compound not in contact with said matte roll has a coarse-grained structure; and (f) thermoforming said extruded admixture of polyolefin, mica and the basic inorganic compound or the basic organic compound and recovering a container, plate, bucket, or the like, having a micronodular surface and a rough surface, exhibiting a melting point of no less than about 250° F.; the container, plate, bucket, etc., being dimensionally stable and resistant to grease, sugar and water at temperatures up to about 220° F. and having sufficient toughness to be resistant to cutting by serrated flatware and exhibiting food contact compatible olfactory properties.

Advantageously, the coarse-grained structure of the surface of said extruded admixture of polyolefin resin, mica and the basic inorganic compound or the basic organic compound not in contact with said matte roll is formed by transversing the extruded admixture of the polyolefin resin, mica and the basic inorganic compound or the basic organic compound through a curvilinear path and at least partially solidifying the surface of said extruded admixture of polyolefin resin, mica and the basic inorganic compound or the basic organic compound not contacting said matte roll while that surface is in tension relative to the surface contacting the matte roll.

Generally, a process for forming a mica basic inorganic compound or basic organic compound filled polypropylene container, plate, bucket, tray, bowl, or the like, comprises the steps of:

(a) forming an extrudable admixture of the polypropylene resin, mica and the basic inorganic compound or the basic organic compound;

(b) extruding said extrudable admixture of the polypropylene resin, mica and the basic inorganic compound or the basic organic compound at elevated temperature;

(c) passing the resulting extruded admixture of the polypropylene resin, mica and the basic inorganic or the basic organic compound through a multiple roll stack, at least one roll of said roll stack having a matte finish;

(d) passing said extruded admixture of the polypropylene resin, mica and the basic inorganic compound or the basic organic compound at least partially around said roll having a matte finish;

(e) controlling the speed of said extrusion process, the size, temperature and configuration of said roll stack such that the surface of said extruded admixture of the polypropylene resin, mica and the basic inorganic compound or the basic organic compound in contact with said matte roll has a matted structure; and (f) thermoforming said extruded admixture of polypropylene resin, the mica and the basic inorganic compound or the basic organic compound, and recovering a container, plate, bucket, or the like having a micronodular surface and exhibiting a melting point of no less that 250° F., the container, plate, bucket, or the like being dimensionally stable and resistant to grease, sugar and water at temperatures up to about 220° F. and having sufficient toughness to be resistant to cutting by serrated flatware and further exhibiting food contact compatible olfactory properties.

A process for forming a mica and the basic inorganic compound or the basic organic compound filled polypropylene sheet suitable for thermoforming micronodular containers and plates comprises the steps of:

(a) forming an extrudable admixture of the polypropylene resin, mica and the basic inorganic compound or the basic organic compound;

(b) extruding said extrudable admixture of the polypropylene resin, mica and the basic inorganic compound or the basic organic compound at elevated temperature;

(c) passing the resulting extruded admixture of the polypropylene resin, mica and the basic inorganic compound or the basic organic compound through a multiple roll stack, at least one roll of said roll stack having a matte finish;

(d) passing said extruded admixture of the polypropylene resin, mica and the basic inorganic compound or the basic organic compound at least partially around said roll having a matte finish;

(e) controlling the speed of said extrusion process, the size, temperature and configuration of said roll stack such that the surface of said extruded admixture of the polypropylene resin, mica and the basic inorganic compound or the basic organic compound not in contact with said matte roll has a coarse structure; and (f) the surface in contact with the matte roll has a matte surface; and (g) recovering a sheet having a matted surface and a coarse surface, said sheet comprising polypropylene, mica and the basic inorganic compound or the basic organic compound moieties. The sheet has food contact compatible olfactory properties.

Advantageously, other thermoforming arrangements are suitable and may be preferred in conventional sheet and web feed thermoforming commercial production operations. Alternative arrangements include the use of drape, vacuum, pressure, free blowing, matched die, billow drape, vacuum snap-back, billow vacuum, plug assist vacuum, plug assist pressure, pressure reverse draw with plug assist vacuum, reverse draw with plug assist, pressure bubble immersion, trapped sheet, slip, diaphragm, twin-sheet cut sheet, twin-sheet rollfed forming or any suitable combinations of the above. Details are provided in J. L. Throne's book, Thermoforming, published in 1987 by Coulthard. Pages 21 through 29 of that book are incorporated herein by reference. Suitable alternate arrangements also include a pillow forming technique which creates a positive air pressure between two heat softened sheets to inflate them against a clamped male/female mold system to produce a hollow product. Metal molds are etched with patterns ranging from fine to coarse in order to simulate a natural or grain like texturized look. Suitably formed articles are trimmed in line with a cutting die and regrind is optionally reused since the material is thermoplastic in nature. Other arrangements for productivity enhancements include the simultaneous forming of multiple articles with multiple dies in order to maximize throughput and minimize scrap.

Various measurements used herein include melt flow index, SSI rigidity (sometimes referred to below as simply "rigidity"), Parker Roughness and so forth. Unless otherwise indicated explicitly or by context, these terms have the meaning set forth below.

The melt flow rate (MFR) or melt index is a common and simple method for determining the flow properties of molten polymers. (As used herein, ASTM D 1238-95, Condition 230/2.16). Resin is introduced and melted in a cylindrical space. After temperature equilibration is reached, a weight is used to push a plunger vertically downward whereby the resin is extruded through a narrow orifice. The usual test temperature and the temperature utilized herein for polypropylene is 230° C. and the load is 2.16 Kg. Extruded material is collected and weighed and the time required to extrude a specific weight is recorded. MFR or melt index is expressed as grams per minutes, or grams per 10 minutes, which is the weight of material extruded in a 10 minute time period. MFR is inversely proportional to both polymer viscosity and polymer molecular weight.

SSI rigidity is measured with the Single Service Institute Plate Rigidity Tester originally available through Single Service Institute, 1025 Connecticut Ave., NW. Washington, D.C. The SSI Rigidity test apparatus has been manufactured and sold through Sherwood Tool, Inc., Kensington, Conn. This test is designed to measure the rigidity (i.e. resistance to buckling and bending) of paper and plastic plates, bowls, dishes, and trays by measuring the force required to deflect the rim of these products a distance of 0.5 inch while the product is supported at its geometric center. Specifically, the plate specimen is restrained by an adjustable bar on one side and is center fulcrum supported. The rim or flange side opposite to the restrained side is subjected to 0.5 inch deflection by means of a motorized cam assembly equipped with a load cell, and the force (grams) is recorded. SSI rigidity is expressed as grams per 0.5 inch deflection. A higher SSI value is desirable since this indicates a more rigid product. All measurements were done at room temperature and geometric mean averages for the machine and cross machine direction are reported.

The Parker Roughness method was used to determine roughness using the Messmer Parker Print-Surf Roughness. Operation procedure details are referenced in the Messmer Instruments Ltd. User manual for the instrument (Model No. ME-90) which is distributed by Huygen Corporation. The flat specimen is clamped under 1 Mpa pressure against a narrow annular surface by a soft backing and the resistance of air flow of the gap between the specimen and the annulus is measured. The air flow is proportional to the cube of the gap width and the roughness is expressed as the root mean cube gap in units of micrometers. Higher Parker roughness values indicate higher degrees of surface roughness.

Gloss is reported as "gloss units at 75 or 60 degrees." Gloss measurements were conducted following TAPPI Standard Method T-480-OM 92.

The following examples are illustrative of the present invention. It should be understood that the examples are not intended to limit the invention and that various modifications may be made by those skilled in the art without changing the essential characteristics of the invention.

EXAMPLES 1–8

Mica filled polypropylene sheets (20 mil) and unfilled polypropylene sheets (22 mil) were extruded, as shown and described in connection with in FIG. 1, with conditions specified in Table 1. These extrusion process conditions may be varied as necessary to produce sheets which are of acceptable quality. Specifically, the operable temperature ranges for barrel zones 1,2, and 3 are about respectively, 350 to 425° F., and 450 to 500° F. the adaptor, feedblock, and die temperatures can all be in about the range of 450 to 500° F. the range of values for extruder drive amperes, extruder speed, melt pressure, die pressure, chill roll temperature, and line speed are about respectively, 12 to 20 amp., 60 to 100 RPM, 1500 to 2500 psi, 450 to 650 psi, 120 to 140° F., and 3 to 8 FPM. Sheets are subsequently vacuum thermoformed into plates and other containers and lids as set forth in FIGS. 14 through 33. There is reported in Tables 2 and 3, respectively, rigidity values and caliper data for the sidewall, bottom, and flange (rim) areas of vacuum formed plates using condition (B) of FIG. 2 and having a diameter of 10.25 inches. In each table, individual rigidity values are shown for each specimen. In addition, the caliper uniformity for sidewall, bottom, and flange areas are reported for each specimen, along with the summary statistics. Specifically, the caliper of each plate specimen in Tables 2 and 3 was measured ten times using a Fowler gauge for each of the three regions of interest consisting of the sidewall, bottom, and flange areas, and the average value for each plate specimen is reported along with the corresponding standard deviation in thousands of inches or mils (i.e., individual plate statistics). In the case of the three plates of Table 2, the caliper summary statistics (expressed in the average properties row) were obtained on the basis of averaging 30 measurements, wherein the standard deviation is reported for each of the three regions of interest. In the case of the five plates of Table 3, the caliper summary statistics were calculated on the basis of averaging 50 measurements where again the standard deviation is reported for each of the three regions of interest. Therefore, the caliper data of Tables 2 and 3 located in the average property rows pertain to global statistics rather than individual plate statistics. The caliper uniformity parameter consists of the coefficient of variation (COV) which is calculated as the standard deviation of caliper divided by the mean caliper, whereas the ratio is multiplied by 100, whereas the above described global averages and associated standard deviations are employed. A lower COV value is desirable since it signifies improved caliper uniformity for mica filled polypropylene plates with respect to unfilled polypropylene plates. Tables 2 and 3 show that mica reduces COV of polypropylene from 9.9 to 4.3 in sidewall and from 9.6 to 2.0 in the flange area. Therefore, caliper uniformity in sidewall improved by more than a factor of 2 and caliper uniformity in the flange improved by over a factor of 4. The improvement of caliper uniformity is critical for promoting plate dimensional stability during food transport and microwave cooking operations. In great contrast to mica filled polypropylene plates, the unfilled polypropylene plates exhibited poor quality as evidenced by poorly defined rim area, and sharkskin, very rough surface. These data demonstrate that mica greatly improves the drawability of polypropylene as evidenced by improved caliper uniformity, as well as improved thermoformability, both of which are due to enhanced melt strength relative to unfilled polypropylene. Mica is the preferred reinforcing mineral filler for enhancing the melt strength because of its highly regular, high aspect ratio morphology which can be thought of as resulting in "inter-particle connectivity" or "physical cross-linking". The significant reinforcing effect of mica is also evidenced by a SSI plate rigidity value of 671 grams per 0.5 inches for PP/mica at a basis weight of about 350 lbs. per square foot ream versus 342 grams per 0.5 inches for unfilled PP at a basis weight of about 280 lbs. per 3000 square foot ream.

TABLE 1

Sheet Extrusion Conditions for Mica Filled Polypropylene and Unfilled Polypropylene

| CONDITION | PP/MICA | UNFILLED PP |
| --- | --- | --- |
| Barrel Zone 1 (° F.) | 395 | 395 |
| Barrel Zone 2 (° F.) | 425 | 425 |
| Barrel Zone 3 (° F.) | 475 | 475 |
| Adaptor (° F.) | 470 | 450 |
| Feed block (° F.) | 470 | 460 |
| Die Zones 1–3 (° F.) | 470 | 475 |
| Extruder RPM | 80 | 70 |
| Drive amperes | 16 | 19 |
| Melt pressure (psi) | 1700 | 1780 |
| Die pressure (psi) | 550 | 825 |
| Line speed (FPM) | 6.1 | 5.0 |
| Chill roll temp. (° F.) | 130 | 137 |

TABLE 2

Caliper and Rigidity Data for 10-¼ Inch Plates Thermoformed From Unfilled Polypropylene Sheet

| Plate Specimen Example | Rigidity (g/0.5 in.) | Sidewall Caliper (mil) | Bottom Caliper (mil) | Flange Caliper (mil) |
| --- | --- | --- | --- | --- |
| 1 | 364 | 18.7 ± 1.9 | 20.7 ± 0.8 | 22.9 ± 2.8 |
| COV* | | 10.1 | 3.9 | 12.2 |
| 2 | 382 | 19.2 ± 20. | 20.6 ± 0.4 | 23.3 ± 0.8 |
| COV | | 10.4 | 1.9 | 3.4 |
| 3 | 280 | 19.6 ± 1.9 | 20.6 ± 0.5 | 23.3 ± 2.8 |
| COV | | 9.7 | 2.4 | 12.0 |
| Average Properties | 342 ± 54.4 | 19.19 ± 1.89 | 20.64 ± 0.58 | 23.15 ± 2.21 |
| COV | | 9.85 | 2.81 | 9.55 |

COV = Coefficient of Variation

TABLE 3

Caliper and Rigidity Data for 10-¼ inch Plates Thermoformed From Polypropylene/Mica/TiO₂ Sheet

| Plate Specimen Example | Rigidity (g/0.5 in.) | Sidewall Caliper (mil) | Bottom Caliper (mil) | Flange Caliper (mil) |
|---|---|---|---|---|
| 4 | 705 | 18.3 ± 1.1 | 17.4 ± .05 | 18.2 ± 1.0 |
| COV* | | 6.0 | 2.9 | 5.5. |
| 5 | 659 | 17.0 ± 1.5 | 17.9 ± 0.7 | 18.4 ± 0.5 |
| COV | | 8.8 | 3.9 | 2.7 |
| 6 | 654 | 17.3 ± 1.6 | 17.0 ± 10.6 | 18.2 ± 0.7 |
| COV | | 9.2 | 3.5 | 3.8 |
| 7 | 669 | 16.9 ± 1.2 | 16.7 ± 1.1 | 18.9 ± 0.8 |
| COV | | 7.1 | 6.6 | 4.2 |
| 8 | 668 | 16.3 ± 1.0 | 16.3 ± 0.9 | 19.0 ± 0.9 |
| COV | | 6.1 | 5.5 | 4.7 |
| Average Properties | 671 ± 20 | 17.3± 0.76 | 17.1 ± 0.6 | 18.5 ± 0.38 |
| COV | | 4.3 | 3.5 | 2.0 |

COV = Coefficient of Variation

EXAMPLES 9–11

Thirty percent mica and ten percent calcium carbonate filled polypropylene sheet was run on a commercial extrusion line. The extruder was a 6" Egan single screw with an EDI flex lip die. In these Examples 9–11, the resulting melt temperature was approximately 400° F. and the temperature for Barrel Zones 1–5 were approximately 400/396, 390/390, 370/370, 370/370, and 370/371 as shown in Table 4.

Lower melt temperatures are typically preferred. Process melt temperatures of 370° F. or so will help control undesirable odors in the product. Process melt temperature as used throughout refers to a measured value of the temperature of a composition when the polypropylene is molten and unless otherwise stated, is indicative of the maximum temperature of a particular step.

For the runs reported in Table 4, an auger feeder was installed just above the feed throat of the extruder to introduce color concentrates for producing green, blue, and eggshell colored sheet. The concentrate was added at levels between 1%–5%.

TABLE 4

Extrusion Conditions for 30% Mica/10% Calcium Carbonate Filled Polypropylene

| | Set/Actual Conditions | | |
|---|---|---|---|
| | Green | Blue | Eggshell |
| Barrel Zone 1 Temp (F.) | 400/396 | 400/398 | 400/399 |
| Barrel Zone 2 Temp (F.) | 390/390 | 390/390 | 390/391 |
| Barrel Zone 3 Temp (F.) | 370/370 | 370/370 | 370/370 |
| Barrel Zone 4 Temp (F.) | 370/370 | 370/370 | 370/370 |
| Barrel Zone 5 Temp (F.) | 370/371 | 370/370 | 370/370 |
| Adaptor Temp (F.) | 370 | 370 | 370 |
| Melt Temp (F.) | 400 | 400–405 | 404/405 |
| Die Zone 1 Temp (F.) | 380 | 385 | 385 |
| Die Zone 2 Temp (F.) | 370 | 370 | 370 |
| Die Zone 3 Temp (F.) | 370 | 370 | 370 |
| Die Zone 4 Temp (F.) | 370 | 370 | 370 |
| Die Zone 5 Temp (F.) | 380 | 385 | 385 |
| Screw RPM | 30 | 30 | 30 |
| Drive Amperes | 325–345 | 335–352 | 347–350 |
| Screen Pack | 20 mesh | 20 mesh | 20 mesh |
| Back Pressure (psi) | 2350–2510 | 2370–2600 | 2515–2680 |
| Line Speed (fpm) | 30/28/20 | 30/28/22 | 27/26/20 |
| Throughput (lb./hr.) | 725 | 725 | 725 |
| Top Stack Roll Temp (F.) | 120–130 | 120–130 | 120–130 |
| Middle Stack Roll Temp (F.) | 120–130 | 120–130 | 120–130 |
| Bottom Stack Roll Temp (F.) | 120–130 | 120–130 | 120–130 |
| Roll Gap - top (mil) | 17 | 17 | 17 |
| Roll Gap - bottom (mil) | 23 | 23 | 23 |
| Nip Roll Pressure | 50 | 80 | 80 |
| Die Gap (mil) | 15 middle - 30 edges | 15 middle - 30 edges | 15 middle - 30 edges |
| Die - Full Width (in) | 52 | 52 | 52 |
| Die to Nip Distance (in) | Approximately 4.5 | Approximately 4.5 | Approximately 4.5 |
| Sheet Width (in) | 51.5 | 51.5 | 51.5 |
| Sheet Caliper (mil) | 17.5/18.5/24 | 17.5/18.5/24 | 17.5/18/24 |
| Color Auger Setting (%) | 4 | 4 | 1 |
| Trim Regrind Used | Yes | Yes | No |
| Footage Produced | 12000 | 11000 | 15000 |

EXAMPLES 12–17

Aroma Profile Test Method

The Sensory Analysis Center at Kansas State University has developed a profiling protocol in which a highly trained panel identifies specific odors and rates their intensity. The intensity scale is a 15-point "universal" scale of the type typically chosen for sensory studies, where 1 is barely perceptible or threshold and is extremely strong. If an attribute or odor component is not listed in the tables which follow, it means it is not present and would score a 0. The panel members are selected on the basis of a series of screening tests that include basic taste, odor recognition, taste intensity recognition, taste intensity ranking, and a personal interview to evaluate availability and personality traits. Training, which includes the fundamental sensory principles and all aspects of the profile technique, is done over a 4–12 month period.

The panelists work as a group to arrive at a description of the product. Individual results are compiled by the panel leader and discussion follows in which disagreements are discussed until a consensus is reached on each component of the profile. Reference materials and more than one session usually are required in order to reach the consensus.

The procedure for resin is to place 40 ml. of resin in a 340 ml. glass brandy snifter, which is covered with a watch glass. Sheet samples are cut into two 2"×2" sections and placed in the same size brandy snifter. In testing, panelists found that some samples had initial odor components that disappeared rapidly. Therefore an initial impact and a sustained impact were evaluated for each sample. The initial impact was judged immediately after the watch glass had been removed; the sustained impact was judged 10 seconds after the watch glass had been removed. Typical results are shown in the Table 5 below for Low Odor and High Odor Compostions. "Low" odor formulations were produced using lower melt processing temperatures in compounding and adding 10% calcium carbonate to the formulation. The sheets were prepared as shown and described in connection with Examples 1 through 11.

TABLE 5

High Odor vs. Low Odor Polypropylene Composites:
Effect of Adding 10% CaCO₃
ODOR PROFILE FOR COMPOUNDED RESIN

| Resin | Resin Impact | | Consensus Odor Profile on Resin (Kansas State University Sensory Analysis Center) | | | | | | | |
|---|---|---|---|---|---|---|---|---|---|---|
| | Initial | Sustained | Petroleum | Pungent | Musty | Scorched | Medicinal | Sweet | Waxy | Soapy |
| High Odor | 9.0 | 3.5 | 8.0 | 4.0 | 7.0 | 3.5 | 3.0 | | | |
| Low Odor | 5.5 | 2.5 | 2.5 | | 4.5 | | | 1.5 | 2.0 | 4.5 |

| High Odor Resin | | Low Odor Resin | |
|---|---|---|---|
| 65.63% | Polypropylene | 55.63% | Polypropylene |
| 30% | Mica | 30% | Mica |
| 2.5% | Coupling Agent | 10% | CaCO₃ |
| 1.87% | Pigment | 2.5% | Coupling Agent |
| | | 1.87% | Pigment |

High Odor and Low Odor compositions were compounded utilizing the process melt temperatures indicated in the first column of Table 6 and formed into sheets as described above. Both resin and sheet were evaluated for aroma profile.

TABLE 6

ODOR PROFILE FOR SHEET FORMED
FROM COMPOUNDED RESIN AT TWO TEMPERATURES

| Resin | Sheet Impact | | Censensus Odor Profile on Sheet | | | | | | | |
|---|---|---|---|---|---|---|---|---|---|---|
| | Initial | Sustained | Petroleum | Pungent | Musty | Scorched | Medicinal | Sweet | Waxy | Soapy |
| High Odor 370° F. | 12.0 | 6.0 | 10.0 | 8.0 | 7.5 | 45 | 40 | | | |
| High Odor 459° F. | 11.0 | 8.0 | 7.5 | 7.5 | 6.0 | 35 | 20 | | | |
| Low Odor 371° F. | 5.5 | 2.0 | 3.5 | | 4.0 | | | 2.0 | 2.5 | 2.5 |
| Low Odor 460° F. | 5.5 | 2.0 | 3.0 | | 3.5 | | | 2.0 | | 3.5 |

The foregoing data demonstrates that: when a basic moiety containing compound was added to the mica polyolefin composition, a resin was produced having suitable food contact compatible olfactory properties. Significant decreases in the initial and sustained odors were observed and the scorched, pungent, and petroleum aroma components were removed or greatly reduced and these undesirable components seem to be replaced with sweet, waxy, and soapy aroma components.

When compounded pellets are subjected to sheet extrusion, those without calcium carbonate increase in the disagreeable components (pungent and petroleum) and increase in the initial and sustained odor output with subsequent processing. In contrast, when pellets contain calcium carbonate, no increase in undesirable aroma components was observed and no increase in the initial or sustained odor was produced with subsequent processing. Test panel data correlated well with analytical techniques as can be seen from the discussion and examples which follow.

C8/C9 Ketones

The precise nature of the odor causing compounds in polypropylene/mica compositions is not known; however, it has been found that undesirable odors correlate well with eight carbon (C8) and nine carbon (C9) alkyl ketones as described hereinafter, and may be associated with such compounds.

Figure 3:
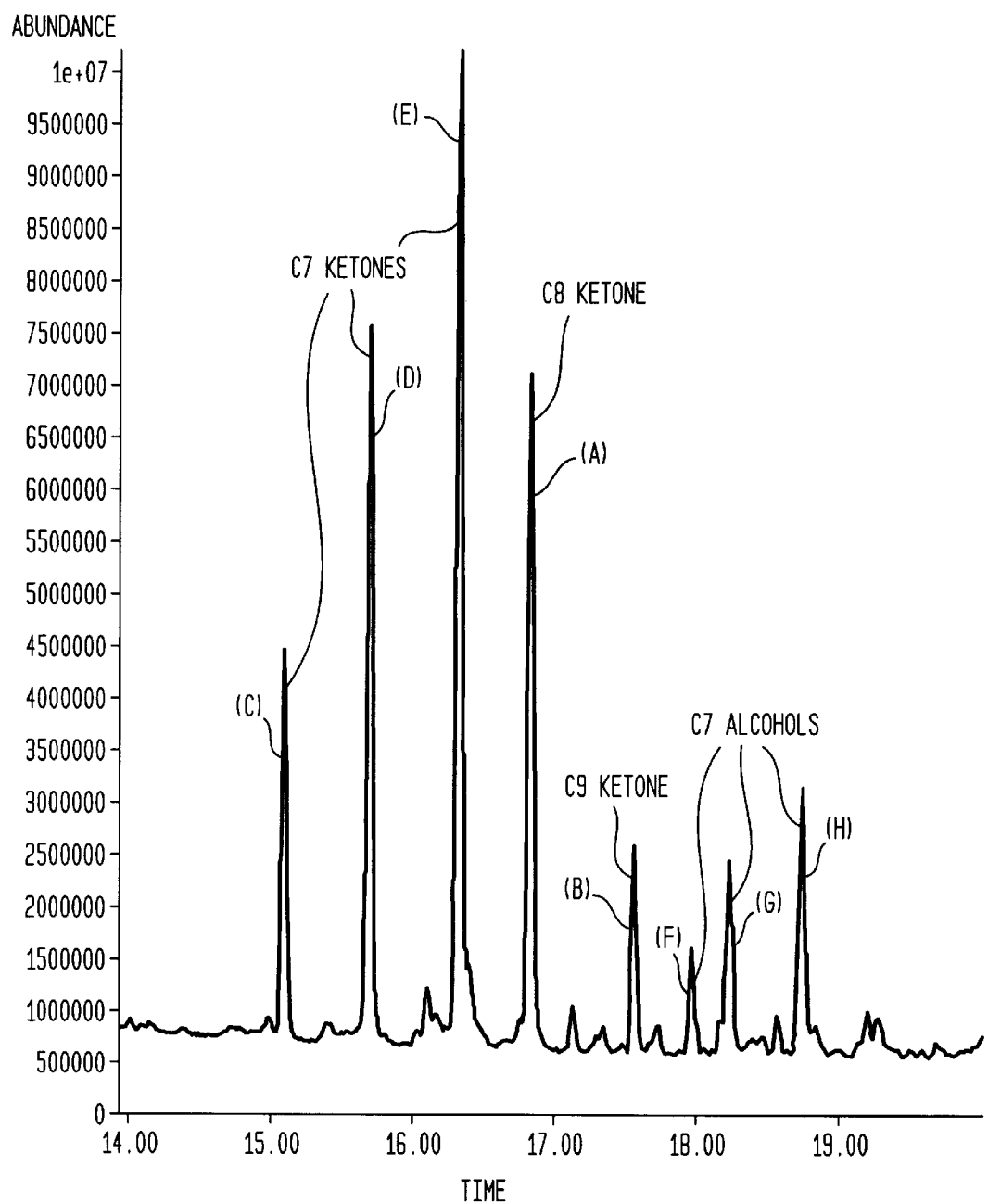
FIG. 3 is a chromatograph of a melt processed polypropylene/mica composition exhibiting relatively high odor.
Figure 4:
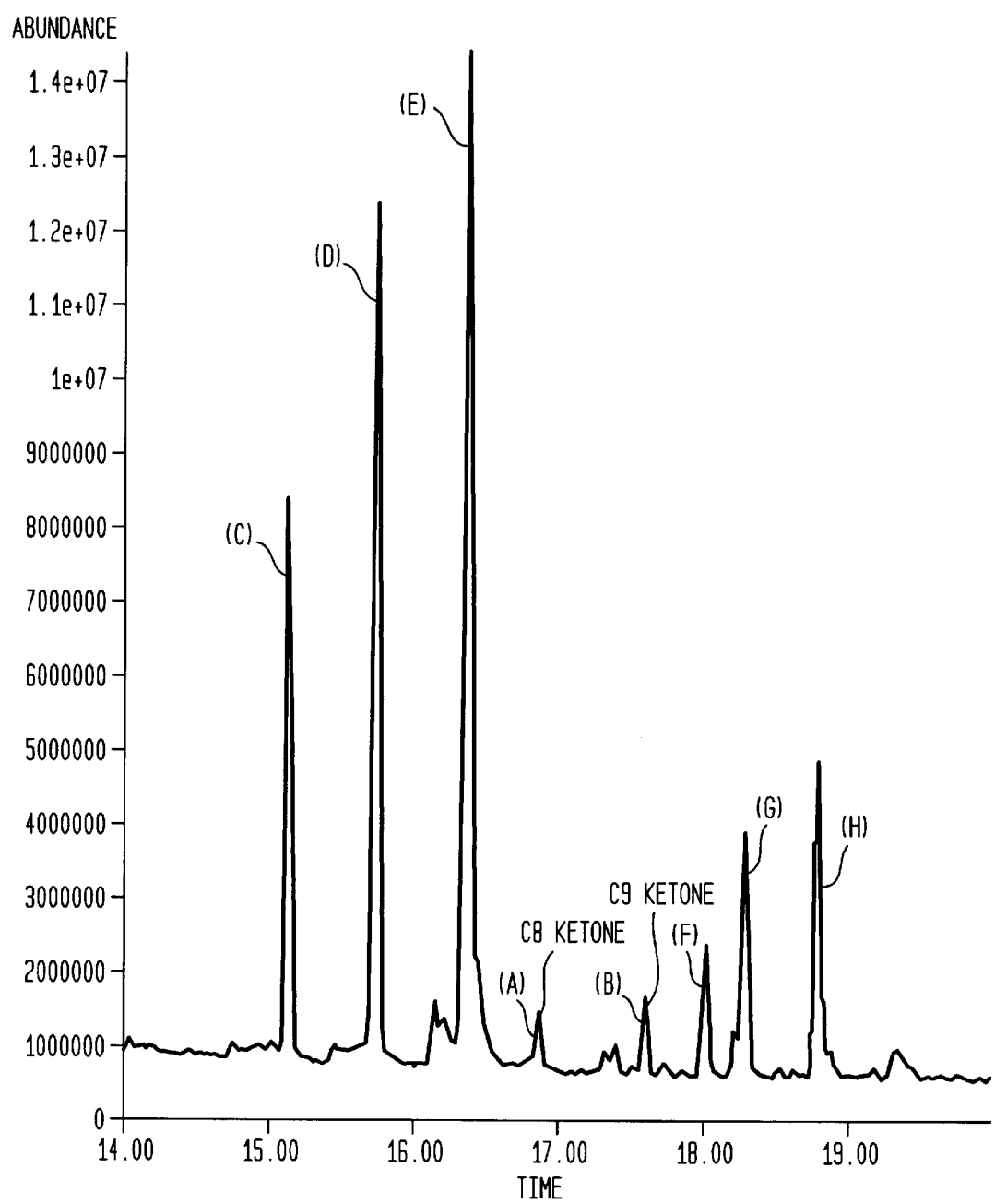
FIG. 4 is a chromatograph of a melt processed polypropylene/mica composition exhibiting relatively low odor.

A Likens-Nickerson steam/methylene chloride extraction technique was used to extract possible odor causing compounds from polypropylene/mica compositions and produce a concentrate. The extraction was performed until complete. The concentrate was analyzed through gas chromatography/mass spectrometry to produce chromatograms such as those shown in FIGS. 3 and 4. The abscissa is an arbitrary time scale, while the ordinate is an arbitrary abundance scale. The peak for alkyl C8 (labeled as A) ketone assigned to be 4-methyl-2-heptanone, appears on both FIGS. 3 and 4 at slightly above 16.8 on the time scale as indicated; while the peak for C9 alkyl ketone (labeled as B), assigned to be 4,6-dimethyl-2-heptanone appears slightly below 17.6 on the time scale in both chromatograms. Other peaks of interest on FIGS. 3 and 4 are C7 ketones at slightly above 15.1, 15.6 and 16.3 on the abscissa. The peaks are respectively assigned to be 2-heptanone, 3-heptanone and 4-heptanone. They are respectively labeled as C, D and E. There is also shown on both FIGS. 3 and 4 peaks for what are to be assigned to be various C7 alcohols at about 18, 18.2 and 18.8 on the abscissa. These compounds are respectively labeled as F, G and H on the diagrams and are assigned to be 2-heptanol, 3-heptanol, and 4-heptanol. The C8/C7 ratios referred to hereinafter are ratios of the abundance at the peaks assigned to be 4-methyl-2-heptanone to the abundance at the peak assigned to be 4-heptanone as measured by Likens-Nickerson extraction followed by gas chromtography/mass spectrometry. That is, the C8/C7 ratio for a given sample is the ratio of peak intensity (height) of peak A to the peak intensity of peak E. Similarly, the C9/C7 ratio is the ratio of the peak intensity of peak B to the peak intensity of peak E in FIGS. 3 and 4 for a given sample.

FIG. 3 is a chromatogram characteristic of extruded pellets having a relatively strong odor wherein the C8 and C9 ketones indicated each have an extractable concentration of about 10 parts per million parts by weight in the product. FIG. 4 is a chromatogram characteristic of relatively "low odor" extruded pellets substantially free of C8 and C9 ketones as shown. Generally, "low odor" compositions reduce concentration of C8 and C9 ketones over "high odor" compositions by $2/3$ with $1/5$ being typical and $1/10$ being preferred. Thus, in general, melt compounded compositions in accordance with the invention have extractable concentrations of C8 and C9 alkyl ketones of less than about 3.5 ppm (weight) with less than 2 ppm being typical and less than 1 ppm being particularly preferred.

It can also be seen from the chromatograms in FIGS. 3 and 4 that the adjacent C7 ketone levels are comparable in both the "low odor" and "high odor" compositions. Thus, the C8/C7 ratio can be used as an alternative indicator of desirable olfactory characteristics. Typically, "low odor" compositions in accordance with the invention have a C8/C7 ratio at least five times less than high odor compositions with at least ten times less being typical.

In preferred compositions according to the invention, C8/C7 ratios as measured by Likens-Nickerson extraction followed by gas chomatography/mass spectrometry are generally less than about 0.5 or so as is seen from in the examples which follow. C8/C7 ratios of less than about 0.3 are typical and C8/C7 ratios of less than about 0.1 are particularly preferred. The articles of the invention and the pellets from which they are made are further characterized by a relative aroma intensity index which is determined by commercially available equipment in accordance with the procedure detailed below.

Relative Aroma Intensity Index

Melt processed compositions produced in accordance with the present invention, particularly extruded pellets from which articles such as plates and bowls are made, characteristically exhibit relatively low odor as opposed to conventionally formulated mica/polypropylene compositions. Generally the relative aroma intensity index (as defined herein) is less than about 1.6, with less than or equal to about 1 being preferred. In general, the lower the relative aroma intensity index, the lower the odor intensity of the mica/polypropylene pellets. Less than or equal to about 0.7 is most preferred with a practical lower limit believed to be somewhere around 0.1 or so. Thus, in accordance with the invention, melt compositions will generally have a relative aroma intensity index of less than about 1.6 and typically from about 1.5 to about 0.1. Within the range of from about 1.0 to about 0.1 is more typical, while a relative aroma intensity index of from about 0.7 to about 0.1 is preferred.

The relative aroma intensity index (RAII) of a particular melt-processed composition is readily determined using conventional materials and equipment.

The relative aroma intensity index is defined as the arithmetic average of all sensor integrals for a given sample divided by the arithmetic average of all sensor integrals for a standard sample specified below; or in equation form:

$$RAII = \frac{\text{Arithmetic Average of Odor Intensity over all sensors of sample}}{\text{Arithmetic Average of Odor Intensity over all sensors of standard composition}}$$

A commercially available aroma scanning device is used. Typically, such devices utilize a plurality of conductivity sensors to determine the odor of a sample. The particular device used in the discussion which follows uses 32 sensors whose response is integrated over time. The various integrals are arithmetically averaged for each sample (or standard composition as the case may be). This arithmetic average is then used in both the numerator or the denominator in the above noted equation.

The standard composition utilized for determining RAII herein is produced from the following components:

TABLE 7

Standard Composition

| Component | Manufacturer | Product Number | Amount (Wt. Percent) |
|---|---|---|---|
| Polypropylene | Exxon | Escorene 4772 | 55.63 |
| Mica | Franklin Industrial Minerals, Inc. | L-140 | 30.0 |

TABLE 7-continued

Standard Composition

| Component | Manufacturer | Product Number | Amount (Wt. Percent) |
|---|---|---|---|
| Calcium Carbonate | Huber | Q-325 | 10.0 |
| Coupling Agent | Aristech | Unite NP-620 | 2.5 |
| Titanium Dioxide | Tioxide | TR-23 | 1.87 |

The above components were extruded on a 90 mm Berstorff Co-Rotating Twin Screw Extruder with underwater pelletizing under the following conditions:

200 rpm screw speed
with the following set temperature profile:

Zone 1—510° F.
Zone 2—485° F.
Zone 3—400° F.
Zone 4—380° F.
Zone 5—380° F.
Zone 6—380° F.
Head Flange—425° F.
Screen Changer—425° F.
Die—440° F.

Throughput appx. 900 LB/HR to produce the standard pellets. By the foregoing definition, these standard pellets have a relative aroma intensity index (RAII) of 1.0.

The preferred instrument to perform the aroma intensity measurements is an Aroma Scan® model A32 (AromaScan, Hollis, New Hampshire, USA). This instrument employs a dynamic head space type of measurement, in which nitrogen gas flows through a sample vial and carries aroma volatiles to the sensors. All pellet samples are analyzed in triplicate with the final results averaged to minimize measurement noise. In the illustrations which follow, The "Acquisition Parameters" method of the instrument is set with a sampling interval of 1 and a detection threshold of 0.2. The "Multisampler-SP" method of the instrument sets the platen temperature (100° C. for the examples herein). Two other temperatures (115° C. and 125° C.) are automatically set. The Multisampler-SP method is also used to set the parameters in Table 8 to measure aroma intensity.

TABLE 8

AromaScan ® Settings

| Sample Equilibration Time: | 5 minutes |
|---|---|
| Vial Size: | 22 ml |
| Mix Time: | 0 |
| Mix Power: | 1 |
| Relative Humidity: | 10% |
| Sampling Time: | 4 minutes |
| Wash Time: | 5 minutes |
| Data Collection Time (minutes): | 19 |
| Time Between Injections (minutes): | 20 |

In the recognition window, start and end are set at 1. In addition to the foregoing, the "Vial Pressurization Control" is set at 20 kPa, the "Vial Needle Flow" is set at 50 ml/min nitrogen; "Transfer Line Flow" across the sensors, between, before and after samples is set at 150 ml/min. All gas flows are for dry nitrogen.

Figure 5:
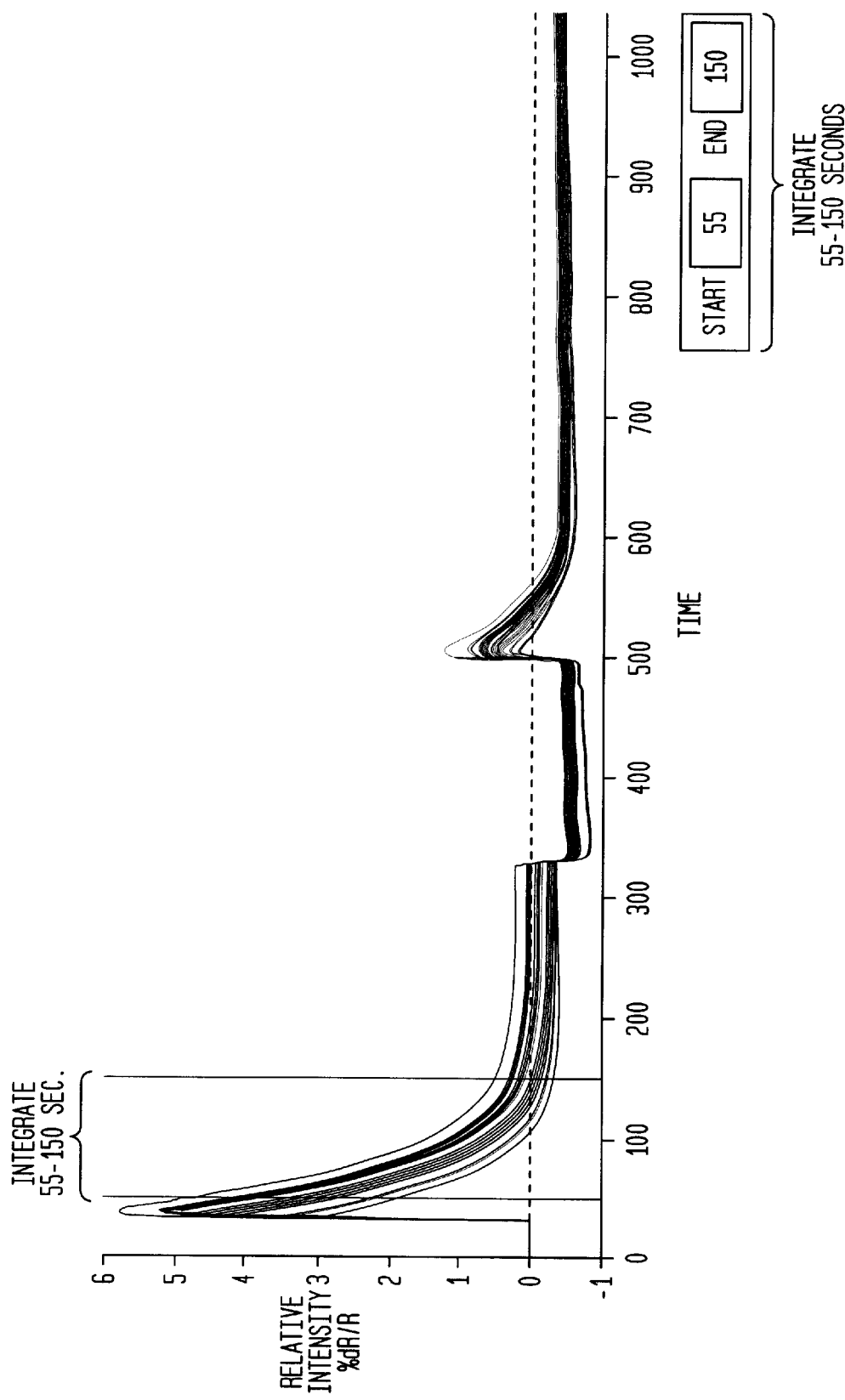
FIG. 5 is a plot of sensor responses vs. time for an automated aroma scanning device.

A response of each of the 32 sensors of the AromaScan® machine is integrated over a time interval of 55–150 seconds. The initial 55 seconds is allowed to let humidity/moisture exit the system to a great extent before integration is started. The 150 second integration end time was chosen to allow the sensor signals to return to baseline, at which time all significant signal has been integrated. The various signals seen after 150 seconds are insignificant in terms of the odor measurement, as can be seen from FIG. 5. FIG. 5 is a plot of sensor response vs. time for each of the 32 sensors of the Aroma Scan device, where individual responses are shown as various lines on the diagram.

Figure 6:
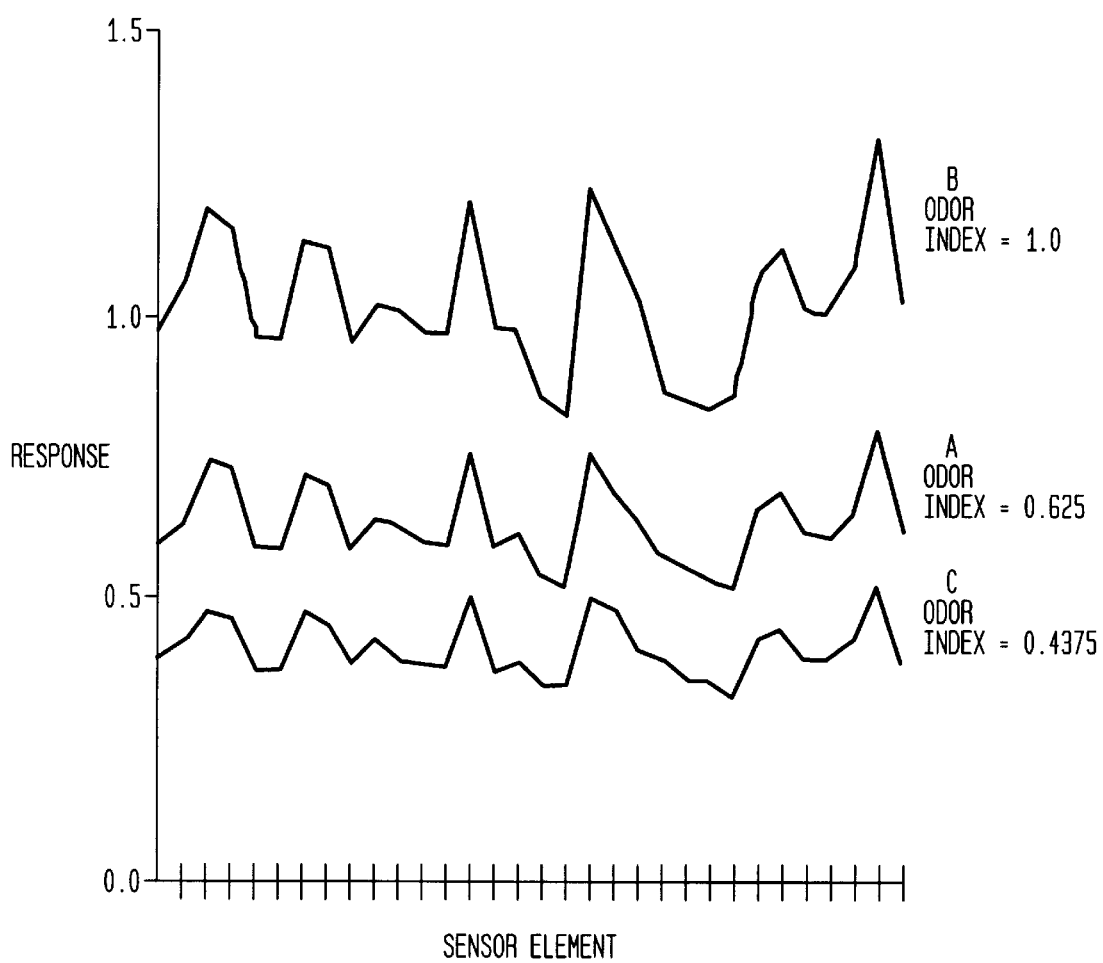
FIG. 6 is a plot of the response integrals for the 32 sensors in an aroma scanning device for 3 different polypropylene/mica compositions.

Using the foregoing procedure, 2.0 grams of compounded polymer pellets are weighed and placed in the 22 ml, crimp top, septum capped vials and analyzed automatically by the instrument. There is shown in FIG. 6 the results for various extruded polypropylene/mica pellets. The data points shown on FIG. 6 are actually the response integrals for a particular sensor.

The abscissa on FIG. 6 indicates each of the 32 elements; while the ordinate is the time-integrated response of the corresponding element in arbitrary units. There is shown as curve A the (integrated) sensor responses for the standard sample prepared as above. As noted before, this sample has a relative aroma intensity index of 1.0 by definition. There is also shown a sample prepared in accordance with the standard sample procedure except that polypropylene was substituted for calcium carbonate at curve B as in the "high odor" compositions of the Kansas State Trials discussed above in connection with Examples 12–17. As can be seen, this composition has a relative aroma intensity index of about 1.6; or in other words, its response integrals are on average 1.6 times those of the standard sample. There is also shown on FIG. 6 a third curve (C) representative of more preferred compositions prepared in accordance with the present invention. Curve C represents a composition prepared in accordance with Examples 28 through 30 below (Table 11) wherein the relative aroma intensity index is less than about 0.7 which means its response integrals are on average less than 0.7 times those of the standard sample.

Through the use of an automated instrument, the aroma intensity of the melt-compounded pelletized composition can be reduced to a single value. While the foregoing sets forth a particular and preferred method of determining the relative aroma intensity index, it may also be possible to employ other instruments consistent with this protocol since such instruments are readily available. If such alternative instrument is employed the standard composition detailed above should be used to ensure that calibration is proper. As noted, the standard composition has a RAII of 1.0 while a composition prepared substituting polypropylene for the calcium carbonate of the standard composition has a RAII of about 1.6 or above and a composition prepared in accordance with Examples 28 through 30 should have a RAII of 0.7 or less. By using these multiple reference points, the relative aroma intensity index is always readily determined by one of skill in the art.

EXAMPLES 18–26

A series of resin compositions and sheet products were prepared in accordance with the discussion above and characterized by C8/C7 ketone ratio and odor panel testing. Variables included calcium carbonate addition, process atmosphere (air or nitrogen) and process melt temperature. Results appear in Table 9 for examples 18 through 26.

TABLE 9

CaCO₃ Effect of Process Conditions and Compositions on Odor of PP/Mica Composites

| Example | Type (Banbury or Extruded Sheet) | Process Atmosphere (Air/N₂) | CaCO₃ (Yes/No) | Process Melt Temperature | C₈/C₇ Ketone Ratio | Odor Panel Data | |
|---|---|---|---|---|---|---|---|
| | | | | | | Sustained (Total Intensity) | "Scorched" Odor Profile Component Intensity |
| 18 | Brabender Banbury Compounded | Air | Yes | 370° F. | 0.055 | 2.0 | 0 |
| 19 | Brabender Banbury Compounded | Air | Yes | 460° F. | 0.6 | 4.0 | 5.0 |
| 20 | Sheet | N₂ | Yes | 460° F. | 0.3 | | |
| 21 | Brabender Banbury Compounded | Air | Yes | 460° F. | 0.6 | 4.0 | 5.0 |
| 22 | Sheet | Air | Yes | 370° F. | 0.15 | 2.0 | 0 |
| 23 | Sheet | Air | No | 370° F. | 1.3 | 6.0 | 4.5 |
| 24 | Sheet | Air | Yes | 400° F. | — | 5.0 | 2.5 |
| 25 | Sheet | Air | No | 460° F. | 0.9 | 8.0 | 3.5 |
| 26 | Sheet | Air | Yes | 460° F. | 0.7 | 2.0 | 0 |

See discussion above for C8/C7 ketone ratio, odor; Kansas State University Odor Panel Profile.
Extruded Sheet was prepared using a single screw extruder with pre-compounded resin made by a twin screw process.

The resins of Examples 18, 19, and 21 were prepared on a Brabender device (C.W. Brabender, model EPL2V5502) with a Banbury mix head (model R.E.E.6, 230v, 11a) with a mixing time of 5–10 minutes The sheet samples, Examples 20 and 22 through 26, were prepared from precompounded resin pellets extruded under the conditions shown in Table 10.

TABLE 10

Sheet Extrusion Conditions for PP/Mica Pilot Extruder

| CONDITIONS | ACTUAL | SET POINT |
|---|---|---|
| Barrel Zone 1 (° F.) | 354–378 | 360–375 |
| Barrel Zone 2 (° F.) | 366–410 | 370–410 |
| Barrel Zone 3 (° F.) | 371–460 | 370–460 |
| Adapter temp (° F.) | 359–460 | 370–460 |
| Feed Block Temp (° F.) | 370–468 | 370–460 |
| Die Zones 1–3 temps (° F.) | 368–462 | 370–460 |
| Extruder RPM | 110 | 110 |
| Drive Amperes | 15–23 | — |
| Melt Pressure (psi) | 1050–1850 | — |
| Die Pressure (psi) | 745–910 | — |
| Line Speed (FPM) | 8.25–9.74 | — |
| Chill roll temp. (° F.) | 130 | — |

The odor of PP/mica composites (pellets or sheet) is affected by temperature, atmosphere, and by the addition of a basic filler such as CaCO₃. The C8/C7 ketone ratio is consistent with the odor panel data and shows that offensive odor components decrease with:
Using lower processing temperatures
Using a base such as CaCO₃ as a buffering agent
Processing under inert atmosphere such as N₂.

EXAMPLES 27–30

Figure 7:
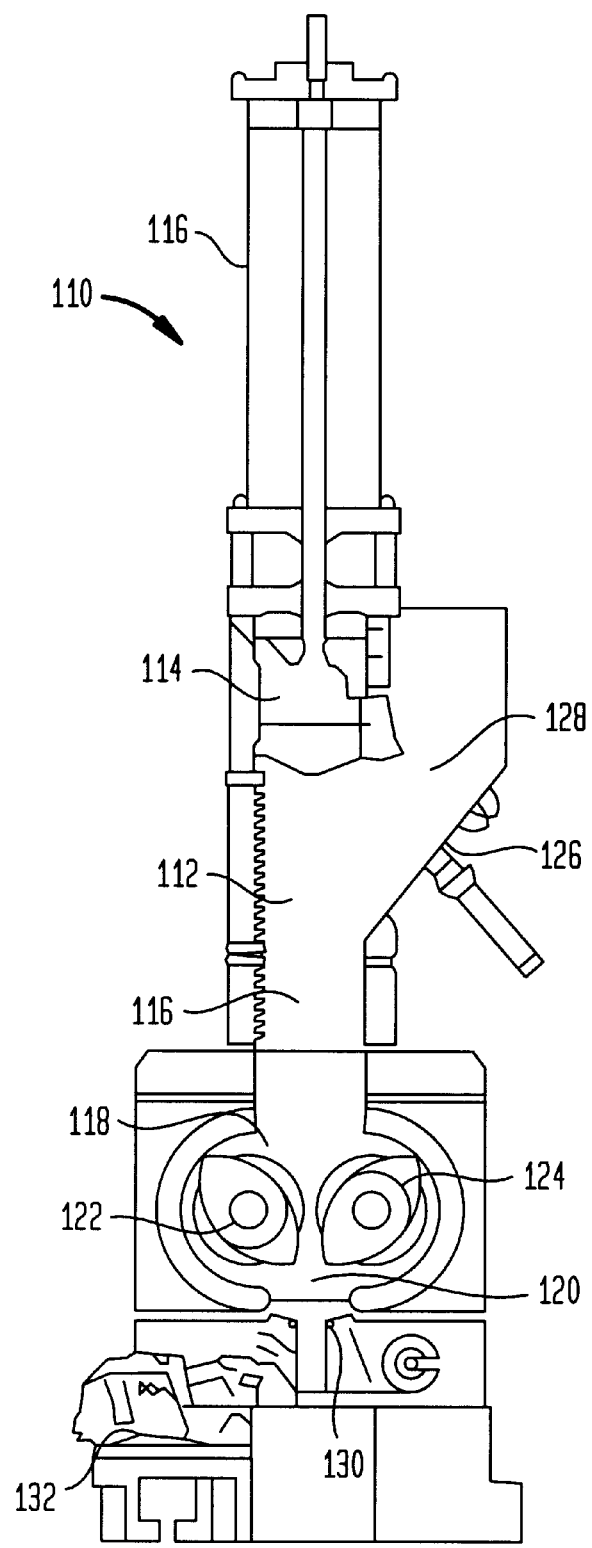
FIG. 7 is a schematic diagram of a Banbury type compounder.

Particularly preferred, low odor compositions are prepared by way of a sequential process in a Banbury mixer at relatively low temperatures. A typical Banbury apparatus is shown schematically in FIG. 7. An apparatus 110 includes generally a feed hopper 112 provided with a feed ram 114 coupled to a weight cylinder 116 which may be varied depending on the force required for a particular process. Feed hopper 112 has a lower portion 118 which communicates with a mixing chamber 120 provided with a pair of rotors 122, 124. The material is supplied to hopper 112 through a charging door indicated at 126, and/or fed through a feed port located at 128. Chamber 120 is further provided with a discharge door 130 which is positioned above a conveyor indicated at 132. Such apparatus is well known for compounding thermoplastic compositions.

A conventional non-sequential process is operated as follows: (a) discharge door 130 is closed; (b) ram 114 is drawn up; (c) the ingredients are added; (d) the ram is lowered and the rotors activated; (e) mixing is complete when a combination of temperature and work has been achieved (power draw on mixer motor falls off); (f) at which point the discharge door is opened and the batch is gravimetrically supplied to a conveyor; and finally (g) the batch is conveyed to a single screw extruder and pelletized. The apparatus melts the polymer through shear generated by the rotors and walls against the components being mixed. One may rely on shear (that is, mechanical work) to soften the thermoplastic components or apply some auxiliary heat directly either in the feed hopper or the chamber through the use of heating coils, infrared devices, steam jacketing and the like, or, alternatively, preheating the polymer externally prior to feeding.

It has been found that melt compositions prepared in a sequential Banbury process exhibit superior stiffness as measured by flexural modulus properties and low odor. In a sequential process in accordance with the invention, two feed steps are used in order to minimize the time heated or molten polypropylene is in contact with the mica as will be explained in connection with FIGS. 7 and 8.

In a first, melt mix step, door 130 is closed and ram 114 is drawn up. Polypropylene, polyethylene, titanium dioxide, other pigments and the like are added. Ram 114 is lowered and the rotors 122, 124 are rotated to shear the material. A typical power curve (at constant rotor speed) for amperage supplied to the mixing motors for the inventive sequential process is shown in FIG. 8, a plot of amperage versus time in hours:minutes:seconds.

Figure 8:
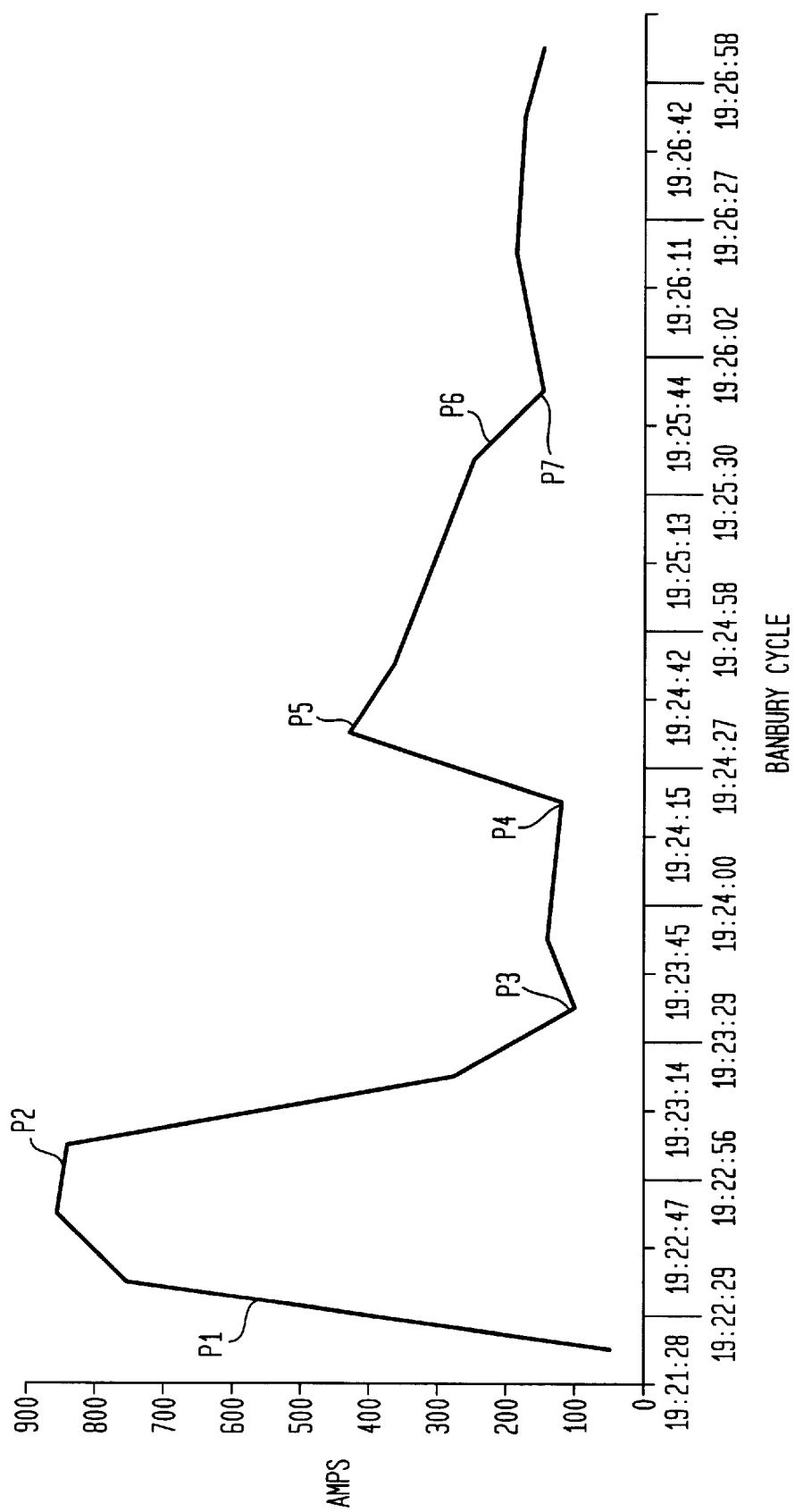
FIG. 8 is a plot of current draw vs. time for a compounding process according to the present invention in a compounder of the type shown in FIG. 7.

When the pair of rotating rotors are first started in the melt mix step, the current draw is indicated at point P1 on FIG. 8 where it can be seen power applied to the polymer is quite high. The current draw reaches a maximum at about P2 where the polymer begins to soften rapidly. At P3 after a minute or two the current draw is at a minimum while the components are being mixed when the polymer is in a softened state. Mica and calcium carbonate may then be added simultaneously in a mica addition step as will be detailed below.

After the polymer is softened, ram 114 is again drawn up and the mica and calcium carbonate may be added at the time corresponding to P4 on the diagram. The material may be added through a door 126 or feed port 128. The current draw at constant rotor speed again increases as shown at P5 and eventually begins to decay as shown at P6 and P7. More preferred is to add the mica and calcium carbonate mixture at about the time corresponding to P2 prior to complete softening of the resin. Alternatively, polypropylene may be externally preheated to about 240° F. or so (along with the mixing chamber to the same temperature) and all of the ingredients are simultaneously added for maximizing process throughput. Preferred drop batch temperature at the end of Banbury melt compounding, that is, maximum melt processing temperature for this step is up to about 425 degrees Fahrenheit. At the time corresponding to P7, the door may be opened and the batch of material (a batch size is about 200 pounds) conveyed to an extruder to be pelletized.

TABLE 11

Comparison of Compounding Processes

| COMPOUNDING PROCESS | Compound Flexural Modulus (Tangent), PSI | 9" Plate Rigidity (g/0.5") | Relative Aroma Intensity Index (Compound) |
|---|---|---|---|
| Twin Screw Example 27 | 718,000 | 417 | 1.0 |
| Banbury (non-sequential) Example 28 | 591,000 | 378 | 0.59 |
| Banbury (sequential, 1 min. pre-heat) Example 29 | 708,000 | 416 | 0.65 |
| Banbury (Sequential, 2 min. premelt) Example 30 | 635,000 | 352 | 0.62 |

Table 11 shows compound flexural modulus (as measured by ASTM method D 790-95a), corresponding plate rigidity, and aroma intensity index on four indicated compounding processes designated as examples 27–30. In the case of twin-screw (Example 27), high modulus is obtained but with higher odor with relatively low throughput, in the range of 900 lb/hr, which is less than half the output of Banbury compounding processes (utilizing a Stewart-Bolling Banbury Mixer with batch sized in the range of 150–200 lb) listed herein. In the case of non-sequential Banbury process, low modulus is obtained with corresponding low plate rigidity with lower odor and high throughput. In the last two cases corresponding to sequential Banbury processes designated as "1 min. pre-heat" and "2 min. pre-melt", the short 1 minute preheat case (Example 29) is preferred because it gives high compound modulus and high plate rigidity (comparable to twin screw case) with benefits of both low odor and high throughput, in excess of 2000 lb/hr.

The twin screw formulation in the above table contains PP/30% mica/10% CaCO3 with 2.5% coupling agent (maleic anhydride modified PP grade Aristech Unite NP 620) and no polyethylene. The formulation corresponding to all three listed Banbury processes in above table contain PP/30% mica/10% CaCO3/0.5% TiO2/4%LLDPE with no coupling agent where such ingredients have the following sources and grades: Mica=Franklin Minerals L-140, $CaCO_3$=Huber Q325, PP=Exxon Escorene PP4772, LLDPE=Novapol Novachemical G1-2024A.

The Banbury "non-sequential" case (Example 28) in Table 11 corresponds to adding all ingredients together with a total compounding time of about 4.5 minutes followed by conversion of the batch (having temperature of 430° F.) to pellets using a continuous 10" single screw extruder equipped with one 30 mesh and one 20 mesh screen, and an underwater pelletizing die assembly, with a pelletizing temperature in the range of 455–470° F.

The Banbury "sequential 2 min premelt" case (Example 30) in Table 11 corresponds to a 2 minute period for melting the PP/LLDPE mixture (in the presence of $CaCO_3$ and TiO2) to a maximum temperature of about 350° F., followed by adding mica and thereafter mixing for a period of about 105 sec to achieve a batch temperature of about 430° F., followed by conversion to pellets with a pelletizing temperature of about 460° F. The Banbury "sequential, 1 min pre-heat" case (Example 29) in Table 11 corresponds to about a 1 minute period for presoftening the PP/PE mixture (in the presence of TiO2, or alternatively adding the $TiO_2$ with the mica and calcium carbonate) to a maximum temperature of about 260° F., followed by adding the mica/$CaCO_3$ mixture and thereafter mixing to achieve a batch temperature of about 425° F., followed by conversion to pellets with a pelletizing temperature of about 425° F. In this preferred mode, it has been found that polymer preheating aids in preserving compound stiffness (required for rigid articles of manufacture) and intimate contact of mica with odor suppressing agent ($CaCO_3$) aids the production of low odor material.

Pellets from the above mentioned Banbury compounding processes were subsequently extruded at 370° F. as cast sheets in the range of 17–18 mil. Sheet line conditions also included a screw RPM value of 100, a chill roll temperature of about 130° F., drive amperage value of about 22, melt pressure of about 2000 psi, die pressure of about 970 psi, and a line speed of about 7 ft/min. Plates were subsequently vacuum thermoformed using a female mold and trimmed and tested for rigidity.

EXAMPLES 31–41

Extruded mica filled polypropylene sheets prepared as described in Examples 1 through 8 were characterized with respect to surface gloss and roughness. Table 12 shows 75 degree gloss and Parker Roughness (airflow method) data for an extruded mica filled polypropylene sheet versus same properties for the food contact (air) side of vacuum formed 10.25 inch plates produced according to condition (B) of FIG. 2 using the same sheet formulation. The unique thermally induced micronodular surface is characterized by significant decrease in gloss and significant increase in roughness as shown in the two photomicrographs in FIGS. 9A and 9B, which results in a stoneware or pottery like appearance with aesthetic appeal. (The Parker Roughness method is described above). The upper photomicrograph of FIG. 9A is of a thermoformed plate surface, while the lower photomicrograph of FIG. 9B is of sheet.

Figure 9A:
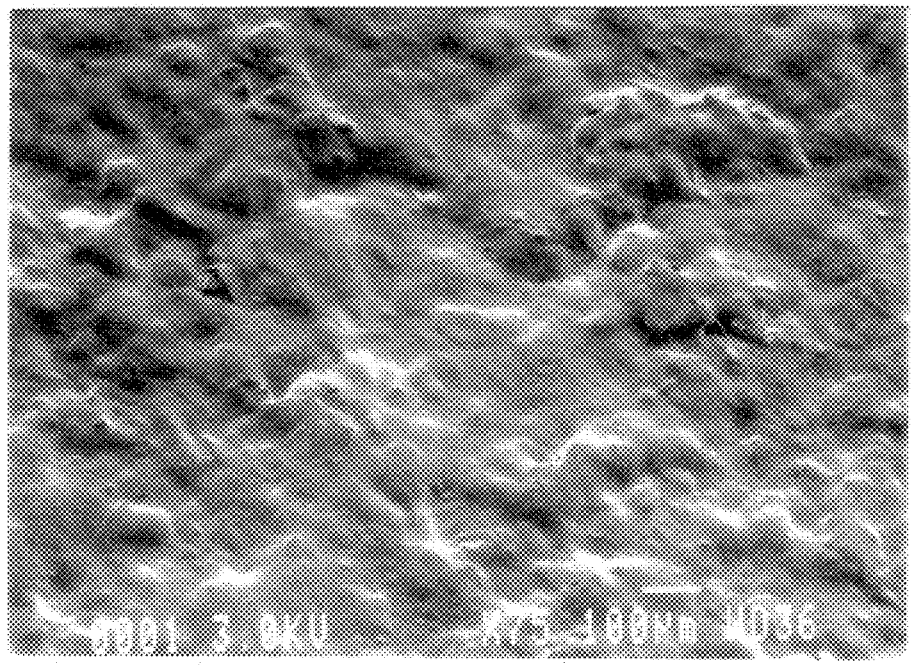
FIG. 9A is a scanning electron photomicrograph of a plate (upper picture) and FIG. 9B is a scanning electron photomicrograph of a sheet (lower picture) of this invention wherein there is shown the micronodular food contact surface of the plate but not so for the neat extruded sheet.
Figure 9B:
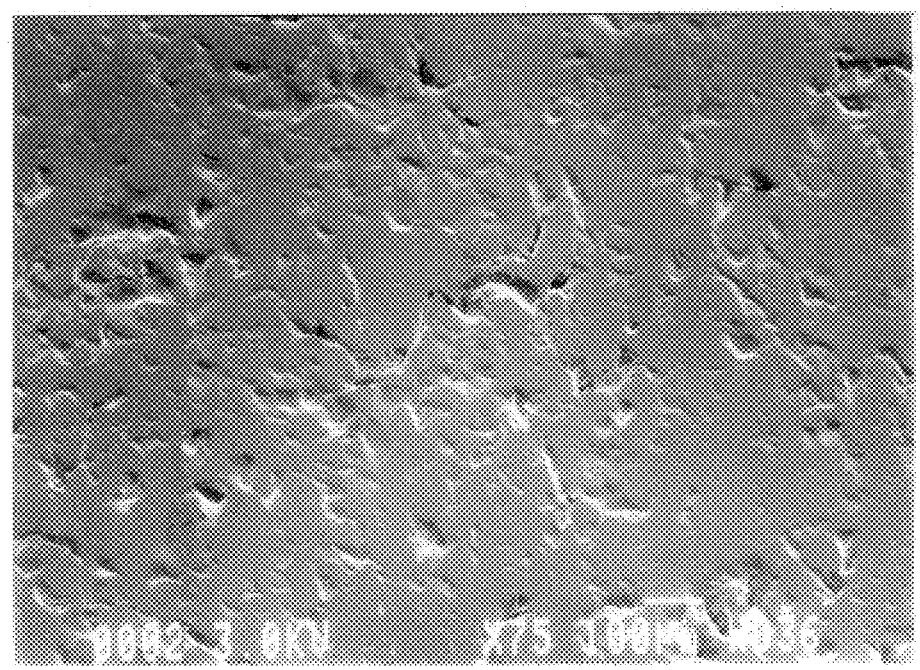

The photomicrographs of FIGS. 9A and 9B were obtained from a 10×15 mm piece cut out of a plate bottom. The sheet sample was mounted with surface of interest up on a specimen stub, and coated with gold/palladium. The stub was placed in a JEOL 840A Scanning Electron Microscope (SEM). Photomicrographs of the samples were taken at 75× magnification, 30 degree tilt, 39 mm working distance at 3 kv.

process conditions. Table 14 summarizes the PP/40% mica sheet properties.

TABLE 13

PP/Mica Extrusion Process Conditions Summary

| Plate Size (in.) | Barrel Zone 1 Temp.(F.) Actual/Set | Barrel Zone 2 Temp.(F.) Actual/Set | Barrel Zone 3 Temp.(F.) Actual/Set | Adaptor Temp.(F.) Actual/Set | Feed Block Temp. Actual/Set | Line Speed (fpm) | Die Zone 1 Temp.(F.) Actual/Set |
|---|---|---|---|---|---|---|---|
| 11 | 395/395 | 452/425 | 475/475 | 470/470 | 470/470 | 9.27 | 470/470 |
| 10 | 376/375 | 410/410 | 431/430 | 430/430 | 430/430 | 8.32 | 430/430 |
| 9 | 375/376 | 410/410 | 434/430 | 430/430 | 430/430 | 8.07 | 430/430 |

| Plate Size (in.) | Die Zone 2 Temp.(F) Actual/Set | Die Zone 3 Temp.(F.) Actual/Set | Screw RPM Actual/Set | Drive Amperes | Melt Pressure (psi) | Die Pressure (psi) | Chill Roll Temp.(F.) Actual/Set |
|---|---|---|---|---|---|---|---|
| 11 | 469/470 | 470/470 | 125 | 18.3 | 1387 | 694 | 130/130 |
| 10 | 430/430 | 430/430 | 130 | 19.3 | 2012 | 737 | 130/130 |
| 9 | 430/430 | 430/430 | 132 | 24.2 | 2112 | 686 | 130/130 |

TABLE 12

GLOSS AND ROUGHNESS PROPERTIES OF THE FOOD CONTACT SIDE OF POLYPROPYLENE/MICA/TIO$_2$ PLATE SURFACE VERSUS NEAT EXTRUDED SHEET

| EXAMPLE | GLOSS (75 DEGREES) * | PARKER ROUGHNESS (MICRONS) |
|---|---|---|
| 31 (Plate) | 22.4 | 13.41 |
| 32 (Plate) | 30.6 | 14.05 |
| 33 (Plate) | 24.8 | 14.89 |
| 34 (Plate) | 24.3 | 14.24 |
| 35 (Plate) | 24.5 | 12.48 |
| PLATE AVERAGE | 25.3 ± 3.1 | 13.8 ± 0.9 |
| 36 (Sheet) | 45.7 | 5.92 |
| 37 (Sheet) | 47.2 | 7.43 |
| 38 (Sheet) | — | 5.89 |
| 39 (Sheet) | — | 6.35 |
| 40 (Sheet) | — | 5.84 |
| 41 (Sheet) | — | 8.15 |
| SHEET AVERAGE | 46.5 | 6.6 ± 0.97 |

* = Average of Machine and Cross Machine Directions

As shown in Table 12, the food contact side is rougher as evidenced by increased roughness and decreased gloss relative to the neat extruded sheet. The rough appearance is desirable for purpose of creating the micronodular surface giving the container and plate a stoneware or pottery-like look.

EXAMPLES 42–43

Mica filled polypropylene sheets were successfully vacuum thermoformed into 12 oz. oval microwave containers, whereby the base was produced using mode (B) of FIG. 2 and the lid was produced using mode (A) of FIG. 2. In contrast, attempts to form unfilled polypropylene sheet into the same container were not successful.

EXAMPLES 44–46

Sheet rolls (17.5 wide), at three calipers were extruded as described in Examples 1 through 8 in connection with FIG. 1. Table 13 summarizes the PP/40% mica material and process conditions. Table 14 summarizes the PP/40% mica sheet properties.

TABLE 14

PP/Mica Sheet Property Summary

| Plate Size (in.) | Overall Caliper -Avg. (mil) | Overall Basis Weight - Avg. (lb./3000 ft. 2) |
|---|---|---|
| 11 | 18.46 ± 0.36 | 308.07 ± 13.72 |
| 10 | 17.20 ± 0.10 | 288.80 ± 9.89 |
| 9 | 16.94 ± 0.10 | 268.11 ± 7.50 |

EXAMPLE 47–49

Plates from sheet specifications set forth in Examples 31–41 were produced using 1-up water cooled female molds (with pressure box/vacuum assembly), followed by matched metal punch trimming. Mold temperature was 70° F., while sheet temperatures for the 9, 10, and 11 inch plate runs were respectively 300° F., 310° F., and 295° F. The 9 and 10 inch plates were produced at 20 cycles/minute while the bulk of the 11 inch plates were made at 25 cycles/minute.

Oven temperature control on the commercial machine was good due to the combination of top quartz heaters and bottom calrod heaters with proper zoning. In general, higher temperatures produce more micronodularity at the expense of more pronounced sheet sag and wrinkling while low temperatures tend to reduce sag at the expense of diminished stoneware or pottery-like appearance.

Best results (i.e., micronodular matte eating surface without "webbing" or wrinkling) were obtained by increasing the top oven temperature by 3–5° F. and decreasing the bottom by a corresponding amount. This ability to selectively control oven temperature in effect facilitated determination of the preferred process temperature window of PP/mica sheets.

EXAMPLES 50–54

Figure 10:
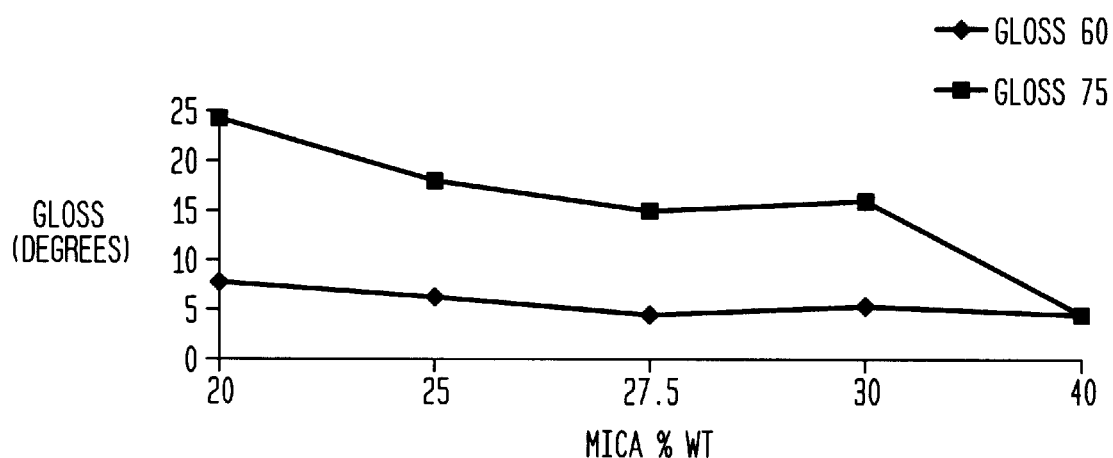
FIG. 10 is a graph plotting gloss versus mica level.
Figure 11:
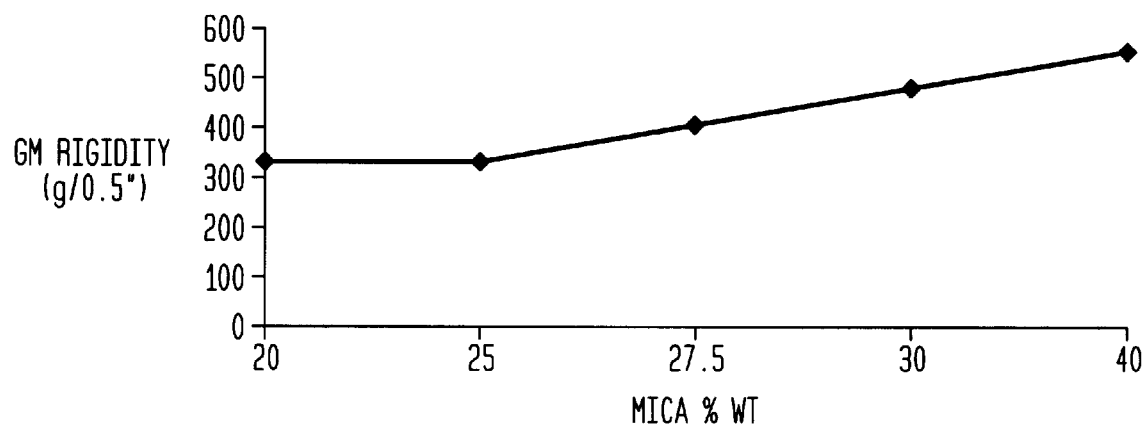
FIG. 11 is a graph plotting the plate rigidity versus mica level.

Sheets and plates were prepared as illustrated in Examples 1 through 8 and FIGS. 1 and 2. Table 15 shows sheet extrusion and forming conditions. FIGS. 10 and 11 respectively, show gloss and plate rigidity versus mica level (at constant mica/TiO$_2$ ratio).

TABLE 15

Extrusion/Forming Conditions

| | |
|---|---|
| Barrel Zone 1 | 375° F. |
| Barrel Zone 2 | 410° F. |
| Barrel Zone 3 | 430° F. |
| Adaptor | 430° F. |
| Feedblock | 430° F. |
| Die Zones 1/2/3 | 430° F. |
| RPM | 130 |
| Chill Roll | 130° F. |
| Target Sheet Caliper | 18.3 mil |
| Sheet Width | 18.0 inches |
| Comet Fonner Top Heater | 20% |
| Comet Former Bottom Heater | 35% |
| Comet Former Time | 50–60 seconds |
| Plate Diameter | 11 inch |

EXAMPLES 55–62

Commercial sheet extrusion runs of several mica filled polypropylene formulations were conducted. These sheets suitably have a basis weight of about 200 to 950, per 3000 square foot ream, preferably about 200 to 400 per 3000 square foot ream. These mica filled polypropylene sheets had a mica content in the range of 25 to 35 weight percent.

Figure 12A:
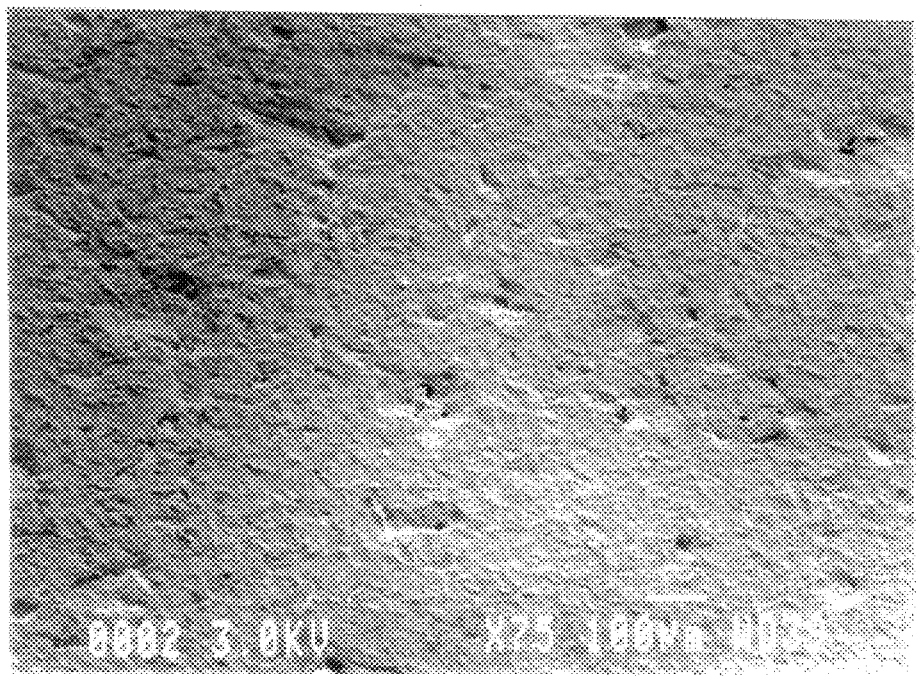
FIG. 12A is a scanning electron photomicrograph of a sheet of this invention showing a matted surface and FIG. 12B is a scanning electron photomicrograph of a non-matted surface.
Figure 12B:
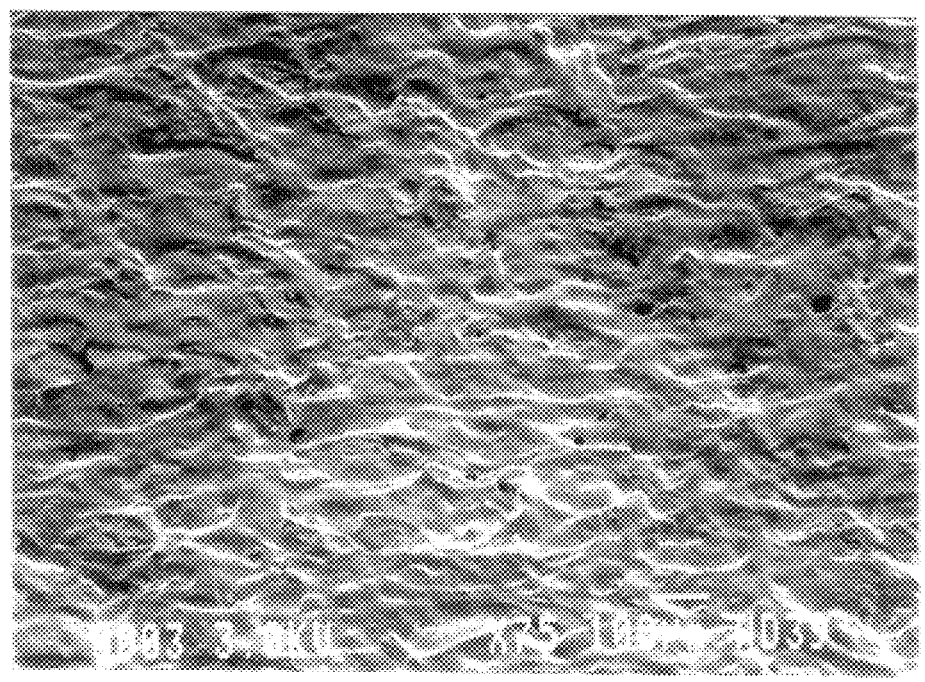
Figure 13A:
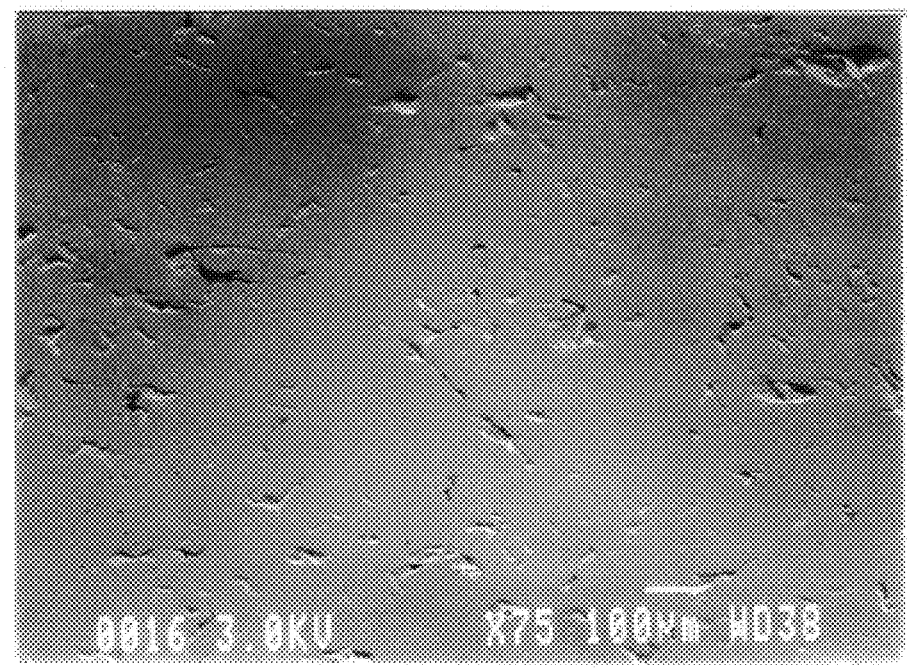
FIGS. 13A and 13B are scanning electron photomicrographs of sheets of this invention showing two high gloss sides.
Figure 13B:
Figure 14A:
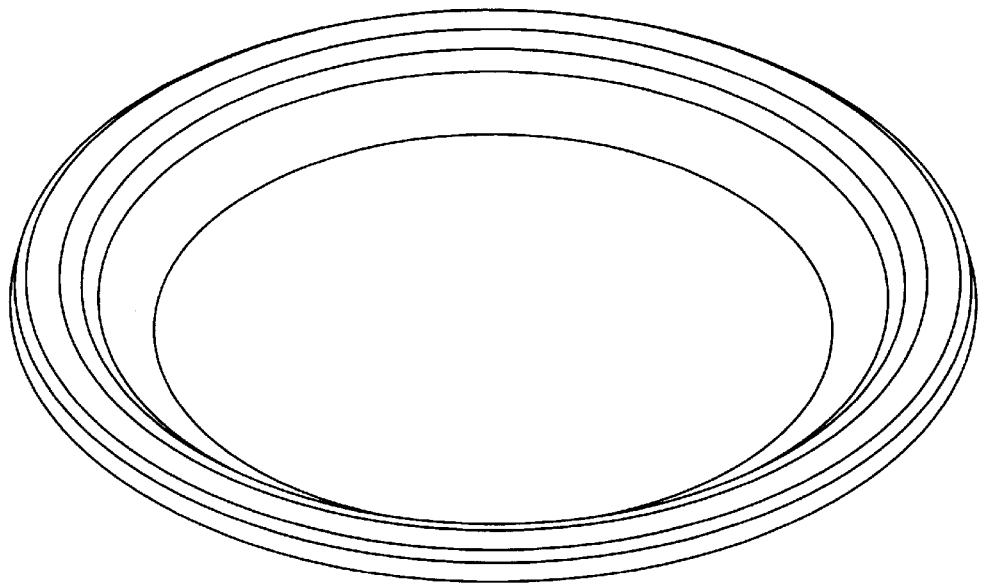
FIGS. 14A and B are isometric drawings of a plate of this invention.
Figure 14B:
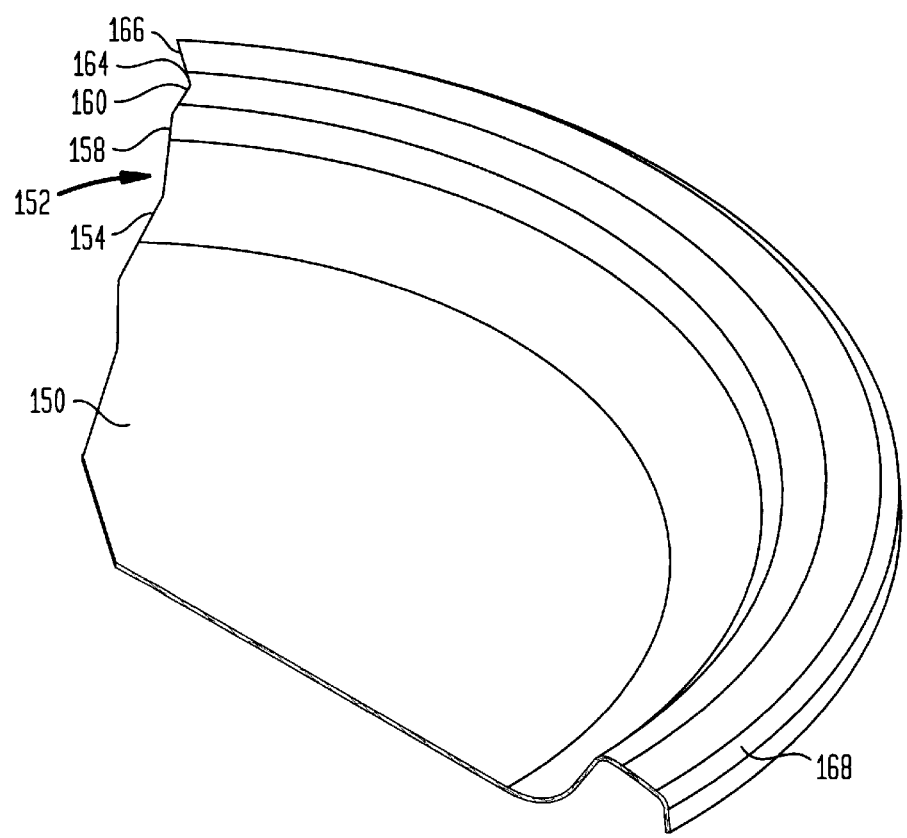
Figure 15A:
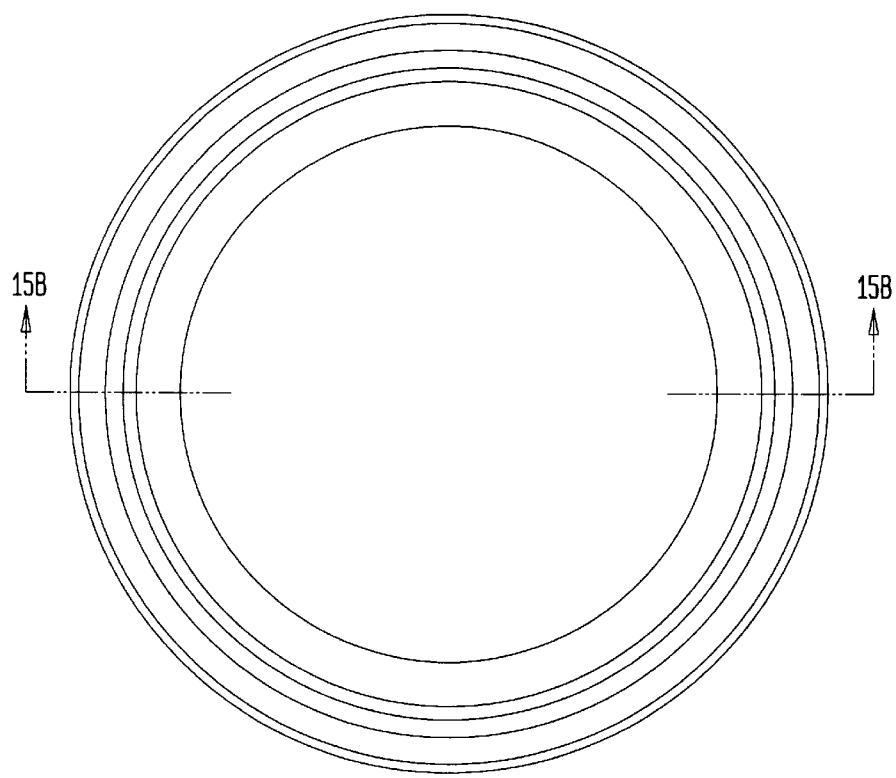
FIGS. 15A through C include cross sectional views of the plate shown in FIGS. 14A and B.
Figure 15B:
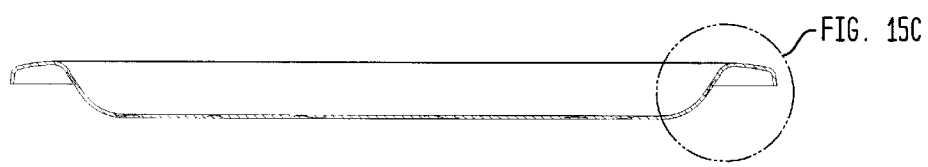
Figure 15C:
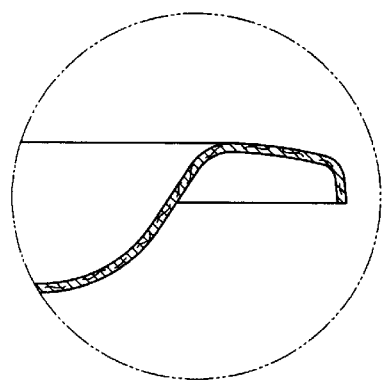
Figure 16:
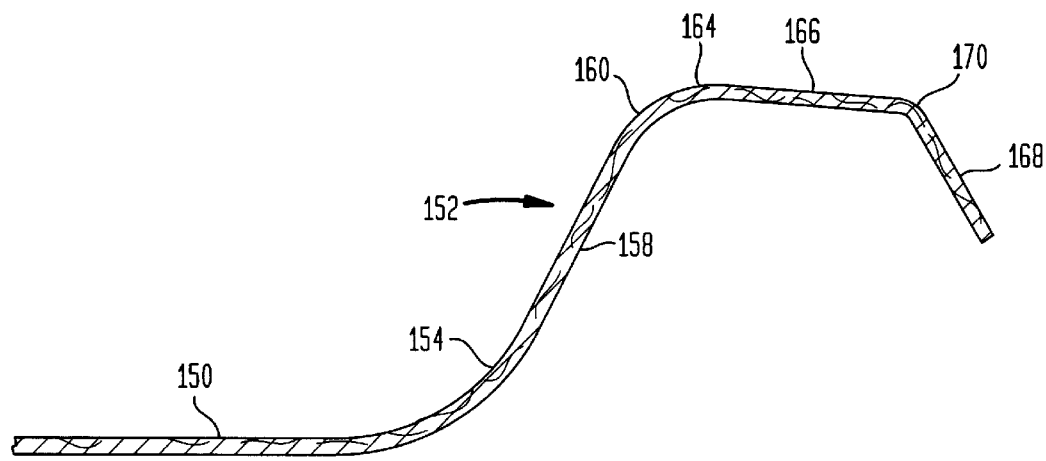
FIG. 16 is a radial cross-section of the plate shown in FIGS. 14A and B.
Figure 17:
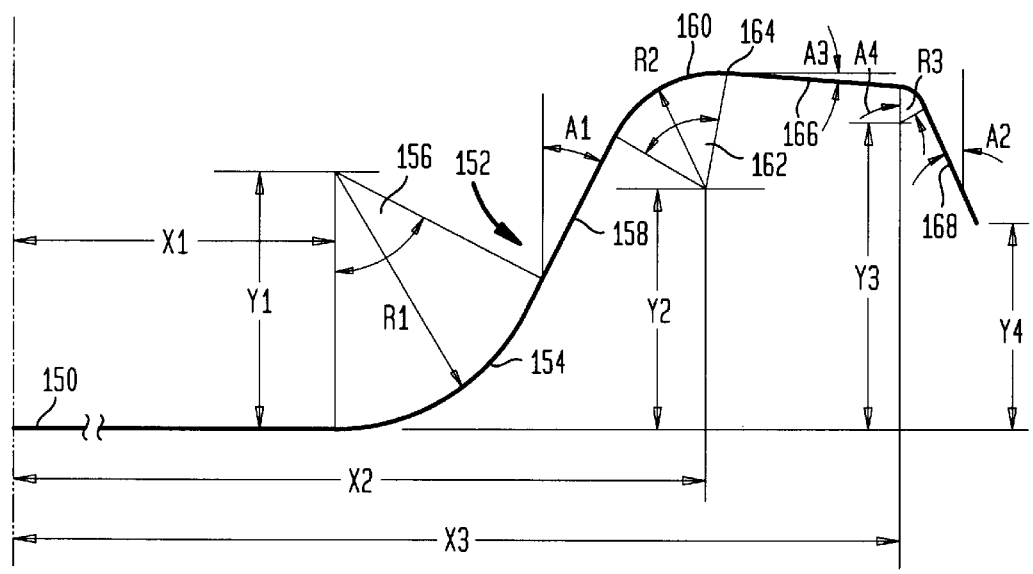
FIG. 17 is a schematic profile of the plate shown in FIGS. 14A and B, beginning from the center line of the plate, formed in accordance with the present invention.

The extrusion of coupled mica and polypropylene blends was conducted on a 6" commercial extruder line. The extruder was an Egan 24/1 L/D with a general purpose screw. The die was an Extrusion Die Inc. 52" coat hanger type. The stack conditioning rolls were top polished chrome, middle matte (40 RA surface), and bottom polished chrome. The matte chill roll assisted with the formation of the micronodular surface during thermoforming of the sheet with beneficially improving breadth of forming temperature window in contrast with non-matted smooth sheets. The differences between surfaces of the various sheets and plates made therefrom may be better appreciated by reference to FIGS. 12 and 13 hereof. FIG. 12A is a scanning electron photomicrograph of surface A of Table 16, while FIG. 12B is a scanning electron photomicrograph of surface B of Table 16. FIG. 13A is a scanning electron photomicrograph of surface G of Table 16 and FIG. 13B is a scanning electron photomicrograph of surface H of Table 16.

The roughness of various surfaces is compared in Table 16 below.

TABLE 16

Roughness and Gloss Properties of PP/30% Mica Extruded Sheets and Thermoformed Plates

| Surface | Sheet Thermoforming Temperature (° F.) | Parker Roughness (microns) | Gloss (75%) |
|---|---|---|---|
| A | — | 8.56 ± 0.39 | 4.99 ± 0.11 |
| B | — | 15.82 ± 0.74 | 8.05 ± 0.30 |
| C | 305 | 13.14 ± 0.74 | 14.3 ± 1.0 |
| D | 300 | 11.74 ± 0.86 | 11.6 ± 1.0 |
| E | 292 | 12.10 ± 0.82 | 11.7 ± 1.0 |
| F | 265 | 10.63 ± 0.68 | 8.20 ± 0.6 |
| G | — | 6.17 | 82.10 |
| H | — | 5.14 | 80.75 |

(A) Matte extruded sheet having top matte side.
(B) Extruded sheet (A)—bottom side opposite to matte side
(C,D,E,F) Plate—eating side corresponding to top matte side of (A)
(G) Non-matte extruded sheet—top side (no matte roll)
(H) Non-matte extruded sheet—bottom side (no matte roll)

For a non-matte extruded sheet, usually plate gloss and plate roughness are inversely related (e.g., high gloss corresponds to low roughness and vice versa as demonstrated in prior art data generally obtained). In that case, achieving desirable micronodular texture is within a temperature range (about 295° F. to 305° F.) where above this range the forming process is sag limited while below this range the plate exhibits poor micronodular character as manifested by high gloss and low roughness.

The use of a matte roll in the chill roll stack portion of the extrusion process effectively broadens the commercially attractive thermoforming process temperature range (about 265° F. to 305° F.). Specifically, plates having acceptable surface micronodularity can be formed at lower temperatures, whereby the decrease in plate roughness is compensated by an unexpected decrease in plate gloss using sheet surface (A). This beneficial increase in plate forming temperature window from about 10° F. to about 40° F. is brought about by imparting a matte surface finish to the extruded sheet.

The extruded sheet used in the suitable forming and thermoforming process, or the preferred thermoforming process as shown in FIG. 2 has a thickness of about 0.010 to 0.080 inches, suitably 0.010 to 0.030 inches, and preferably 0.015 to 0.25 inches. Suitable mica filler loading level in the extruded sheet is in the range of 25–30 weight percent, whereby mica flake aspect ratio is in the range of 30–300, more preferably 80–120, with particle size range of about 50–500 microns.

By matte finishing one side of the sheet using matte roll, the commercial thermoforming was suitably conducted at a broader temperature window of about 265° F. to 305° F. while without matte finishing, the thermoforming using the same commercial equipment was conducted at a temperature of about 295° F. to 305° F.

The runs on commercial equipment using PP/30% mica and PP/25% mica formulations showed that the thermoforming temperature window range has been expanded from about 10° F. (previous trial) to as high as about 35° F. This is primarily due to the fact that we beneficially used a matte roll in the chill roll stack during the extrusion process. This gave a smooth matte finish for the air side of the sheet (i.e., plate eating surface) while the rougher bottom side was in contact with the sandblasted mold side during the forming process. Use of matte sheet, in turn, enabled forming at lower temperatures (which is good for sag avoidance) without much loss in micronodularity. Specifically, the forming window was in the range of 265° F. to about 300° F. to 305° F. where best balance of process stability and product appearance/texture was seen at about 280° F. to 290° F.

Preferred Articles

The sheet of the present invention is suitably formed into plates or bowls having a circular configuration. These articles of manufacture may also be square or rectangular in shape having angular corners, such as found in a tray. Further, additional shapes such as triangular, multi-sided, polyhexal, etc., are contemplated including compartmented trays and plates as well as oval platters. In each contemplated embodiment, all corners are rounded or curved with a preferred plurality of embodiments of the present invention being depicted in FIGS. 14 through 33. The various embodiments shown in FIGS. 14 through 33, while illustrative of the present invention, are not intended to limit the invention and those of skill in the art may make changes without changing the essential characteristics of the invention. These containers may also have other features such as ridges, emboss, and deboss patterns suitable for enhancing the properties of the containers of this invention. These container's bottom sections may have a convex crown to improve stability and reduce rocking during use.

Throughout the following description, each of the dimensions are referenced with respect to a given diameter D which, in accordance with the present invention as illustrated in FIGS. 14 through 17 is approximately 8.75 inches. However, the particular diameter of the container is not a critical limitation and is only set forth herein by way of example. It is the relationship between the various portions of the rim configuration which are essential.

The planar inner region in accordance with the illustrated embodiment of a plate in FIGS. 14 through 17 has a radius X1 which is equal to approximately 0.3 D–0.4 D and preferably 0.348 D. This plate is descibed generally in U.S. Pat. No. 5,326,020 the disclosure of which is incorporated herein by reference. Adjoining an outer periphery of the planar inner region 150 is a sidewall portion 152 including annular region 154 having a radius of curvature equal to approximately 0.05 D–0.06 D and preferably 0.0572 D with the center point thereof being positioned a distance Y1 from the planar inner region 150. Included angle 156 of the annular region 154 is from about 40° to about 70° and preferably about 60°–65° or approximately 620. Adjoining the periphery of the annular region 154 is the first frusto-conical region 158 which slopes upwardly at an angle A1 with respect to the vertical from about 200 to about 350 and preferably about 25°–30 or approximately 27.50. Additionally, the frusto-conical region 158 is adjacent to the arcuate annular region 160 which includes a radius of curvature in the range of 0.015 D to 0.03 D and preferably approximately 0.024 D with the center point thereof being positioned a distance Y2 from the planar inner region 150. The included angle 162 of the arcuate annular region 160 may range from about 61° to about 82° and is preferably 66° to 77° or about 73°. The second portion 164 of the arcuate annular region 160, that is the distal portion of the arcuate annular region 160, is positioned such that a line tangent to the curvature of the arcuate annular region 160 at the second portion 164 slopes downwardly and outwardly at an angle of approximately 0° to 12°.

The combination of the annular region 154 and arcuate annular region 160 should combine to position the second portion 164 of the arcuate annular region 160 in the manner set forth herein above. That is, the included angle 156 of the annular region 154 when combined with the included angle 162 of the arcuate annular region 160 with the first frusto-conical region 158 spanning therebetween, positions the second portion 164 of the arcuate annular region 160 in a manner such that a second frusto-conical region 166, which extends substantially tangentially from the distal end of the second portion 164 of the arcuate annular region 160 extends outwardly and downwardly at an angle of about 0° to 12°. The second frustro-conical region 166 is of a length in a range from about 0.03 D to about 0.05 D and is preferably 0.04 D. Because the second frusto-conical region 166 extends substantially tangentially from the second portion 164 of the arcuatc annular region 160, the second frusto-conical region 166 extends outwardly and downwardly at an angle A3 in the range from approximately 0° to 12° with respect to a horizontal plane formed by the planar inner region 150.

Adjoining an outer periphery of the second frusto-conical region 166 is the lip 168 which is in the form of yet another frusto-conical region which extends outwardly and downwardly from the second frusto-conical region 166. The lip 168 is of a length of at least 0.005 D and is preferably approximately 0.010 D. Further, the lip (168) extends at an angle A2 of no more than 45° from vertical, preferably approximately 15° to 30° with respect to the vertical plane.

At the transition between the second frusto-conical region 166 and the lip 168 is a transition region 170. The transition region 170 includes a radius of curvature R3 which is in the range of about 0.008 D and 0.01 D and is preferably approximately 0.0092 D with the center point thereof being positioned a distance Y3 from the planar inner region 150. Additionally, the transition region 170 has an included angle A4 of approximately 48° to 70°.

Figure 18:
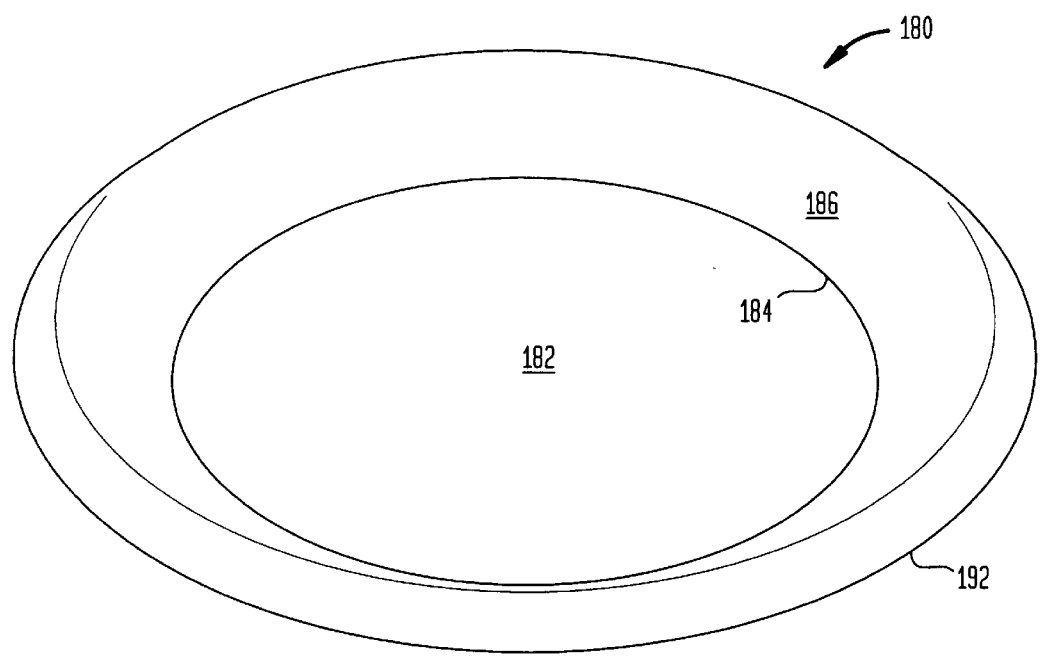
FIG. 18 is a drawing of another plate of this invention.
Figure 19:
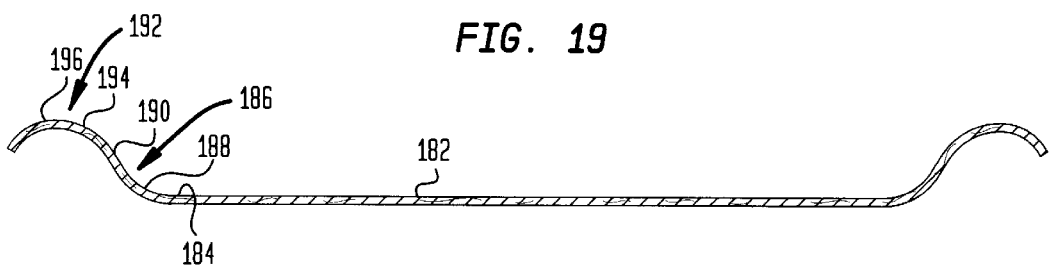
FIG. 19 is a cross sectional view of the plate shown in FIG. 18.
Figure 20:
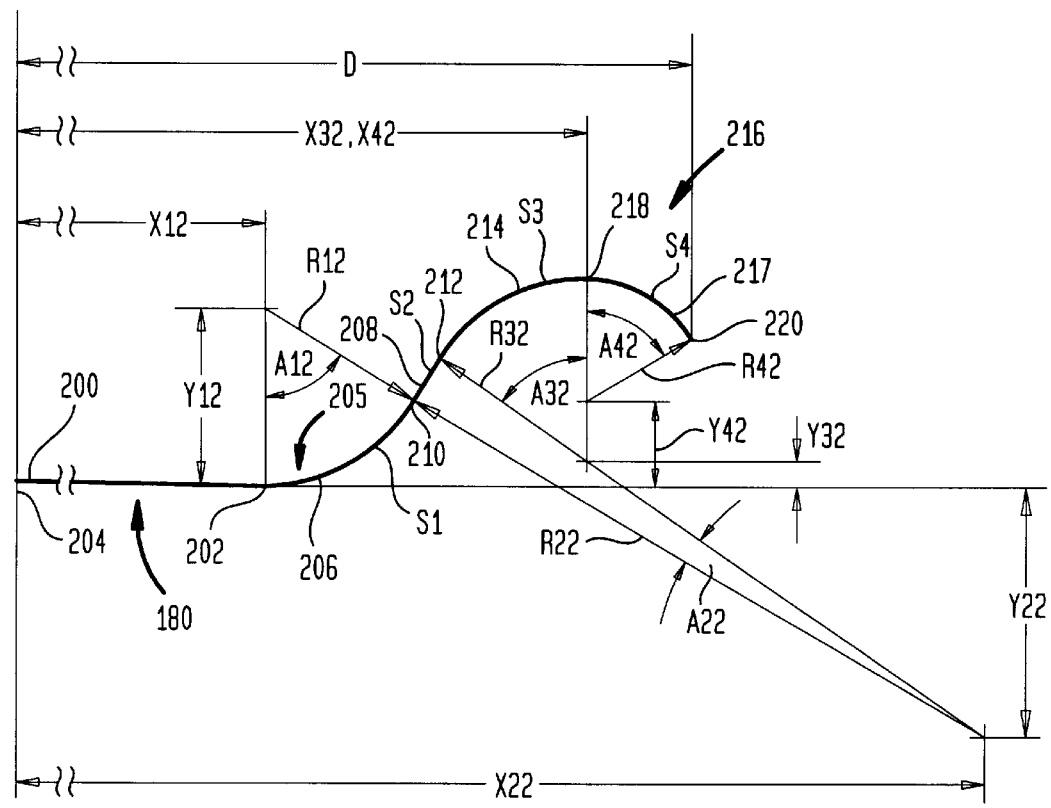
FIG. 20 is a schematic profile of the plate shown in FIG. 18 beginning from the center line.
Figure 21A:
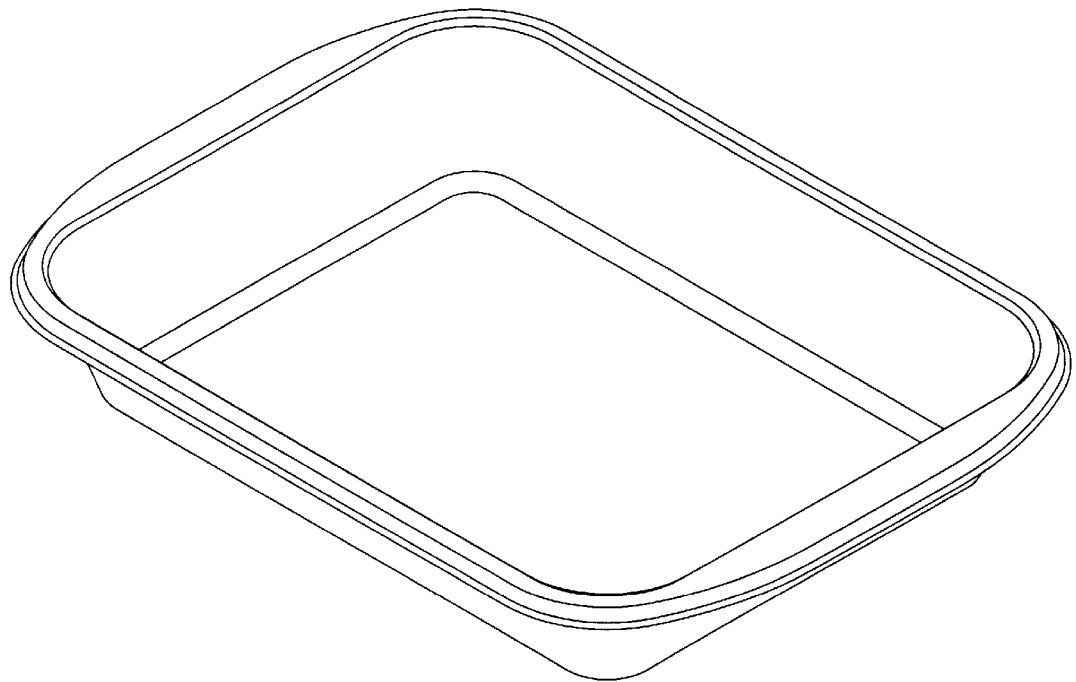
FIGS. 21A and 21B are drawings of a tray included in this invention.
Figure 21B:
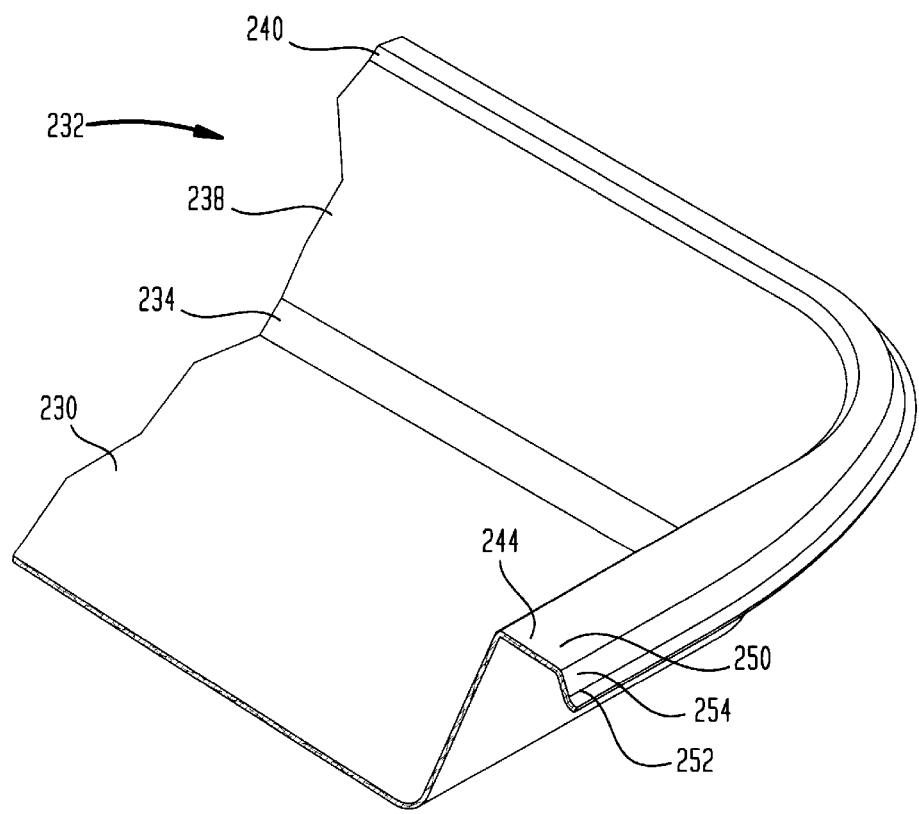
Figure 22A:
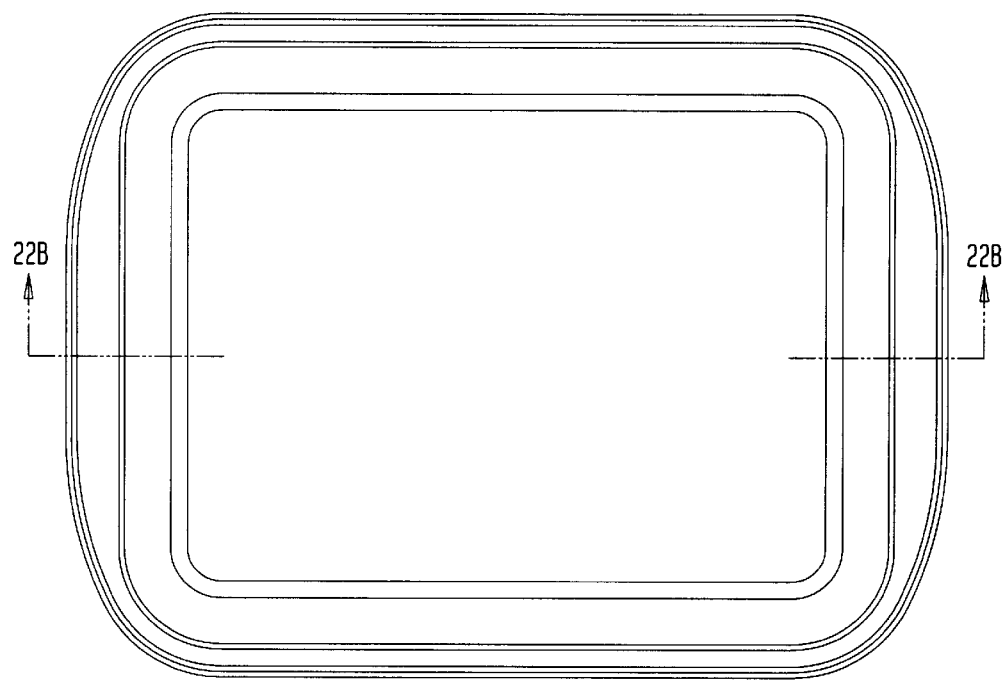
FIGS. 22A, B and C include a cross sectional view of the tray shown in FIGS. 21A and B.
Figure 22B:
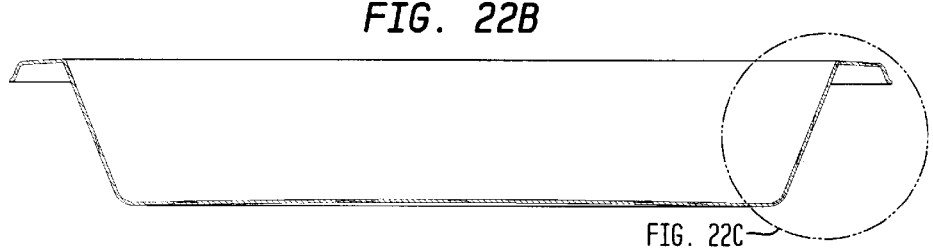
Figure 22C:
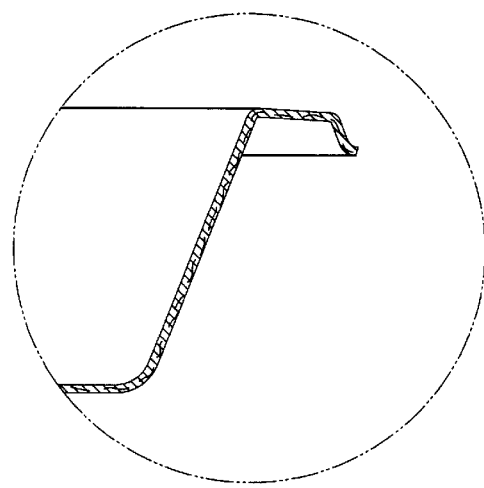
Figure 23:
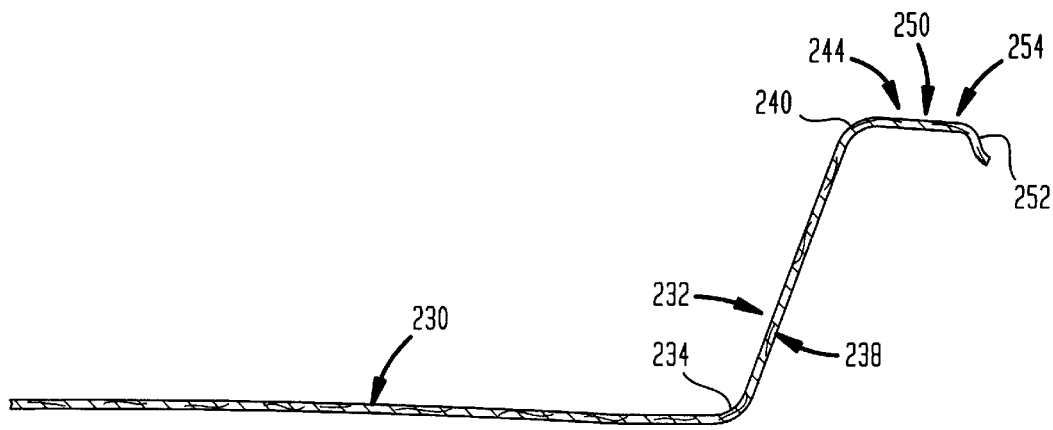
FIG. 23 is a radial cross section of the tray shown in FIGS. 21A and B.
Figure 24:
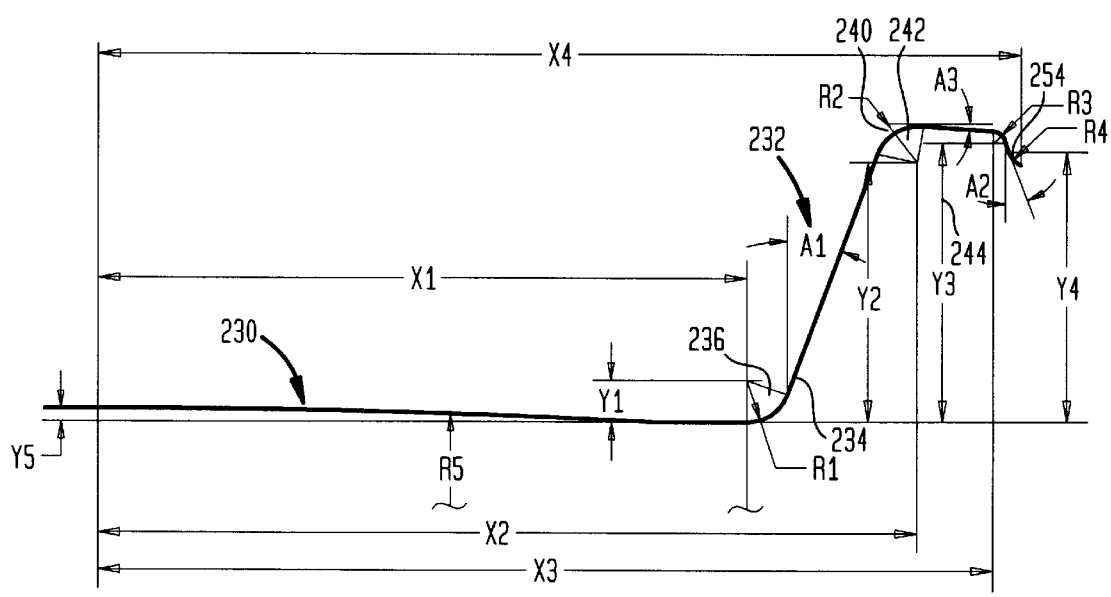
FIG. 24 is a schematic profile of the tray shown in FIGS. 21A and B beginning from the center line.
Figure 25A:
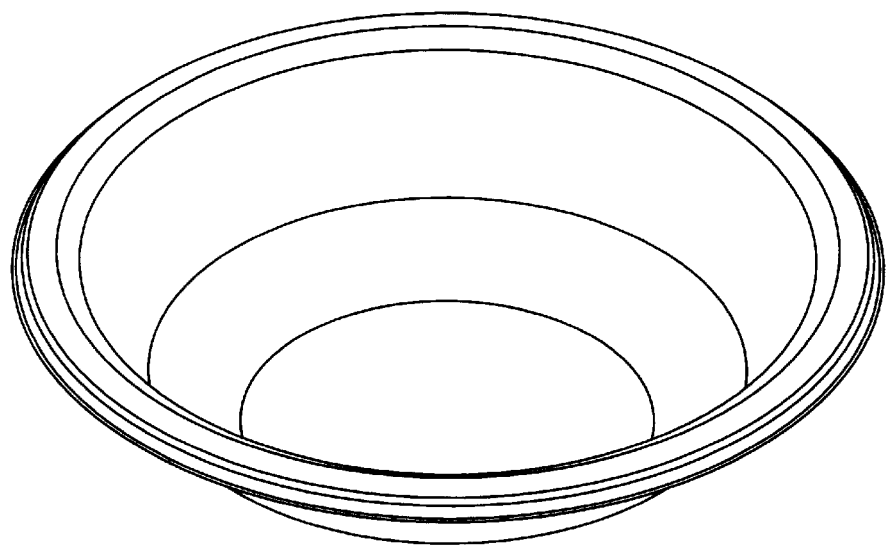
FIGS. 25A and B are drawings of a bowl of this invention.
Figure 25B:
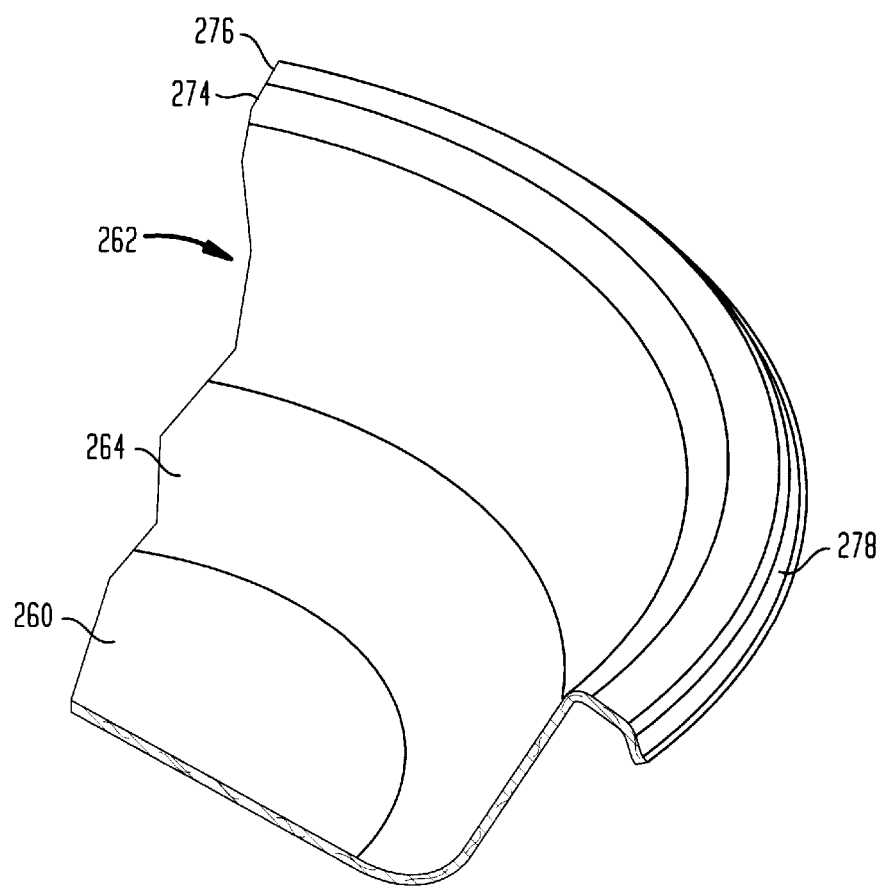
Figure 26A:
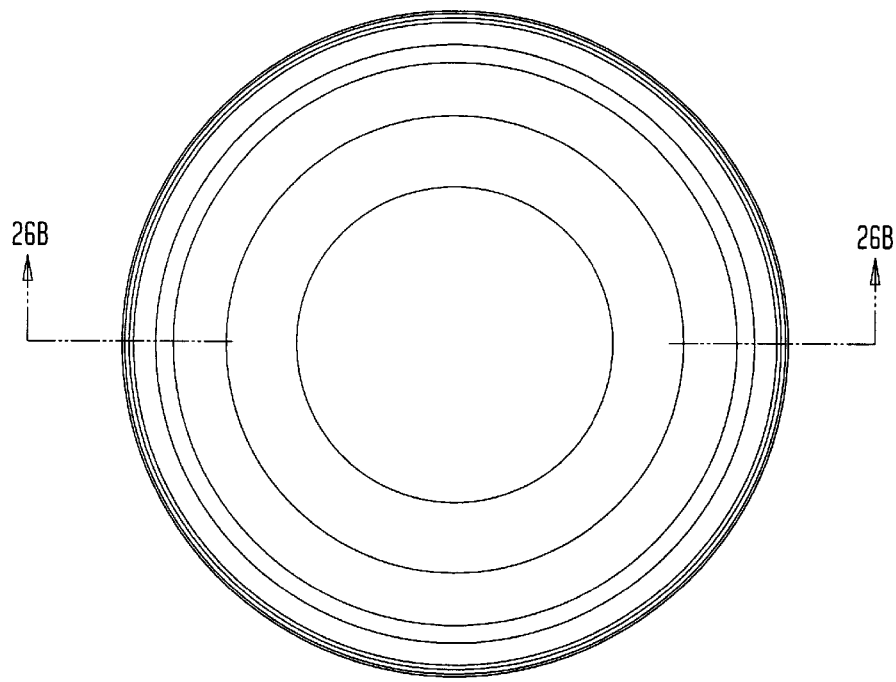
FIGS. 26A through C include a cross-sectional view of the bowl shown in FIGS. 25A and B.
Figure 26B:
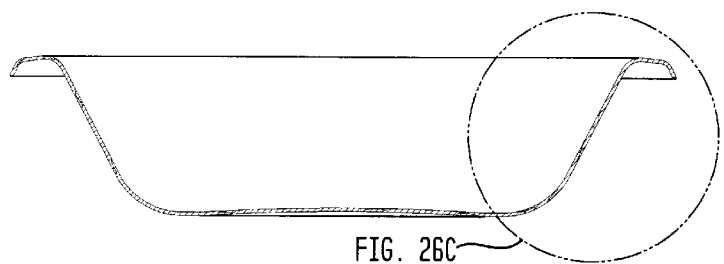
Figure 26C:
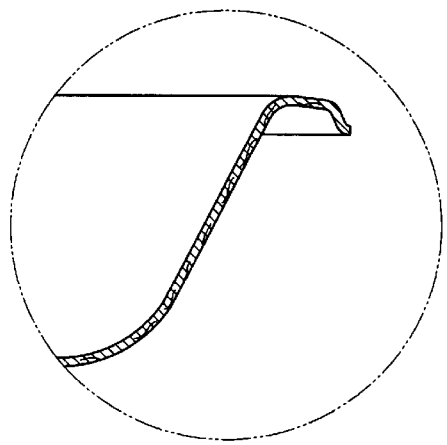
Figure 27:
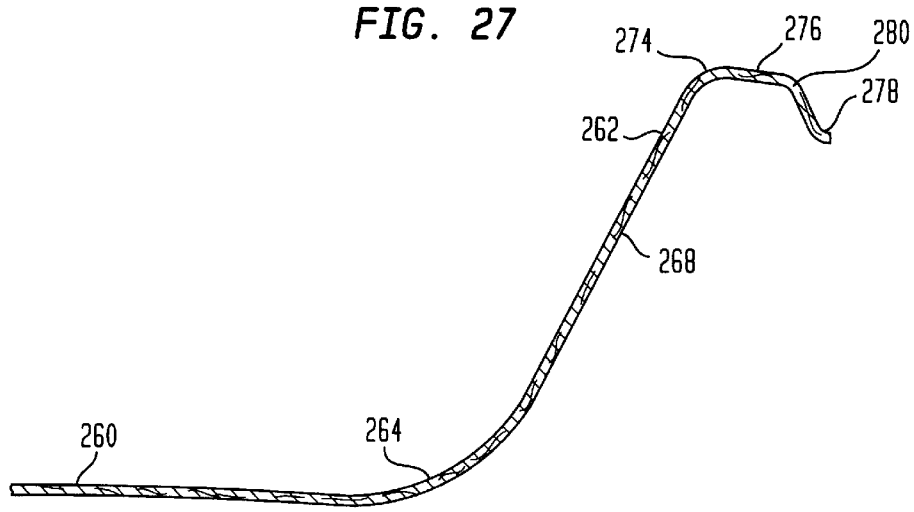
FIG. 27 is a radial cross section of the bowl shown in FIGS. 25A and B.
Figure 28:
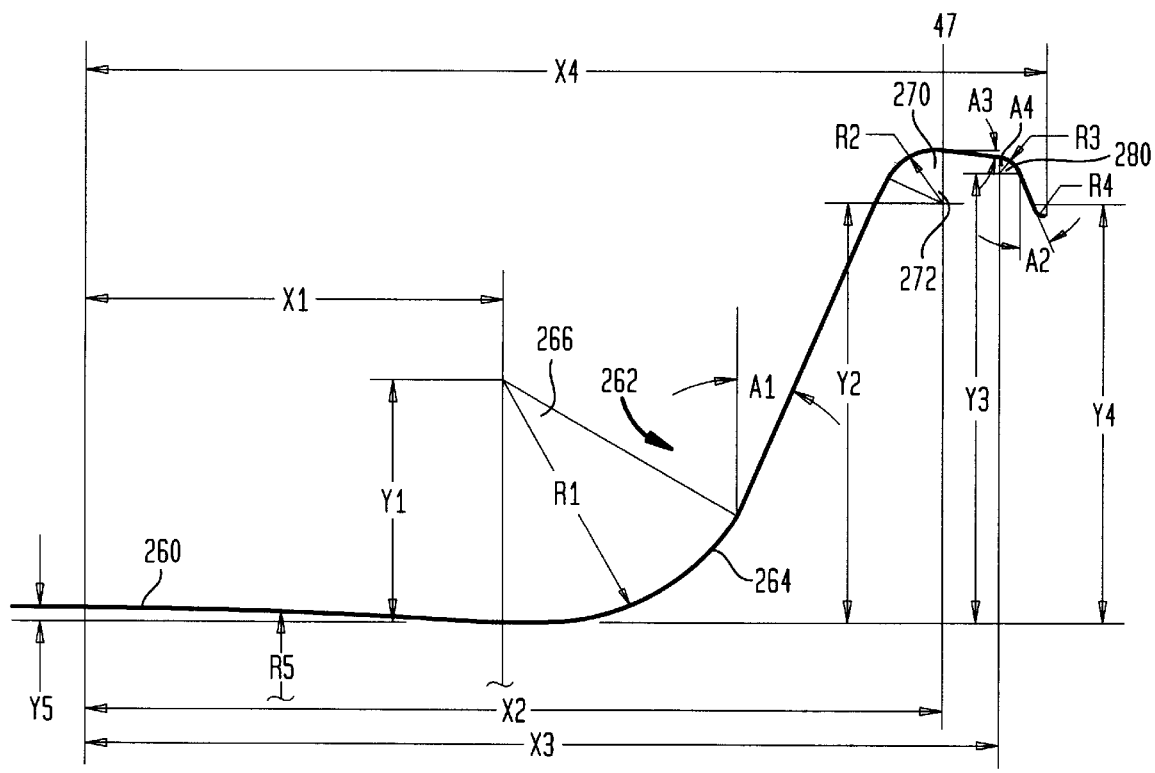
FIG. 28 is a schematic profile of the bowl shown in FIGS. 25A and B beginning from the center line.

The plates disclosed in FIGS. 18 through 20 generally have the dimensions of the plates disclosed in U.S. Pat. No. 5,088,640 which is incorporated herein by reference in its entirety. These containers may have other features such as ridges, emboss, and deboss patterns suitable for enhancing the properties of the containers of this invention. There is shown in FIGS. 18 through 20 a plate having a planar center including an outer peripheral surface. The planar center forms a bottom for the plate. An outwardly projecting sidewall includes a first rim portion joined to the outer peripheral surface of the planar center and a second rim portion joined to the first rim portion. The first and second rim portions form a sidewall of the plate. A third rim portion is joined to the second rim portion of the outwardly projecting sidewall and a fourth rim portion is provided for forming an outer edge of the container. The first rim portion is joined to the peripheral surface of the planar center at an angle having a second predetermined radius. The third rim portion is joined to the second rim portion at an angle having a third predetermined radius. The fourth rim portion is joined to the third rim portion at an angle having a fourth predetermined radius. The four radii as well as the four included angles are selected for enhancing rigidity of the plate as compared to a container made from the same material by other means as is further described below.

Illustrated in FIGS. 18–20, there is a plate 180 which includes a planar center 182 which, in turn, includes an outer peripheral surface 184. This center region 182 may have a slight convex crown to improve plate stability during use. The planar center 182 forms a bottom for the plate 180. An outwardly projecting sidewall 186 includes a first rim portion 188 which is joined to the outer peripheral surface 184 of the planar center 182. A second rim portion 190 is joined to the first rim portion 188. The first rim portion 188 and the second rim portion 190 form the outwardly projecting sidewall 186 which forms the sidewall of the plate 180. A rim 192 includes a third rim portion 194 which is joined to the second rim portion 190 of the outwardly projecting sidewall 186. A fourth rim portion 196 is joined to the third rim portion 194. The fourth rim portion 196 forms the outer edge of the plate 180.

FIG. 20 illustrates a partial cross-sectional view of a plate, diameter D, according to the present invention. The plate 180 defines a center line 204. A base or bottom-forming portion 200 extends from the center line 204 to an outer peripheral surface 202.

From the center line 204 a predetermined distance X12 extends toward the outer peripheral surface forming portion 202. A distance Y12 extends a predetermined distance from the base or bottom-forming portion 200 upwardly therefrom. A radius R12 extends from the intersection point of the distance X12 and Y12 to form a first rim portion 206 of the outwardly projecting sidewall 205. The first rim portion 206 is defined by an arc A12 which extends from the vertical line defined at the outer peripheral surface 202 to a fixed point 210. The arc A12 may be approximately 60°.

A distance X22 extends from the center line 204 to a predetermined point. A distance Y22 extends from the base or bottom-forming portion 200 of the plate 180 downwardly a predetermined distance. A radius R22 extends from the intersection of the lines X22 and Y22 to form a second rim portion 208 of the sidewall 205. The radius R2 extends from the first fixed point 210 to the second fixed point 212 through an arc A22. The arc A22 may be approximately 4°.

A distance X32 extends from the center line 204 to a predeterminded distance. A distance Y32 extends from the base or bottom-forming section 200 of the plate 180 to project upwardly a predetermined distance. A radius R32 extends from the intersection of the lines X32 and Y32 to form the third rim portion 214 of the rim 216. The radius R32 extends from the second fixed point 212 to a third fixed point 218. An arc A32 is formed between the second fixed point 212 and the third fixed point 218 to extend a predetermined distance. The arc A32 may be approximately 55°.

A distance X42 extends a predeterminded distance from the center line 204. Similarly, a distance Y42 extends from the base or bottom-forming section 200 of the plate 180 to project outwardly. A radius R42 extends from the intersection of the lines X42 and Y42 to form a fourth rim portion 217 of the rim 216. An arc A42 is formed between the third fixed point 218 and a fourth fixed point 220 at diameter D from the center line. The arc A42 may be approximately 60°. A section 220 forms the outer edge of the plate.

The container made according to the present invention may have any particular size as desired by the user so long as the relative profile dimensions are maintained. More specifically, ovals, rectangles with rounded corners and other shapes may be made having this profile. In various embodiments of the present invention the container may be a 9-inch or 11-inch plate with profile coordinates as illustrated in FIGS. 18 through 20 having the dimensions, angles, or relative dimensions enumerated in Tables 17 through 19.

TABLE 17

Dimensions and Angles For 9" Plate

| DIMENSION and ANGLES | VALUE (inches or degrees) |
|---|---|
| R12 | 0.537 |
| X12 | 3.156 |
| Y12 | 0.537 |
| R22 | 2.057 |
| X22 | 5.402 |
| Y22 | 0.760 |
| R32 | 0.564 |
| X32 | 4.167 |
| Y32 | 0.079 |
| R42 | 0.385 |
| X42 | 4.167 |
| Y42 | 0.258 |
| A12 | 60.00° |
| A22 | 4.19° |
| A32 | 55.81° |
| A42 | 60.00° |
| D | 9.00 |
| BOTTOM CONVEX CROWN | 0.06 |

TABLE 18

Dimensions and Angles For 11' PLATE

| DIMENSION and ANGLES | VALUE (inches or degrees) |
|---|---|
| R12 | 0.656 |
| X12 | 3.857 |
| Y12 | 0.656 |
| R22 | 2.514 |
| X22 | 6.602 |
| Y22 | 0.929 |
| R32 | 0.689 |
| X32 | 5.093 |
| Y32 | 0.097 |
| R42 | 0.470 |
| X42 | 5.093 |
| Y42 | 0.315 |
| A12 | 60.00° |
| A22 | 4.19° |
| A32 | 55.81° |
| A42 | 60.00° |
| D | 11.00 |
| BOTTOM CONVEX CROWN | 0.06 |

TABLE 19

Dimensions For 9 and 11 INCH PLATE

| DIMENSION RATIO OR ANGLE | VALUES (Dimensionless or degrees) | | |
|---|---|---|---|
| | PREFERRED | MINIMUM | MAXIMUM |
| R12/D | 0.060 | 0.045 | 0.075 |
| X12/D | 0.351 | 0.280 | 0.420 |
| Y12/D | 0.060 | 0.045 | 0.075 |
| R22/D | 0.228 | 0.180 | 0.275 |
| X22/D | 0.600 | 0.480 | 0.720 |
| Y22/D | 0.084 | 0.065 | 0.100 |
| R32/D | 0.063 | 0.050 | 0.075 |
| X32/D | 0.463 | 0.370 | 0.555 |
| Y32/D | 0.009 | 0.007 | 0.011 |
| R42/D | 0.043 | 0.034 | 0.052 |
| X42/D | 0.463 | 0.370 | 0.555 |
| Y42/D | 0.029 | 0.023 | 0.035 |
| A12 | 60.00° | 55.00° | 75.00° |
| A22 | 4.19° | 1.00° | 10.00° |
| A32 | 55.81° | 45.00° | 75.00° |
| A42 | 60.00° | 45.00° | 75.00° |

Salient features of the plate illustrated in FIGS. 18 through 20 generally include a substantially planar center portion (which may be crowned as noted above and illustrated throughout the various figures) with four adjacent rim portions extending outwardly therefrom, each rim portion defining a radius of curvature as set forth above and further noted below. The first rim portion extends outwardly from the planar center portion and is convex upwardly as shown. There is defined by the plate a first arc A12 with a first radius of curvature R12 wherein the arc has a length S1. A second rim portion is joined to the first rim portion and is downwardly convex, subtending a second arc A22, with a radius of curvature R22 and a length S2. A third, downwardly convex, rim portion is joined to the second rim portion and subtends an arc A32. There is defined a third radius of curvature R32 and a third arc length S3. A tangent to the third arc at the upper portion thereof is substantially parallel to the planer center portion as shown in FIG. 20. A fourth rim portion is joined to the third rim portion, which is also downwardly convex. The fourth rim portion subtends a fourth arc A42 with a length S4, with a radius of curvature R42.

The length of the second arc, S2 is generally less the length of the fourth arc S4, which, in turn, is less than the length S1 of the first arc A12. The radius of curvature R42 of the fourth arc is less than the radius of curvature R32 of the third rim portion, which in turn, is less than radius of curvature R22 of the second rim portion. The angle of the first arc, A12 is generally greater that about 55 degrees, while, the angle of the third arc, A32 is generally greater than about 45 degrees as is set forth in the foregoing tables. The angle of the fourth arc A42 is generally less than about 75 degrees and more preferably is about 60 degrees.

Typically, the length S1 of arc A12 is equivalent to the length S3 of arc A32 and R12 of the first rim portion is equivalent in length to the radius of curvature R32 of the third rim portion.

Generally speaking, the height of the center of curvature of the first arc (that is the origin of ray R12) above the central planar portion is substantially less than, perhaps twenty five percent or so less than, the distance that the center of curvature of the second rim portion (the origin of ray R22) is below the central planar portion. In other words, the length Y12 is about 0.75 times or less the length Y22.

So also, the horizontal displacement of the center of curvature of the second rim portion from the center of curvature of the first rim portion is at least about twice the length of the first radius of curvature R12. The height of the center of curvature of the third rim portion above the central planar portion is generally less than the height of the center of curvature of the fourth rim portion above the plane of the central planar portion. The horizontal displacement of the center of curvature of the second rim portion is generally outwardly disposed from the center of curvature of the third and fourth rim portions.

A final noteworthy feature of the plate of FIGS. 18 through 20 is that the height of the center of curvature of the third rim portion above the planar central portion is less than about 0.75 times the radius of curvature R42 of the fourth rim portion; while the height of the center of curvature of the fourth rim portion above the plane of the central portion is at least about 0.4 times the first radius of curvature R12.

Yet other embodiments of this invention include trays which have either the DIXIE® Superstrong profile as illustrated in FIGS. 21 through 24 and/or described in U.S. Pat. No. 5,326,020 assigned to the assignee of the present invention and incorporated herein by reference into this application. These trays may have other features such as ridges, emboss, and deboss patterns suitable for enhancing the properties of the trays of this invention. Throughout the following description of FIGS. 21 through 24, each of the dimensions are referenced to either the length DI or the width D2, which are approximately 10.90 and 8.00 inches respectively. D1 is larger than or equal to D2. However, the particular length and width of these containers is not a critical limitation and is only set forth herein by way of example. It is the relationship between the various portions of the rim configurations which are essential. The planar inner region 101 in accordance with the illustrated embodiment in FIGS. 21A through 24, has a length 1X which is equal to approximately 0.3 D1 to 0.4 D1 and 0.3 D2 to 0.4 D2 and preferably 0.354 D1 and preferably 0.342 D2. Adjoining an outer periphery of the planar inner region 230 is a sidewall portion 232 including annular region 234 having a radius of curvature equal to approximately 0.02 D1 to 0.03 D1 and 0.025 D2 to 0.035 D2 and preferably 0.023 D1 and 0.031 D2 with the center point thereof being positioned a distance Y1 from the planar inner region 230. Included angle 236 of the annular region 234 is from about 40° to about 80° and preferably about 65° to 75° or approximately 69°. Adjoining the periphery of the annular region 234 is the first frusto-conical region 238 which slopes upwardly at an angle Al with respect to the vertical from about 10° to about 50° and preferably about 15° to 25° or approximately 21°. Additionally, the frusto-conical region 238 is of a length greater than about 0.05 D1 and 0.055 D2, preferably from about 0.1 D1 to 0.2 D1 and 0.15 D2 to 0.25 D2 and more preferably approximately 0.15 D1 and 0.19 D2. Further, adjoining the first frusto-conical region 238 is the arcuate annular region 240 which includes a radius of curvature in the range of 0.005 D1 to 0.007 D1 and 0.007 D2 to 0.009 D2 and preferably approximately 0.006 D1 and 0.008 D2 with the center point thereof being positioned a distance Y2 from the planar inner region 230. The included angle 242 of the arcuate annular region 240 may range from about 40° to about 92° and is preferably 65° to 87°. The second portion 244 of the arcuate annular region 240, that is the distal portion of the arcuate annular region 240 is positioned such that a line tangent to the curvature of the arcuate annular region 240 at the second portion 244 slopes downwardly and outwardly at an angle of approximately 0° to 12°.

The combination of the annular region 234 and arcuate annular region 240 should combine to position the second portion 244 of the arcuate annular region 240 in the manner set forth herein above. That is, the included angle 246 of the annular region 234 when combined with the included angle 242 of the arcuate annular region 240 with the first frusto-conical region 248 spanning therebetween, positions the second portion 244 of the arcuate annular region 240 in a manner such that the second frusto-conical region 250, which extends substantially tangentially from the distal end of the second portion 244 of the arcuate annular region 240 extends outwardly and downwardly at an angle of about 0° to 12°. The second frusto-conical region 250 is of a length in a range from about 0.045 D1 to about 0.055 D1 and 0.030 D2 to about 0.040 D2 and is preferably 0.052 D1 and 0.034 D2. Because the second frusto-conical region 250 extends substantially tangentially from the second portion 244 of the arcuate annular region 240, the second frusto-conical 250 extends outwardly and downwardly at an angle A3 in the range from approximately 0° to 12° with respect to a horizontal plane formed by the planar inner region 230.

Adjoining an outer periphery of the second frusto-conical region 238 is the lip 252 which is in the form of yet another frusto-conical region which extends outwardly and downwardly from the second frusto-conical region 250. The lip 252 is of a length of at least 0.006 D1 and 0.009 D2 and is preferably approximately 0.010 D1 and 0.013 D2. Further, the lip 252 extends at an angle A2 of no more than 45° from vertical, preferably approximately 10 to 300 with respect to the vertical plane and more preferably approximately 20°.

At the transition between the second frusto-conical region 250 and the lip 252 is a transition region 254. The transition region 254 includes a radius of curvature R3 which is in the range of about 0.005 D1 to 0.007 D1 and 0.007 D2 to 0.009 D2 and is preferably approximately 0.006 D1 and 0.008 D2 with the center point thereof being positioned a distance Y3 from the planar inner region 230. Additionally, the transition region 254 has an included angle A4 of approximately 48° to 80°.

There is shown in FIGS. 25 through 28 still yet another embodiment of the inventive articles. Throughout the following description of FIGS. 25 through 28, each of the dimensions are referenced with respect to a given diameter D which, in accordance with the present invention as illustrated in FIGS. 25 through 28, is approximately 7.5 inches. However, the particular diameter of the containers is not a critical limitation and is only set forth herein by way of example. It is the relationship between the various portions of the rim configuration which are essential. The planar inner region 260 in accordance with the illustrated embodiment in FIGS. 25 through 28, has a radius XI which is equal to approximately 0.2 D to 0.3 D and preferably 0.25 D. Adjoining an outer periphery of the planar inner region 260 is a sidewall portion 262 including annular region 264 having a radius of curvature equal to approximately 0.05 D to 0.15 D and preferably 0.11 D with the center point thereof being positioned a distance Y1 from the planar inner region 260. Included angle 266 of the annular region 264 is from about 45° to about 75° and preferably about 60° to 70° or approximately 65°. Adjoining the periphery of the annular region 264 is the first frusto-conical region 268 which slopes upwardly at an angle Al with respect to the vertical from about 15° to about 45° and preferably about 20° to 30° or approximately 25°. Additionally, the frusto-conical region 268 is of a length greater than about 0.1 D preferably from about 0.17 D to about 0.19 D and more preferably approximately 0.18 D. Further, adjoining the first frustro-conical is the arcuate annular region 270 which includes a radius of curvature in the range of 0.01 5 D to 0.030 D and preferably approximately 0.023 D with the center point thereof being positioned a distance Y2 from the planar inner region 260. The included angle 272 of the arcuate annular region 270 may range from about 45° to about 87° and is preferably 60° to 77°. The second portion 274 of the arcuate annular region 270, that is the distal portion of the arcuate annular region 270 is positioned such that a line tangent to the curvature of the arcuate annular region 270 at the second portion 274 slopes downwardly and outwardly at an angle of approximately 0° to 12°.

The combination of the annular region 264 and arcuate annular region 270 should combine to position the second portion 274 of the arcuate annular region 270 in the manner set forth herein above. That is, the included angle 266 of the annular region 264 when combined with the included angle 272 of the arcuate annular region 270 with the first frusto-conical region 268 spanning therebetween, positions the second portion 274 of the arcuate annular region 270 in a manner such that the second frusto-conical region 276, which extends substantially tangentially from the distal end of the second portion 274 of the arcuate annular region 270 extends outwardly and downwardly at an angle of about 0° to 12°. The second frusto-conical region 276 is of a length in a range from about 0.02 D to about 0.04 D and is preferably 0.03 D. Because the second frusto-conical region 276 extends substantially tangentially from the second portion 274 of the arcuate annular region 270, the second frusto-conical region 276 extends outwardly and downwardly at an angle A3 in the range from approximately 0° to 12° with respect to a horizontal plane formed by the planar inner region 260.

Adjoining an outer periphery of the second frusto-conical region 268 is the lip 278 which is in the form of yet another frusto-conical region which extends outwardly and downwardly from the second frusto-conical region 276. The lip 278 is of a length of at least 0.01 D and is preferably approximately 0.017 D. Further, the lip 278 extends at an angle A2 of no more than 45° from vertical, preferably approximately 10° to 30° with respect to the vertical plane and more preferably approximately 25°.

At the transition between the second frusto-conical region 276 and the lip 278 is a transition region 280. The transition region 280 includes a radius of curvature R3 which is in the range of about 0.007 D and 0.012 D and is preferably approximately 0.009 D with the center point thereof being positioned a distance Y3 from the planar inner region 260. Additionally, the transition region 280 has an included angle A4 of approximately 48° to 80°.

Figure 29:
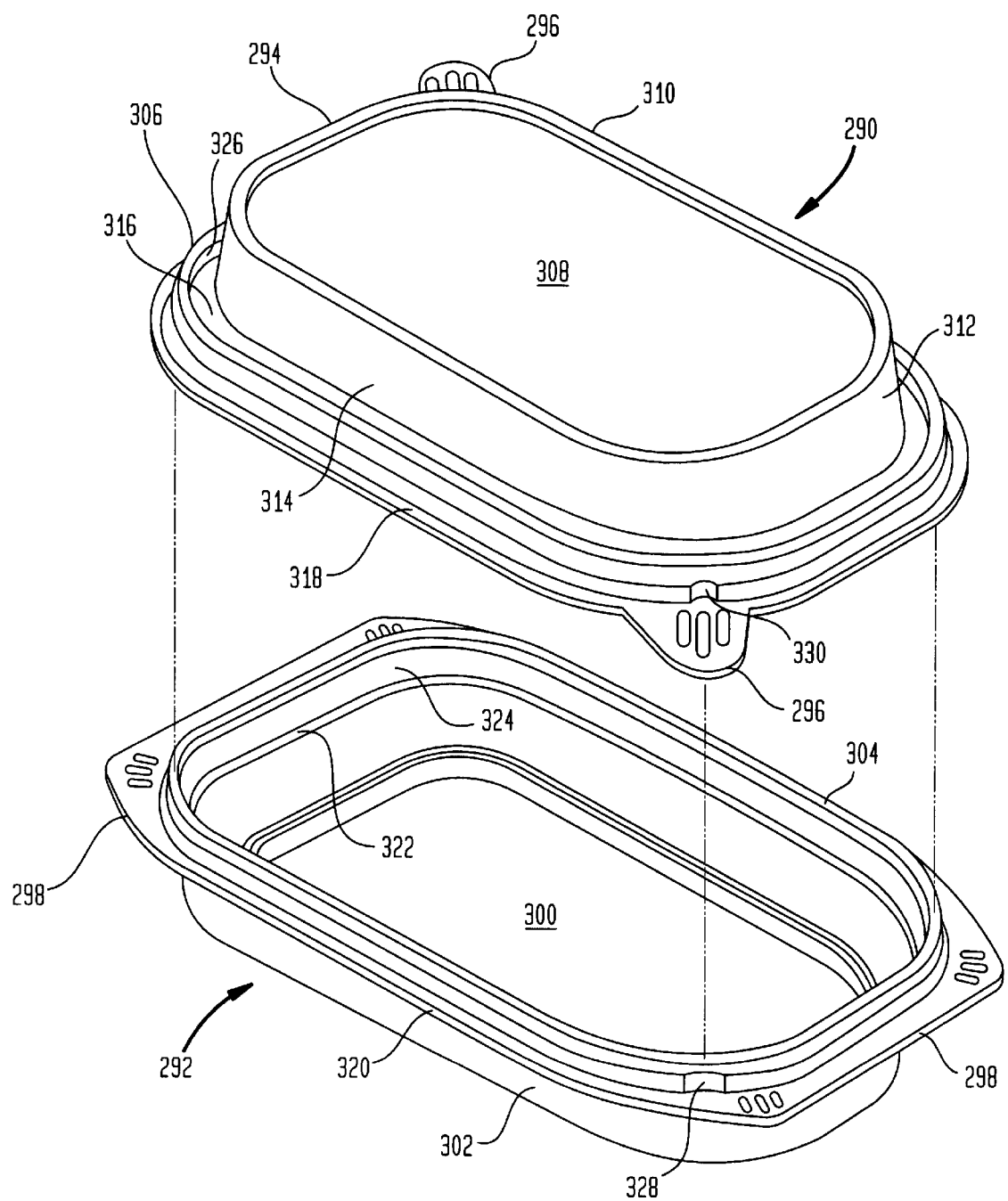
FIG. 29 is a drawing of a take-out food container included in this invention.
Figure 30A:
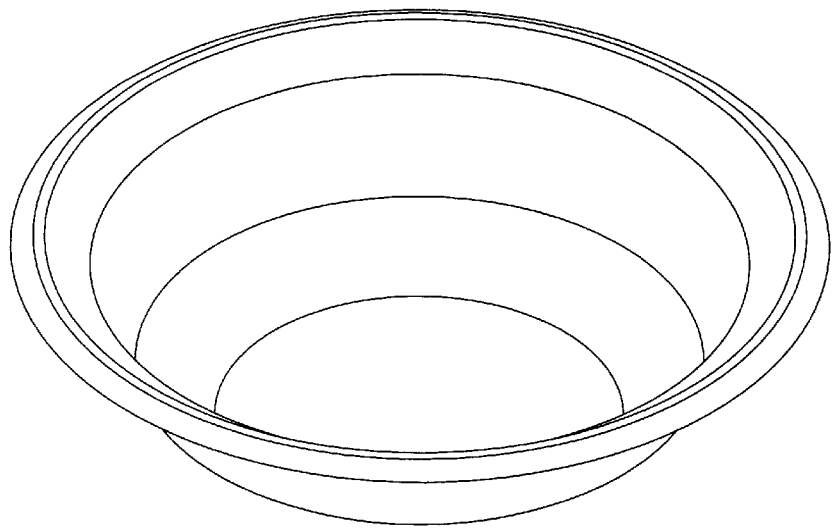
FIGS. 30A and B are drawings of another bowl of this invention.
Figure 30B:
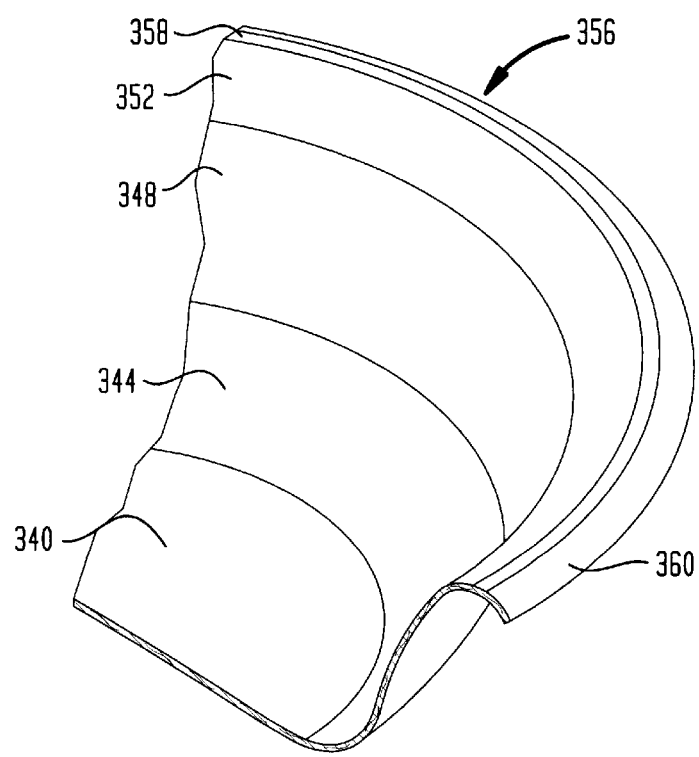
Figure 31A:
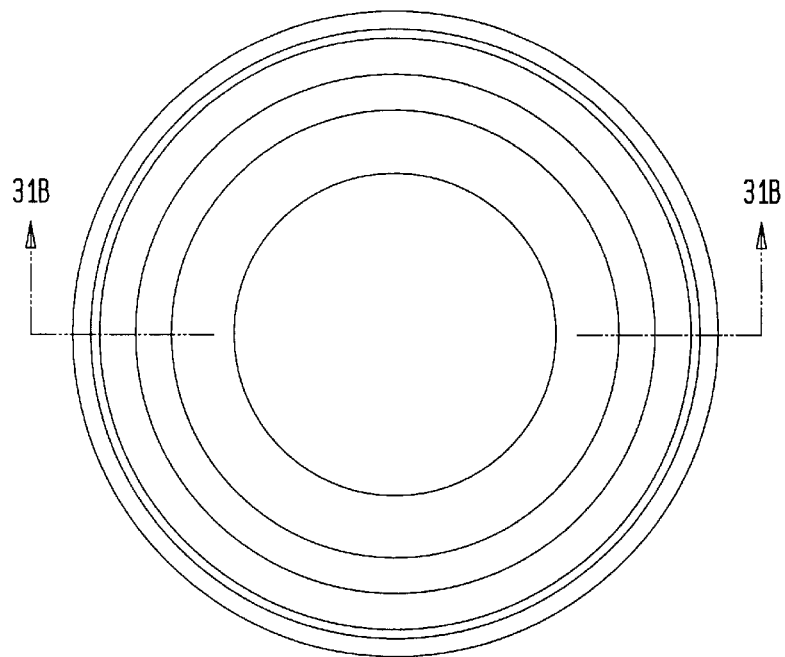
FIGS. 31A through 31C include a cross-sectional view of the bowl shown in FIGS. 30A and 30B.
Figure 31B:
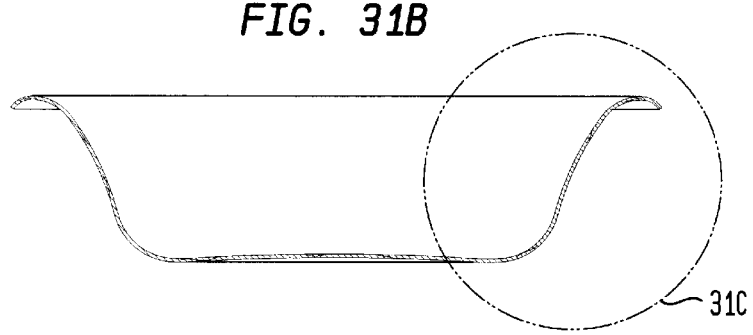
Figure 31C:
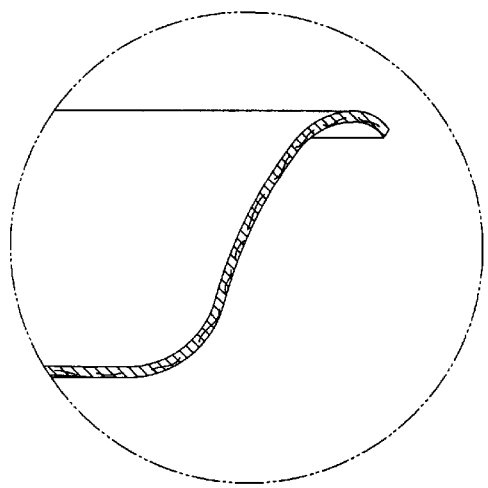
Figure 32:
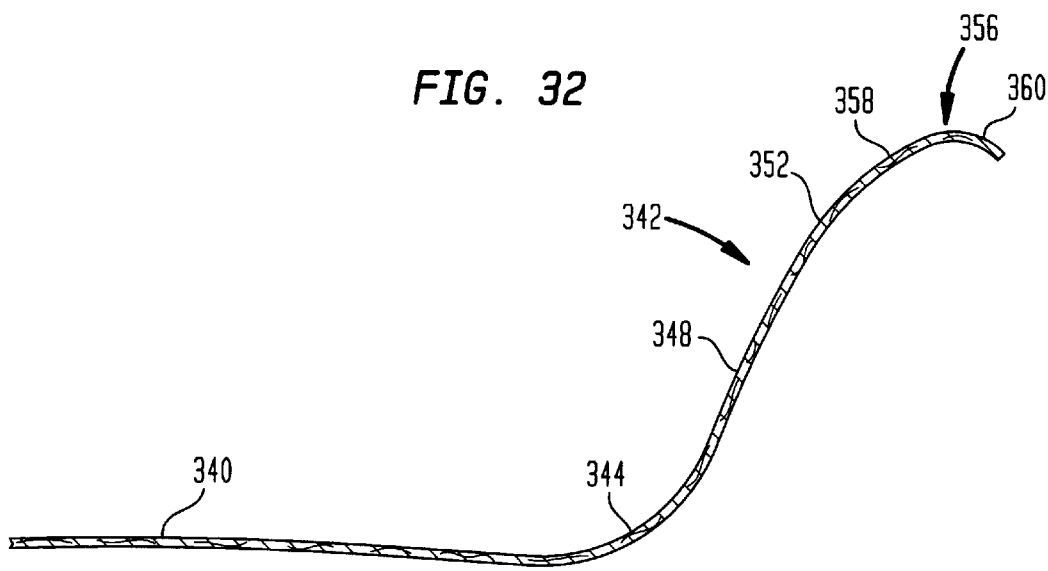
FIG. 32 is a radial cross section of the bowl shown in FIGS. 30A and 30B.
Figure 33:
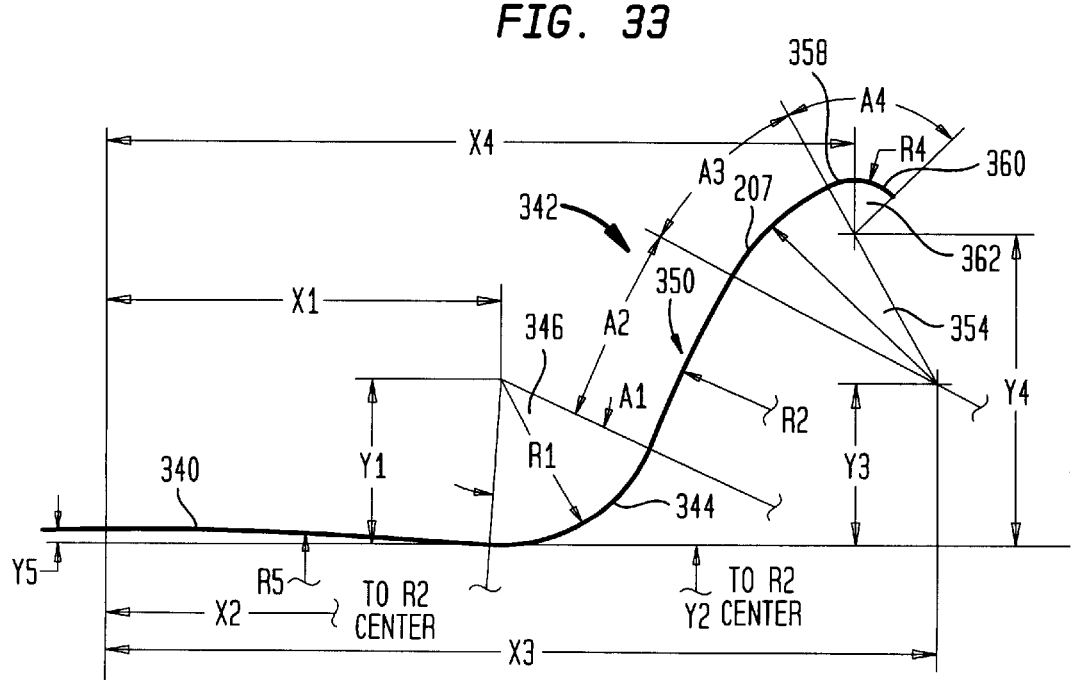
FIG. 33 is a profile of the bowl shown in FIGS. 30A and 30B.

There is shown in FIG. 29 yet another embodiment of a food contact article in accordance with the present invention. The containers of this invention may be formed as take-out containers, and a representative embodiment, a suitable take-out container, will now be described in general with respect to FIG. 29 wherein the lid and base may be formed as described in U.S. Pat. No. 5,377,860 which is incorporated herein by reference. While the container illustrated in FIG. 29 is oblong in configuration, the container may be round, oval, substantially rectangular or square as dictated by the contents which are to be placed within the container. The container 290 is formed of a base or bottom portion 292 and a lid 294. The lid 294 includes radially extending opening tabs 296 which cooperate with the radially extending opening tabs 298 of the base 292 in order to allow the consumer to readily open the sealed container. The base 292 of the container 290 includes a substantially planar bottom 300 and a substantially vertically extending peripheral sidewall 302. Integrally connected to the upstanding sidewall 302 is a sealing brim 304 which is received within a cooperating sealing brim 306 of the lid 294.

The lid 294 includes a substantially planar top portion 308 and a rim 310 extending about a periphery of the top portion 398. The rim 310 is provided in order to enhance the strength of an extended volume portion 312 of the lid 294. The rim 310 also serves to locate the base 292 on the lid when the lid is used as a stand.

The extended volume portion 312 is formed by extension wall 314 positioned about the perimeter of the rim 310 and extending downwardly therefrom. The extension wall 314 is integrally formed with a horizontal lid reinforcing ring 316 which is substantially parallel to the top portion 308 of the lid 294. The outer perimeter of the lid reinforcing ring 316 is further integrally formed with the sealing brim 306. Also, extending radially outward from the sealing brim 306 is a second horizontal lid reinforcing ring 318 which extends substantially parallel to the top portion 308 as well.

Similarly, the base 292 includes a horizontal lid reinforcing ring 320 which extends from the periphery of the sealing brim 304 for aiding in and maintaining the structural integrity of the sealing brim 304 as well as the container 290 as a whole. In addition to the reinforcing ring 320, a step 322 may be provided about an upper portion of the peripheral sidewall 302 for preventing nested units from becoming jammed together due to excessive interpenetration when stacked and nested. Also, formed in an upper portion of the sidewall 302 are undercuts 324 which cooperate with detents 326, only one of which is illustrated in FIG. 29 at the integral connection between a brim 306 and lid reinforcing ring 316. The detents, when engaged in the undercuts 324, provide an audible indication that the container is in fact sealed. Additionally, undercuts 328 may be provided in an outer periphery of the brim 304 for receiving detents 330 formed in an outer portion of the brim 306 for again providing an audible indication that the container is sealed. While the container illustrated in FIG. 29 shows detents and undercuts formed in both the inner and outer portions of the brims 324 and 306, respectively, it may be desired to provide respective detents and undercuts on only one side of the brim or to provide no undercuts and detents on either side of the brim.

In a yet still further embodiment of this invention another bowl is illustrated in FIGS. 30 through 33. Throughout the following description of the bowl of FIGS. 30 through 33, each of the dimensions are referenced with respect to a given diameter D which, in accordance with the present invention as illustrated is approximately 7.3 inches. However, the particular diameter of the containers is not a critical limitation and is only set forth herein by way of example. It is the relationship between the various portions of the rim configuration which are essential. The crowned inner region 340 in accordance with the illustrated embodiment in FIGS. 30 through 33, has a crown height Y5 which is approximately 0.004 D to 0.012 D or preferably 0.008 D, and encompassing a radius X1 which is equal to approximately 0.2 D to 0.3 D and preferably 0.25 D. Adjoining an outer periphery of the crowned inner region 340 is a sidewall portion 342 including first annular region 344 having a radius of curvature equal of approximately 0.05 D to 0.15 D and preferably 0.11 D with the center point thereof being positioned at distance Y1 from the tangency point between the crowned inner region 340 and the first annular region 344. Included angle 346 of the first annular region 344 is from about 45° to about 85° and is preferably 65° to 80° or approximately 72°. Adjoining the periphery of the first annular region 344 in the sidewall portion 342 is a second annular region 348 having a radius of curvature equal of approximately 0.8 D to 1.2 D and preferably 0.96 D with the centerpoint thereof being positioned a distance Y2 from the tangency point between the crowned inner region 340 and the first annular region 344. The included angle of arc A2 indicated generally at 350 of the second annular region 348 is from about 2° to 12° and is preferably 5° to 9° or approximately 7°. Adjoining the periphery of the second annular region 348 in the sidewall portion 342 is a third annular region 352 having a radius of curvature equal to approximately 0.1 D to 0.2 D and preferably 0.15 D with the centerpoint thereof being positioned a distance Y3 from the tangency point between the crowned inner region 340 and the first annular region 344. Included angle 354 of the third annular region 352 is from about 20° to 50° and is preferably 25° to 40° or approximately 33°. Adjoining the sidewall portion 342 is a flange portion 356 including a fourth annular region consisting of regions 358 and 360 which have the same radius of curvature. Adjoining the third annular region 352 is a fourth annular region beginning with annular region 358 which extends to the uppermost bowl height and continuing with annular region 360 to bowl diameter D. Annular regions 358 and 360 are equivalent to one annular region, flange portion 356 since both have the same radius of curvature of approximately 0.02 D to 0.05 D and preferably 0.03 D with the centerpoint thereof being positioned a distance Y4 from the tangency point between the crowned inner region 340 and the first annular region 344. Included angle 362 of the fourth annular region 356 is from about 45° to 85° and preferably 65° to 80° or approximately 73°.

Physical Properties, Heat Resistance and Food Contact Suitability

Figure 34:
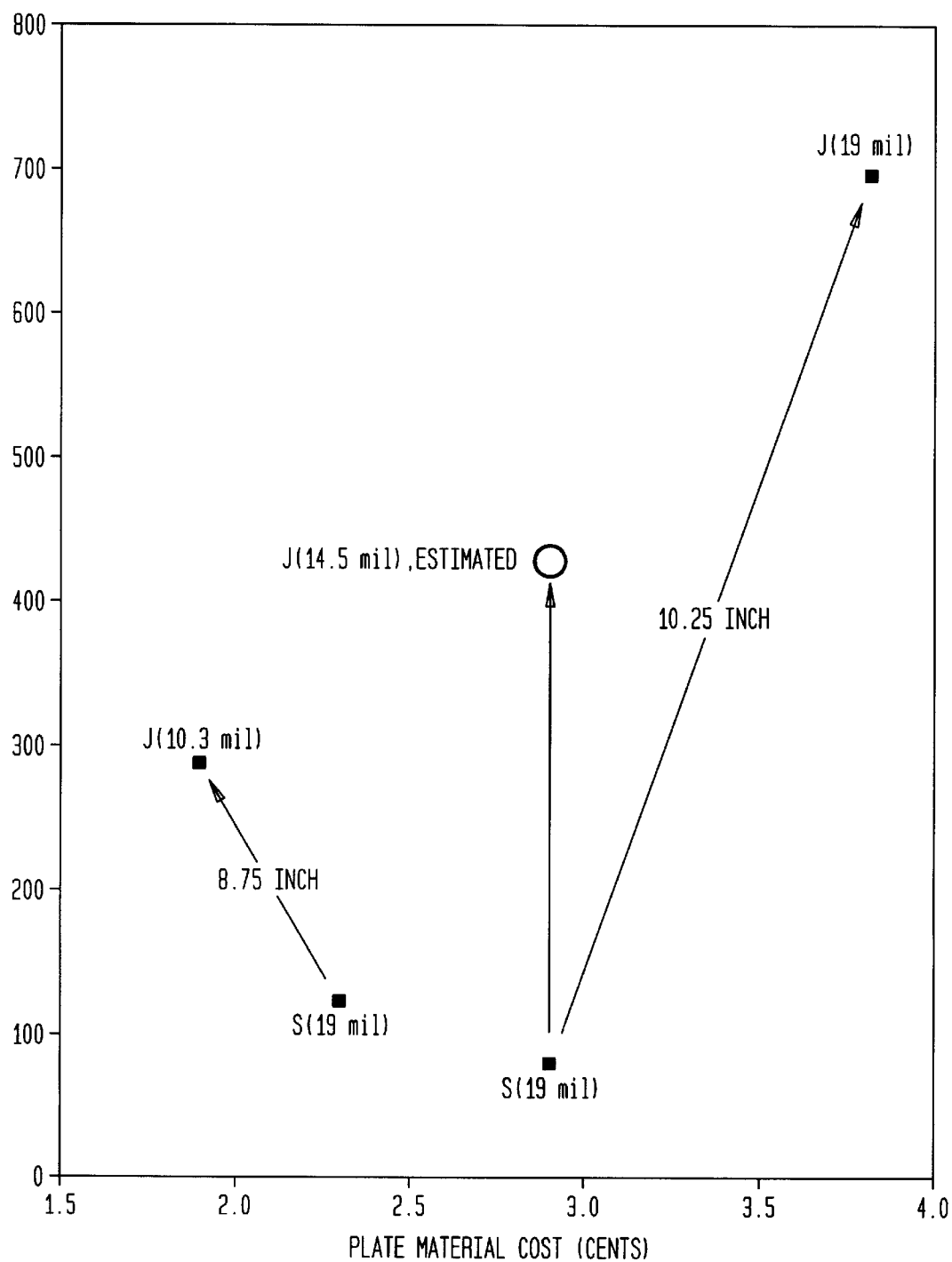
FIG. 34 is a graph comparing the rigidity of the plates of this invention with prior art commercial products in the context of current material costs.

FIG. 34 shows rigidity versus current plate material cost comparisons for mica filled polypropylene plates versus competitor plastic disposable plates. "J" refers to mica filled polypropylene plate of this invention and "S" refers to polystyrene based plates such as those currently manufactured by Solo Cup Company. Average plate calipers are indicated for each plate type and size. The left side of the diagram shows data for 8.75 inch plates whereby the J plate rigidity is about three times higher than S at significantly reduced caliper and cost. The right side of the diagram shows data for 10.25 inch plates whereby J plated rigidity is more than seven times higher S at the same caliper. The open circle point corresponds to an estimated rigidity for the 10.25 inch J plate that is scaled down in caliper so that plate material costs are equivalent to S.

The scaled J caliper X is calculated as X=(19 mil)(2.9 cents/3.8 cents). The theoretical rigidity R1 at equivalent cost for the downscaled caliper is calculated as:

$$(R1/R2) = (14.5 \text{ mil}/19 \text{ mil}) exp\ N$$

where R2 is the experimental rigidity at 19 mil and N=1.816 is the caliper exponent value for the Dixie Superstrong 10.25 inch plate design which is obtained from the general equation for rigidity:

$$R = (KE) T exp N$$

where E is Young's modulus, K is a shape constant, and T is caliper. The data set forth in FIG. 34 demonstrate that the rigidity of the J plate of this invention is significantly higher at equivalent or lower material cost than commercial polystyrene polymer based plates.

Figure 35:
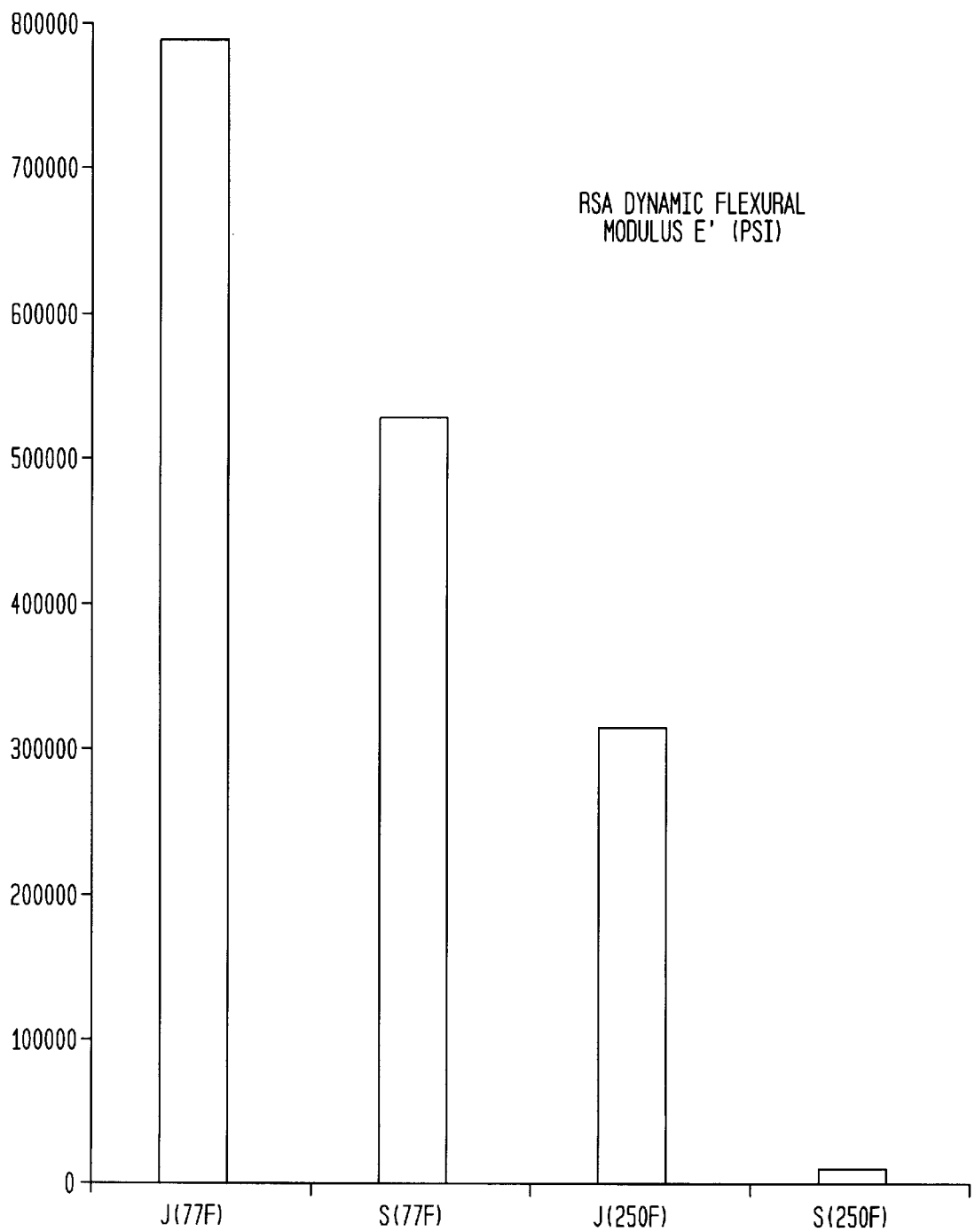
FIG. 35 is a bar graph comparing the heat resistance of the plates of this invention with prior art commercial products.

In FIG. 35, the heat resistance performance for mica filled polypropylene 10.25 inch plates (J), having an average caliper of 19 ml (J) is compared with (S) polystyrene based plates (S) of the same size and caliper. A measure of heat resistance is dynamic flexural storage modulus E', as measured with the Rheometrics Solids analyzer at 10 rad/sec. Higher E' values indicate increased stiffness and improved dimensional stability. Dynamic mechanical sprectroscopy is a common technique used for evaluation of viscoelastic properties of polymeric materials with respect to temperature and input frequency (deformation time scale). Dynamic mechanical properties of flat rectangular specimens of S plate material and PP/mica sheet of this invention were subjected to flexural deformation at 10 rad/sec, using the Rheometrics Solids Analyzer RSAII instrument, manufactured by Rheometric Scientific, and equipped with a dual cantilever bending fixture. Temperature scans were conducted at 0.05% strain using 2° C. temperature steps with a 0.5 minute soak time at each temperature. From the time lag between input strain delivered by the driver motor and the stress output measured by the transducer, values of material complex modulus E* are obtained. The parameter E* is formally expressed as E*=E'+iE", where E' is the storage modulus (purely elastic term) and E" is the loss modulus (purely viscous term). The storage modulus E' is defined as the stress in phase with the strain divided by the strain, which gives a measure of the energy stored and recovered per cycle. The loss modulus E" is defined as the stress 90 degrees out of phase with the strain divided by the strain, which gives a measure of the energy dissipated per cycle. The ratio of loss modulus to storage modulus is commonly known as the damping (tan delta) where delta is the phase angle between stress and strain. The dynamic storage flexural modulus E' is the operative measure of heat resistance performance, where higher values mean higher performance. At ambient conditions (77° F.), E' for mica filled polypropylene plates of this invention is appreciably higher than for S. At 250° F., which corresponds to aggressive temperatures which are commonly encountered in the microwave heating or cooking of greasy foods, the heat resistance of J plates of this invention is significantly superior to the plates manufactured by S, as further demonstrated below in connection with microwave cooking trials.

TABLE 20

MICROWAVE COOKING TEST RESULTS FOR PLATES J AND S

| | PLATE TYPE | |
|---|---|---|
| FOOD TYPE | J | S |
| Donut | Pass | Sugar glazing sticks |
| Broccoli/cheese | Pass | Significantly deforms |
| Pepperoni pizza | Pass | Moderate deformation, Staining |
| Barbecue pork | Slight stain | Significant stain/warpage |
| Pancake/syrup | Pass | Significant warpage |
| Beans & pork | Pass | Significant warpage |
| Butter | Slight warpage | Significant warpage |
| Bacon | Moderate warpage Localized melting, no leak | Significant warpage Rubbery plate flows and Sticks to glass tray |

Microwaveability

Fort James Corporation (J) plate specimens of this invention and plates manufactured by Solo Cup Company (S) were tested in the microwave (Samsung model MW 8690) with a variety of foods. The highest power setting (10) was used in all cases and cooking/heating times and procedures corresponded to food manufacturer instructions on the packages. Most tested foods were of the frozen microwaveable type and were placed in a semi-thawed state directly on plates prior to cooking. When appropriate, a loose covering of wax paper was employed during the cooking process. After cooking, the plates were gently washed with warm water and inspected. The following are the detailed test results which are also summarized in above Table 20.

Test #1 Results—Sugar Glazed Donut

J A large, oval shaped sugar glazed plain donut was microwaved on the plate of this invention for 60 seconds. The sugar glazing melted, bubbled, and flowed on the plate. The boiling sugar and grease mixture caused the bottom of the plate to feel very warm but the plate exhibited no warping, no staining, no softening, and no soak-through. The plate was cool enough to be safely handled. The residue of the donut was easily washed off and the appearance of the used plate was excellent.

S The bottom of the plate got hot and slightly deformed with no soak-through, however, sugar stuck to the plate.

Test #2 Results—Broccoli With Cheese Sauce

J Green Giant 10 oz. Broccoli with cheese sauce was removed from the flexible pouch and heated for five minutes in the microwave on the plate with loose covering of wax paper. The cheese melted and bubbled on the plate without sticking. The plate bottom was warm, but no soak-through and no loss of dimensional stability was observed. After washing, no staining was observed and the appearance of the used plate was excellent.

S The plate bottom got hot and significantly deformed with no soak-through.

Test #3 Results—Pepperoni pizza

J Tombstone 7 oz. Pepperoni pizza was cooked on an uncovered plate for 4 minutes. The cheese melted and started bubbling about halfway through the test. The molten cheese mingled with the hot liquid fat extruded from the pepperoni and dripped on the sides of the crust onto the plate. No sticking, no soak-through, no staining, and no loss in plate dimensional stability was observed and the appearance of the used plate was excellent.

S The plate bottom got hot and moderately deformed with no soak-through. The greasy reddish stain from oil in pepperoni could not be completely washed off.

Test #4 Results—Microwave Kid Meal:

Pork Rib Patties. Barbecue Sauce, Fries, Honey Corn Bread

J A quick meal preparation simulation test was conducted using a Swanson 7.2 oz. microwave kids' meal with ingredients consisting of partially cooked boneless pork rib patties, barbecue sauce, fries, and honey corn bread. The food was transferred from the compartmented tray onto the plate. Sauce was spooned on top of the pork meat and was allowed to drip on the sides of the patties and onto the plate. The cornbread batter was spooned out and was placed on the plate next to the fries. The food was loosely covered with wax paper and cooked for 3.5 minutes. Examination after microwaving showed that the cornbread was fully cooked and there was no sticking or damage to the plate. The fries and pork meat with sauce caused no soak-through and no loss in plate dimensional stability. Washing of plate revealed the presence of slight staining from barbecue sauce. Overall, the appearance of the used plate was very good.

S The plate bottom deformed mainly from pork meat with considerable staining from the barbecue sauce without soak-through.

Test #5 Results—Beans With Pork and Tomato Sauce

J Beans with pork and tomato sauce (8 oz. Can) were placed on the plate, covered with wax paper and heated for 2 minutes near boiling. The bottom of plate got hot, but the rim was cool to touch. The hot plate bottom exhibited no bulging and also, when the hot food plate was handled by the rim there was no perceived loss in dimensional stability. No soak-through, no warping and no staining was observed. The appearance of the plate was excellent.

S The plate bottom became very hot and severely deformed with no soak-through and when handled by the rim, the plate felt like it had low rigidity.

Test #6 Results—Pancakes With Syrup and Precooked Bacon

J In this test, Swanson microwave pancakes and bacon breakfast (4.5 oz. size) were used. The semi-thawed meal consisted of three pancakes and three partially, precooked bacon strips. The pancakes and bacon were removed from the tray in carton and placed on plate. Approximately 5 teaspoons of pancake syrup was spooned over the pancakes and the assembled meal was covered with wax paper and microwaved for 2 minutes. Although the bottom of the plate got hot, the overall plate performance was excellent, i.e. no warpage, no soak-through, no loss in dimensional stability, and no staining. Some hot grease was exuded by the bacon during crisping but there was no observed damage to the plate. The appearance of the used plate was excellent.

S The plate bottom became hot and significantly deformed (especially in areas where bacon was placed), but no soak-through was observed and when handled by the rim, the plate felt soft.

Test #7—Butter

J Butter (5-tsp. chunk) was placed on the plate and was loosely covered with wax paper and was microwaved for 3 minutes. The butter melted completely and covered the whole plate bottom. The butter began boiling toward the end of the test. The plate bottom got very hot and became slightly warped but no soak-through. The rim of the plate felt cool to touch enabling safe removal of the plate from the microwave oven. A small portion of the butter became charred but was easily washed off the plate. Overall plate performance was good.

S The plate bottom became very hot and was significantly warped but no soak-through was observed and the greasy film residue could not be washed off completely. Plate felt soft and rubbery when handled by the rim.

Test #8 Results—Bacon

J Three strips of raw, cured bacon were wrapped in three sheets of paper towel and cooked for 5 minutes. All of the bacon became crispy and about 20% of it was charred. The bottom of plate got very hot but most of the rim area was relatively cool to the touch. Grease exuded from bacon and soaked through the towel. The grease pooled on the plate bottom, side and on some rim areas. The grease which pooled in some rim regions caused localized melting of the plate but no holes were formed. The hot grease which pooled on plate bottom caused significant warpage but no soak-through. Overall plate performance for Test #8 was less satisfactory than Test #7.

S When the raw bacon was wrapped in paper toweling and cooked on the S plate, the bottom became very soft and stuck to the glass tray in the microwave. Under such hot grease conditions, the adhering polymer regions underwent localized melting and stretched when the plate was lifted off the glass tray. The plate was severely warped but no holes formed and no soak-through was noticed.

With the possible exception of raw bacon, the behavior of the J plate of this invention in the microwave oven is considered excellent with a variety of aqueous, greasy/fatty, sugary food combinations. No unusual or off odors were detected during and after cooking for each type of food directly on the plate. The foregoing data demonstrates the superior properties of the plates of this invention.

Crack Resistance

Low temperature crack resistance of rigid plates is of paramount importance when considering that product must survive during storage and shipping to point of sale. Normally, it is difficult to improve crack resistance or reduce brittleness of rigid polymeric materials without reducing the stiffness which is usually the case when introducing excessive amounts of softer extensible materials such as polyethylenes, rubber modified resins and the like. In order to be successful in imparting crack resistance without significantly reducing stiffness, one must add relatively low amounts of polyethylene or rubber modified additives, generally in the range of several to about 5 wt %. However, this invention shows that addition of low levels of polyethylene alone is not sufficient to promote crack resistance whereby the desired result is produced by a synergistic binary combination of polyethylene and TiO2. Such low odor products have high crack resistance which renders them useful in the commercial sense.

EXAMPLES 63–70

There is provided in a still further aspect of the invention toughened, crack resistant articles. It has been found that polypropylene/mica/polyethylene/titanium dioxide formulations without a coupling agent resist cracking. Generally, the articles have the components set forth in Table 21, in the amounts mentioned above in the summary of the invention herein. In Table 21, it is demonstrated that polyethylene/titanium dioxide exhibit synergy in resisting cracking.

TABLE 21

Low Temperature crack data for 9 inch plates made of PP/30% mica/10% $CaCO_3$ modified with various combinations of $TiO_2$, polyethylene, or coupling agent

| Example # | $TiO_2$ (wt %) | LLDPE (wt %) | HDPE (wt %) | Coupling Agent (wt %)* | Percent Cracked plates at 0 F.** |
|---|---|---|---|---|---|
| 63 | — | 4 | — | — | 100 (n = 5) |
| 64 | — | — | — | 2.5 | 100 (n = 5) |
| 65 | 1.9 | — | — | — | 100 (n = 5) |
| 66 | — | 4 | — | 2.5 | 100 (n = 5) |
| 67 | 1.9 | 0 | 0 | 2.5 | 100 (n = 5) |
| 68 | 0.5 | 4 | — | 2.5 | 60 (n = 5) |
| 69 | 0.5 | 4 | 0 | 0 | 0 (n = 5) |
| 70 | 0.5 | 0 | 4 | 0 | 0 (n = 10) |

*Coupling agent is maleic anhydride modified PP grade Aristech Unite NP-620: other ingredients are: Mica = Franklin Minerals L 140, $CaCO_3$ = Huber Q325, PP = Exxon Escorene PP4772, LLDPE = Novapol Novachemical G1-2024A
**percentage of plates which cracked at 0° F. for specimen sets comprised of the indicates number n Crack resistance of Examples 63 through 70 was evaluated in the laboratory according to method set forth below which was found useful as an investigative tool for optimizing the formulation with various combination of TiO2, polyethylene, or coupling agent. A laboratory procedure was devised and used to evaluate the crack resistance of plates. Specifically, following is a description of test instruments and associated fixtures used to subject plates to a repeatable rim crushing force. The model numbers of standard equipment used on this procedure are recited below and additional fixtures used in these tests were employed as follows:

Instron—Model #55R402 was used which was equipped with Instron Environmental Chamber Model #3111. The Instron environmental chamber—Model #3111 was modified to control low temperatures with liquid nitrogen. It was equipped with a control solenoid mounted on the rear of the cabinet and an electronic control module mounted on the control panel assembly. The temperature within the chamber was controlled in relationship to the setpoint on the front panel temperature dial. A thermocouple within the chamber provides feed back to the device. A mercury thermometer was placed in the chamber and oriented so that temperature within the chamber was visible through an insulated glass door. It was monitored and adjusted to 0° C. using the panel temperature dial.

A push rod was attached to the load cell of the instron and was passed through an opening in the top of the environmental chamber. A circular metal device measuring 100 mm in diameter and 10 mm in thick was attached to the end of the push rod inside the chamber. This circular metal device was used to contact the edge of a plastic plate during testing.

The plate support fixture was placed on a circular metal base support which measured 140 mm in diameter by 14 mm thick. This metal base support was located just above the inside floor of the environmental chamber. It was attached to a support rod that passes through the floor of the environmental chamber and attached to the base of the instron. Centering stops were provided on the metal base support so that the plate support fixture could be repeatedly placed at the same location in the environmental cabinet.

The plate support fixture is constructed of 5-mm thick sheets of plexiglas. The main base of this fixture measures 100×125 mm. The 125-mm dimension represents the width of the front of the mixture. The edge of the 125 mm side of a second plexiglas panel measuring 160×125 mm was permanently attached to the plexiglas main base. This panel was attached at a 900 angle to the main base and 35 mm in from the front edge. An L shaped plexiglas component was attached to the main base behind and parallel to the permanent panel by thumbscrews. Two 20-mm long slots were provided in the base of the L shaped component to allow attachment and provide movement for adjustment to hold the test plate. The short leg or base of the L shaped component faces the rear of the fixture. A block measuring 40×25×15 mm thick was permanently attached at the upper most end at the center of the L shaped component. This block is located on the front side of the moveable component or just opposite the short leg of the L shaped component, while an adjustable plate stop was attached to one side of the moveable L shaped component.

The methodology for testing the crack resistance of plates was as follows. The test plate was secured in a vertical position on edge in the plate support fixture. The bottom of the test plate was placed against the permanently attached plexiglas panel of the plate support fixture. The thumbscrews were loosened on the moveable portion of the plate support fixture. The L shaped moveable component was moved toward the plate. The plate was held in a vertical position by the fixed plexiglas panel and the block which was attached to the wall of the L shaped moveable component.

The plate stop located on the L shaped moveable component was adjusted so that the center of the plate would align with the center of the plate support fixture. The plate support fixture along with the test plate secured in a vertical position was placed on the metal base support in the environmental chamber. The instron was adjusted so that the push rod crush assembly was located 0.5 inches above the plate edge.

Prior to the test, the environmental chamber was adjusted to 0° F. After placement of the plate support fixture along with the test plate secured in a vertical position in the environmental chamber, the chamber had to re-establish 0° F. This time period was about 30 seconds. After re-establishment of the test temperature, the plate was conditioned for an additional five minutes prior to the test.

The crosshead speed of the instron was set at 40 inches per minute. After the five minute conditioning time period, the instron was activated and the edge crushing force applied. A set of five or a set of ten replicate plates was tested for each condition. The total number of plates tested and the total number plates showing rim crack failure for each condition tested are reported in Table 21. In addition, the percentage of plates which cracked was calculated as shown above.

The above formulations for crack resistance testing were compounded in the temperature range of 400 to about 425 F on commercial Banbury equipment using batch sizes in the range of 150–200 lb and nominal mixing times of 3 min followed by underwater pelletizing.

Pellets were subsequently extruded at 370 F as cast sheets in the range of 18 mil. Sheet line conditions also included a screw RPM value of 100, a chill roll temperature of 130 F. Plates were subsequently vacuum thermoformed using a female mold, trimmed, and thereafter tested for crack resistance.

Data on Examples 63 through 65 show that presence of $TiO_2$, polyethylene, or coupling agent alone is not sufficient to promote crack resistance of plates comprised of PP/mica/$CaCO_3$. In addition, data on Examples 66 and 67 show that binary combinations of polyethylene with coupling agent or $TiO_2$ with coupling agent are two cases which are also not sufficient for imparting crack resistance. Futhermore, the tertiary combination of $TiO_2$, polyethylene, and coupling agent (Example 68) also does not impart sufficient crack resistance, as evidenced by the majority of samples which exhibit cracking. Rather, the useful additive packages of this invention (Examples 69 and 70) comprises the binary system of polyethylene (either LLDPE or HDPE) with at least 0.5 wt % $TiO_2$ whereby crack resistance is excellent as evidenced by no cracked samples.

EXAMPLES 71–78 additional plates were fabricated in accordance with the foregoing procedures and compositions; crack testing results appear in table 22 below

TABLE 22

Crack Data and Physical Properties for Various Compounded Formulations
Base Formulation: PP/30% Mica/10% $CaCO_3$

| | Formulation | | | Melt Flow | Filler | Flexural Modulus | 9" Plate | Product | Crack Data @ 0° F. |
|---|---|---|---|---|---|---|---|---|---|
| Example | $TiO_2$ (wt. %) | PE (4 wt. %) | Coupling Agent* | g/10 min. @ 230° C. | Content (Wt. %) | Tangent (psi) | Rigidity (grams/0.5") | Weight (grams) | (# Cracked Total) |
| 71 | 0 | LLDPE | No | 1.45 | 39.4 | 505,000 | 288 | 19.3 | 5/5 |
| 72 | 1.9 | LLDPE | No | 1.64 | 40.6 | 581,600 | 422 | 23.13 | 0/5 |
| 73 | 1.2 | LLDPE | No | 2.05 | 39.8 | 578,500 | 385 | 22.12 | 0/5 |
| 74 | 0.5 | LLDPE | No | 1.77 | 38.6 | 487,500 | 286 | 20.65 | 0/5 |
| 75 | 1.9 | HDPE | No | 1.5 | 40.6 | 637,500 | 436 | 22.70 | 1/5 |
| 76 | 1.9 | 0 | Yes | 1.9 | 39.0 | 717,585 | 417 | 21.25 | 5/5 |
| 77 | 1.9 | LLDPE | Yes | 1.6 | 39.6 | 494,000 | 391 | 21.6 | 5/5 |
| 78 | 1.9 | 0 | Yes | 1.2 | 40.3 | 593,000 | 353 | 20.8 | 5/5 |

*When present, coupling agent concentration is 2.5

What is claimed is:

1. A low temperature compounding process for preparing polypropylene/mica melt compounded product which includes a basic organic compound or a basic inorganic compound operative as an odor-suppressing agent, said product having olfactory properties suitable for food contact applications comprising the sequential steps of: (a) preheating a polypropylene polymer while maintaining the polymer below a maximum temperature of about 305° F.; followed by (b) admixing mica to said pre-heated polymer in an, amount from about 10 to about 50 percent by weight based on the combined weight of resin and mica; followed by (c) extruding said mixture wherein said product exhibits a relative aroma intensity index of less than about 1.6.

2. The process according to claim 1, wherein said maximum temperature of Step (a) is about 260° F.

3. The process according to claim 1, wherein said polymer is melted through the application of shear.

4. The process according to claim 1, wherein said polypropylene polymer is preheated prior to said admixing step externally to the vessel in which said step of admixing the mica takes place.

5. The process according to claim 1, wherein the duration of Step (b) is a maximum of about 5 minutes.

6. The process according to claim 1, wherein the duration of Step (b) is a maximum of about 3 minutes.

7. The process according to claim 1, wherein said basic odor suppressing agent is added to the mixture simultaneously with said mica in step (b) of the process.

8. The process according to claim 7, wherein said steps of preheating said polymer and admixing said mica and odor suppressing compound to said resin are carried out in a batch mode in a mixing chamber provided with a pair of rotating rotors.

9. The process according to claim 1, wherein said odor suppressing compound is a basic organic or inorganic compound comprising the reaction product of an alkali metal or an alkaline earth element with carbonates, phosphates, carboxylic acids, as well as alkali metal and alkaline earth element oxides, hydroxides or silicates, basic metal oxides including mixtures of silicon dioxide with one or more of the following oxides: magnesium oxide, calcium oxide, barium oxide, and mixtures of one or more of the organic or inorganic compounds set forth above.

10. The process according to claim 9, wherein the basic organic or inorganic compound is selected from the group consisting of calcium carbonate, sodium carbonate, potassium carbonate, barium carbonate, sodium silicate, sodium borosilicate, magnesium oxide, strontium oxide, barium oxide, zeolites, sodium citrate, potassium citrate, sodium stearate, calcium stearate, potassium stearate, sodium phosphate, potassium phosphate, magnesium phosphate, mixtures of silicone dioxide with one or more of the following oxides: magnesium oxide, calcium oxide, barium oxide, and mixtures of one or more of the organic or inorganic compounds set forth above.

11. The process according to claim 10, wherein the basic inorganic compound is selected from a group consisting of calcium carbonate, sodium carbonate, potassium carbonate, barium carbonate, sodium silicate, sodium borosilicate, magnesium oxide, strontium oxide, barium oxide, zeolites, sodium phosphate, potassium phosphate, magnesium phosphate, mixtures of silicone dioxide with one or more of the following oxides: magnesium oxide, calcium oxide, barium oxide, and mixtures of one or more of the basic inorganic compounds set forth above and wherein the amount of the basic inorganic compound is from about 5 to about 20 weight percent of the composition.

* * * * *